United States Patent
Koyama et al.

[11] Patent Number: 6,011,897
[45] Date of Patent: *Jan. 4, 2000

[54] STILL PICTURE SYSTEM FOR HIGH SPEED REPRODUCTION

[75] Inventors: Noboru Koyama, Kanagawa; Fumihiko Kaise, Tokyo; Hiroe Honma, Chiba, all of Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/637,661

[22] PCT Filed: Aug. 31, 1995

[86] PCT No.: PCT/JP95/01743

§ 371 Date: Apr. 29, 1996

§ 102(e) Date: Apr. 29, 1996

[87] PCT Pub. No.: WO96/07271

PCT Pub. Date: Mar. 7, 1996

[30] Foreign Application Priority Data

Aug. 31, 1994 [JP] Japan .................................. 6-206708

[51] Int. Cl.[7] .............................. H04N 5/76; H04N 5/781
[52] U.S. Cl. ................................ 386/95; 386/126; 369/48
[58] Field of Search ........................ 386/45, 95, 125–126, 386/70; 358/401, 403, 444; 369/47–50, 59, 32; H04N 5/76, 5/92, 5/781, 5/78, 5/782, 5/783

[56] References Cited

U.S. PATENT DOCUMENTS

| | | | |
|---|---|---|---|
| 4,833,625 | 5/1989 | Fisher et al. | 364/518 |
| 4,837,487 | 6/1989 | Kurakake et al. | 318/568.16 |
| 4,901,300 | 2/1990 | Van Der Zande et al. | 369/47 |
| 4,969,204 | 11/1990 | Melnychuck et al. | 382/56 |
| 4,996,598 | 2/1991 | Hara | 358/183 |
| 5,060,219 | 10/1991 | Lokhoff et al. | 369/48 |
| 5,072,435 | 12/1991 | Bakx | 369/48 |
| 5,124,966 | 6/1992 | Roth et al. | 369/47 |
| 5,218,455 | 6/1993 | Kristy | 358/403 |
| 5,226,027 | 7/1993 | Bakx | 369/48 |
| 5,303,217 | 4/1994 | Bakx et al. | 369/48 |
| 5,418,764 | 5/1995 | Roth et al. | 369/47 |
| 5,428,598 | 6/1995 | Veldhuis et al. | 369/275.3 |
| 5,440,401 | 8/1995 | Parulski et al. | 386/126 |
| 5,546,137 | 8/1996 | Takeuchi | 348/714 |
| 5,633,726 | 5/1997 | Timmermans | 386/126 |

FOREIGN PATENT DOCUMENTS

| | | | |
|---|---|---|---|
| 3-290871 | 12/1991 | Japan | G11B 20/12 |
| 4-182981 | 6/1992 | Japan | G11B 27/00 |
| 4-273786 | 9/1992 | Japan | H04N 5/91 |
| 5-191761 | 7/1993 | Japan | G11B 7/00 |
| 5-219387 | 8/1993 | Japan | G11B 7/00 |
| 5-234260 | 9/1993 | Japan | G11B 20/12 |
| 5-3255000 | 12/1993 | Japan | G11B 27/00 |
| 6-105273 | 4/1994 | Japan | G11B 20/00 |

*Primary Examiner*—Thai Tran
*Attorney, Agent, or Firm*—Limbach & Limbach LLP; Seong-Kun Oh

[57] ABSTRACT

At a storage section, picture information of intermediate resolution and picture information of low resolution are formed on the basis of picture information of high resolution which has been read out from a frame memory. These picture information are caused to undergo fixed length encoding at a compression/expansion circuit. These picture data of three kinds of resolutions which have been caused to undergo fixed length encoding are respectively recorded in the order of reproduction and continuously onto an optical disk having tri-sected recording areas for respective resolutions. Thus, it is sufficient to read out, from any one of the recording areas, picture data of resolution corresponding to the equipment which outputs picture data. In addition, since the picture data of respective resolutions are continuously recorded in the order of reproduction, the seek time is eliminated thereby contributing to realization of high reproduction speed.

162 Claims, 47 Drawing Sheets

FORMAT TABLE

| FIELD NAME | NO. OF BYTES | DATA FORM |
|---|---|---|
| TABLE ID | 1 | B |
| NEXT TABLE POINTER | 1 | B |
| FORMAT VERSION | 2 | B |
| FILE FORM | 1 | B |
| FILE FORM VERSION | 1 | B |
| NO. OF ALL TABLES | 1 | B |
| RESERVE (SPACE) | 1 | B |
| DATA START ADDRESS | 4 | B |
| DATA SIZE | 4 | B |
| RESERVE (SPACE) | 4 | |

FIG.26

PICTURE PARAMETER TABLE

| FIELD NAME | NO. OF BYTES | DATA FORM |
|---|---|---|
| TABLE ID | 1 | B |
| NEXT TABLE POINTER | 1 | B |
| PICTURE SIZE BREADTH | 2 | B |
| PICTURE SIZE LENGTH | 1 | B |
| PICTURE COMPONENT | 1 | B |
| DISCRIMINATION BETWEEN LENGTH AND BREADTH | 1 | B |
| WIDE ID | 1 | B |
| COMPRESSION RATE | 1 | B |
| COPY RIGHT, EDITORIAL RIGHT | 1 | B |
| INPUT EQUIPMENT KIND | 1 | B |
| RESERVE (SPACE) | 3 | B |
| EXISTENCE OF DUMMY DATA | 1 | B |
| X-BIGIN OF VALID DATA | 2 | B |
| Y-BIGIN OF VALID DATA | 2 | B |
| X-SIZE OF VALID DATA | 2 | B |
| Y-SIZE OF VALID DATA | 2 | B |
| RESERVE (SPACE) | 4 | B |

FIG.27

OV_INF. PMF FILE (OVERALL INFORMATION MANAGEMENT FILE)

| HEADER | | |
|---|---|---|
| | FORMAT TABLE | {ESSENTIAL} |
| | NAME TABLE | {OPTION} |
| | COMMENT TABLE | {OPTION} |
| | DISC ID TABLE | {OPTION} |
| | OPTION TABLE | {OPTION} |

| FIELD NAME | NO. OF BYTES | DATA FORM |
|---|---|---|
| TOTAL NO. OF PICTURES | 2 | B |
| NEXT PICTURE DIRECTORY NO. | 2 | B |
| TOTAL NO. OF PICTURE DIRECTORIES | 2 | B |
| NO. OF REPRODUCTION CONTROL FILES | 1 | B |
| PRESENCE OR ABSENCE OF PMSE Q DIRECTORY | | |
| NO. OF RGB MUSICS | 1 | B |
| NO. OF PRINT DATA FILES | 1 | B |
| PRESENCE OR ABSENCE OF TELOP DATA FILE | 1 | B |
| PRESENCE OR ABSENCE OF RETRIEVAL INFORMATION FILE | 1 | B |
| AUTOMATIC START FILE NO. | 1 | B |
| LAST ACCESS PICTURE DIRECTORY NO. | 2 | B |
| LAST ACCESS PICTURE NO. | 2 | B |
| PASS WORD | 8 | B |
| NARRATION LANGUAGE INFORMATION | 6 | B |
| RESERVE | 2 | |
| PICTURE DIRECTORY INFORMATION UNIT | 48 × N | |

(DATA section)

FIG.28(a)

| PICTURE DIRECTORY | NO. OF INFORMATION UNIT BYTES | DATA FORM |
|---|---|---|
| DIRECTORY NO. | 2 | B |
| INDEX PICTURE NO. | 2 | B |
| NO. OF PICTURES WITHIN DIRECTORY | 2 | B |
| INDEX PICTURE INDIVIDUAL INFORMATION | 1 | B |
| CHARACTER ID CODE | 1 | B |
| DIRECTORY NAME | 36 | A OR C |
| RESERVE | 4 | B |

FIG.28(b)

PIC INF. PMF FILE (PICTURE DATA MANAGEMENT FILE)

| HEADER | | |
|---|---|---|
| | FORMAT TABLE | {ESSENTIAL} |
| | NAME TABLE | {OPTION} |
| | COMMENT TABLE | {OPTION} |
| | DISC ID TABLE | {OPTION} |
| | OPTION TABLE | {OPTION} |

| | FIELD NAME | NO. OF BYTES | DATA FORM |
|---|---|---|---|
| DATA | LINK ID | 1 | B |
| | RESERVE | 3 | B |
| | NEXT PICTURE NO. | 2 | B |
| | NO. OF PICTURES | 2 | B |
| | RESERVE | 2 | |
| | NO. OF PICTURE INDEX FILES | 1 | B |
| | NEXT PICTURE INDEX FILE NO. | 1 | B |
| | INDEX FILE INFORMATION | 4 × 256 | B |
| | PICTURE INFORMATION UNIT | 16 × N | |

FIG.29(a)

| PICTURE INFORMATION UNIT | NO. OF BYTES | DATA FORM |
|---|---|---|
| DIRECTORY NO. | 2 | B |
| PICTURE NO. | 2 | B |
| PICTURE KIND INFORMATION | 1 | B |
| PICTURE INDIVIDUAL INFORMATION | 1 | B |
| NO. OF LINKS | 1 | B |
| NARRATION INFORMATION | 1 | B |
| KEY WORD RETRIEVAL DATA NO. | 2 | B |
| TIME STAMP RETRIEVAL DATA NO. | 2 | B |
| TELOP NO. | 2 | B |
| RESERVE | 2 | |

FIG.29(b)

P[ ]nnnnn. PMP FILE(PICTURE DATA FILE)

| | | |
|---|---|---|
| HEADER | FORMAT TABLE | {ESSENTIAL} |
| | PICTURE PARAMETER TABLE | {ESSENTIAL} |
| | DIVISIONAL MANAGEMENT TABLE | {ESSENTIAL IF DIVISIONAL FILE} |
| | NAME TABLE | {OPTION} |
| | COMMENT TABLE | {OPTION} |
| | COPYRIGHT INFORMATION TABLE | {OPTION} |
| | RECORDING DATE TABLE | {OPTION} |
| | COLOR MANAGEMENT INFORMATION TABLE | {OPTION} |
| | APPEARANCE INFORMATION TABLE | {OPTION} |
| | CAMERA INFORMATION TABLE | {OPTION} |
| | SCANNER INFORMATION TABLE | {OPTION} |
| | LABORATORY INFORMATION TABLE | {OPTION} |
| | OPTION TABLE | {OPTION} |

| | FIELD NAME | NO. OF BYTES | DATA FORM |
|---|---|---|---|
| DATA | JPEG PICTURE DATA | | |

FIG.31

OV_IDX. PMX FILE (OVERALL INDEX FILE)

| | NO. OF BYTES |
|---|---|
| HEADER | |
| INDEX PICTURE DATA 0 | 4096 |
| INDEX PICTURE DATA 1 | 4096 |
| INDEX PICTURE DATA 2 | 4096 |
| ⋮ | ⋮ |
| INDEX PICTURE DATA N-1 | 4096 |
| INDEX PICTURE DATA N | 4096 |

FIG.32(a)

INDEX PICTURE DATA

| | | |
|---|---|---|
| HEADER | FORMAT TABLE | {OPTION} |
| | SPACE | {OPTION} |

| FIELD NAME | NO. OF BYTES | DATA FORM |
|---|---|---|
| DATA (JPEG) | | |
| SPACE | | |

(left label: DATA)

FIG.32(b)

PIDXnnn. PMX FILE (PICTURE INDEX FILE)

| | NO. OF BYTES |
|---|---|
| INDEX PICTURE DATA 0 | 4096 |
| INDEX PICTURE DATA 1 | 4096 |
| INDEX PICTURE DATA 2 | 4096 |
| ⋮ | ⋮ |
| INDEX PICTURE DATA N-1 | 4096 |
| INDEX PICTURE DATA N | 4096 |

HEADER (rows 0, 1)

FIG.33(a)

INDEX PICTURE DATA

HEADER:
| FORMAT TABLE | {ESSENTIAL} |
|---|---|
| SPACE | {ESSENTIAL} |

DATA:
| FIELD NAME | NO.OF BYTES | DATA FORM |
|---|---|---|
| DATA (JPEG) | | |
| SPACE | | |

FIG.33(b)

| INDEX A:ALBUMNAME | | | | |
|---|---|---|---|---|
| A1 | A2 | A3 | A4 | A5 |
| A6 | A7 | A8 | A9 | A10 |
| A11 | A12 | A13 | A14 | A15 |
| A16 | A17 | A18 | A19 | A20 |
| A21 | A22 | A23 | A24 | A25 |

FIG.39

| ALBUM INDEX A-Y | | | | |
|---|---|---|---|---|
| A1 | B1 | C1 | D1 | E1 |
| F1 | G1 | H1 | I1 | J1 |
| K1 | L1 | M1 | N1 | O1 |
| P1 | Q1 | R1 | S1 | T1 |
| U1 | V1 | W1 | X1 | Y1 |

FIG.40

ALBUM INDEX A-E

| A1 | A2 | A3 | A4 | A5 |
| B1 | B2 | B3 | B4 | B5 |
| C1 | C2 | C3 | C4 | C5 |
| D1 | D2 | D3 | D4 | D5 |
| E1 | E2 | E3 | E4 | E5 |

FIG.41

ALBUM INDEX A-E

| A1 | A11 | A21 | A31 | A41 |
| B1 | B11 | B21 | B31 | B41 |
| C1 | C11 | C21 | C31 | C41 |
| D1 | D11 | D21 | D31 | D41 |
| E1 | E11 | E21 | E31 | E41 |

FIG.42

STILL PICTURE SYSTEM FOR HIGH SPEED REPRODUCTION

TECHNICAL FIELD

This invention relates to a still picture system adapted for handling, e.g., still picture information formed by reading picture (pictorial image) from negative film or photograph, etc., or still picture information from camera device, video tape recorder equipment or monitor device, etc.

BACKGROUND ART

As a recording system for still picture employed in recent years, a system of taking images of objects by a camera device using photographic film to take a negative film formed thereby to a processing laboratory to carry out development and print to obtain photographs on which respective still pictures of the objects are recorded is popular.

However, when the number of photographs obtained as stated above is increased, the number of albums for carrying out storage or preservation of those photographs is also increased. As a result, there is difficulty in ensuring storage place, and management becomes very troublesome. For this reason, development of such equipments capable of carrying out, with eased, storage and management of still pictures recorded on the photographs is required at present.

This invention has been made in view of such actual circumstances, and its object is to provide a picture recording apparatus, a picture recording method, a picture reproducing (playback) method, a recording medium, and a management method which realize such a still picture system capable of carrying out, with ease, storage and management, etc. of still pictures recorded on photographs or books, etc.

DISCLOSURE OF THE INVENTION

A picture recording apparatus according to this invention is directed to a picture recording apparatus adapted for recording picture data onto a recording means, wherein the apparatus comprises input means for inputting the picture data, picture forming means for forming plural picture data of different resolutions on the basis of the picture data inputted from the input means, compressing means for respectively compressing the picture data of respective resolutions from the picture forming means, recording means for recording compressed picture data compressed by the compressing means onto the recording medium, and control means for controlling the compressing means and the recording means so that data lengths of the compressed picture data recorded on the recording medium becomes a predetermined recording unit of the recording medium.

Namely, the picture recording apparatus according to this invention electrically handles still pictures as picture data. As the input means, scanner equipment for reading pictures (pictorial images) recorded on photographs or books, etc., video tape recorder equipment for reproducing still pictures recorded on a video tape to input them, optical disc reproducing (playback) equipment for reproducing still pictures recorded on an optical disc to input them, and the like are enumerated.

The picture forming means forms plural picture data of different resolutions on the basis of inputted picture data. In a more practical sense, the picture forming means forms, on the basis of the inputted picture data, e.g., high resolution picture data for printer, intermediate resolution picture data for monitor display, and low resolution picture data for displaying as a list (index), etc. respective still pictures recorded on the recording medium.

Then, still picture data of, e.g., three kinds of resolutions formed by the picture forming means as stated above are compressed by the compressing means. In this instance, control means controls the compressing means so that data lengths of the these picture data become a predetermined recording unit. Then, the recording means records the compressed picture data compressed by the compressing means so that the data lengths become the predetermined recording unit onto a recording medium, e.g., rewritable magneto-optical disc or magnetic tape, etc.

Thus, it is possible to preserve the photograph, etc. onto a single recording medium. For this reason, storage ability can be improved without taking broad storage place. Moreover, since still pictures can be electrically handled as picture data, it is possible to carry out, with ease, storage, erasing and editing, etc. Further, since an approach is employed to form picture data of plural resolutions on the basis of picture data of single still picture to record these respective picture data onto a recording medium to preserve them, still picture of optimum resolution can be displayed according to the display purpose, such as, for example, monitor display or printer display, etc.

Moreover, a picture recording method according to this invention is directed to a picture recording method for recording picture data onto a recording medium, wherein directory is formed in a rewritable area of the recording medium and subdirectories are formed within the directory. Then, first management file for carrying out management of all subdirectories, and first index file for recording low resolution picture data for indicating at least one picture file of a plurality of picture files recorded in the respective subdirectories are recorded into the directory. Further, second management file for carrying out management of picture files recorded in the subdirectories and second index file for recording low resolution picture data for respectively indicating all picture files recorded in the subdirectory are recorded into the subdirectory.

Namely, the picture recording method according to this invention records, onto the recording medium, management data such as first management file and first index file, etc. along with picture data. Thus, it is possible to carry out management of the picture data by hierarchical structure consisting of directory and subdirectories. Thus, management ability can be improved.

Moreover, the picture recording method according to this invention has hierarchical directory structure including directory (PIC MD) for recording picture data and subdirectories (picture directory), wherein second management files are provided for every respective subdirectory. Accordingly, since it is possible to carry out management of picture files in the state classified for every subdirectory, management of a large number of pictures can be easily carried out.

Further, since a plurality of low resolution picture data are recorded on the recording medium as a single index, it is possible to read out, at a high speed, those plural low resolution picture data by reading out the index file. Thus, the number of access operations with respect to the disc can be reduced.

In addition, since there are provided first index file (overall index file) for recording data of low resolution pictures of respective subdirectories and second index file (picture index file) for recording all low resolution picture data in the directory, a large number of picture data are permitted to be displayed in hierarchical manner.

Moreover, a picture recording method according to this invention is directed to a picture recording method for recording picture data onto a recording medium, wherein there is used a recording medium comprising: a first area for recording a plurality of picture files in which plural picture data of different resolutions formed on the basis of one picture data are recorded for every resolution, and management file for carrying out management of correspondence information between respective files in the plurality of picture files; and a second area for recording management information table which carries out, in predetermined recording units of the recording medium, recording state within the first area of the respective files recorded in the first area. In addition, the picture files are recorded onto the recording medium on the basis of respective data of the management file and the management information table.

Thus, recording corresponding to the recording state of the recording medium can be carried out. As a result, the recording area of the recording medium can be effectively utilized, and management of the recorded picture data can be facilitated.

A picture reproducing (playback) method according to this invention is directed to a picture reproducing method for reproducing picture data recorded on a recording medium, wherein there is used a recording medium comprising: a first area for recording a plurality of files in which plural picture data of different resolutions formed from original picture data are recorded every resolution, and management file for carrying out management of correspondence information between respective files in the plurality of picture files; and a second area different from the first area, which records management information table for carrying out, in predetermined recording units of the recording medium, management of relative position within the first area of the respective files recorded in the first area. Further, an approach is employed to designate the picture file on the basis of data of the management file recorded in the first area to reproduce (play back) the designated picture file recorded on the recording medium on the basis of data of the management information table recorded in the second area.

A plurality of picture files for every respective resolution recorded on the recording medium are caused to undergo management by the management file recorded in the first area and the management information table recorded in the second area. For this reason, it is possible to immediately reproduce (play back) a designated desired picture. Thus, handling of picture data can be facilitated.

Moreover, since management data for recording/ reproducing (playing back) picture files in which picture data is recorded are concentrated in the management file and the management information table (data U-TOC), access only to the management file and the management information is carried out, thereby making it possible to carry out, at high speed, retrieval of picture files on the disc. In addition, the number of access operations for retrieval can be reduced.

Further, since the area on the recording medium is divided into first area (file extents area) for recording data file including picture file and management file and the second area for recording management information table, retrieval of the data file recorded in the first area becomes easy.

Further, since the management information for designating picture file are all recorded within the management file, even in the case where correspondence state (situation) between the picture files and the order of display of pictures are changed by editing operation, etc., it is sufficient to change only information of management file without the necessity for reading out the high resolution file itself and the intermediate resolution picture file itself. Thus, the number of access operation can be reduced and updating of information can be carried out in a short time. In addition, since any data of large capacity such as picture data is not included in management data included in the management file and the management information table and only the management data exist, such management data is suitable for buffering into the memory. Thus, once the management file and the management information table are caused to undergo buffering into the memory, it becomes unnecessary to provide access to the optical disc in order to retrieve respective picture files.

A picture reproducing (playback) method according to this invention is directed to a picture reproducing method for reproducing picture data recorded on a recording medium, wherein a directory and subdirectories provided within the directory are formed within a rewritable area of the recording medium, and a first management file for carrying out management of all subdirectories formed within the directory and first index file for recording low resolution picture data for indicating at least one picture file of a plurality of picture files recorded in the subdirectories formed within the directory are recorded in the directory. Moreover, second management file for carrying out management of picture files recorded in the subdirectories and second index files which records low resolution picture data for respectively indicating all picture files recorded in the subdirectories are recorded in the subdirectories. Further, an approach is employed to designate subdirectory on the basis of data recorded in the first management file and the plurality of low resolution picture data recorded in the first index area to reproduce picture file corresponding to the low resolution picture data on the basis of data recorded in the second management file and the plurality of low resolution picture data recorded in the second index file.

Management of picture data is carried out by the directory and the subdirectories in this way to reproduce those picture data, thereby making it possible to immediately reproduce designated picture data after the user is caused to confirm it by the index file. Thus, handling of picture data can be facilitated.

Moreover, since management data necessary for recording/reproducing picture files in which respective picture data are recorded are concentrated in the management file and the management information table (data U-TOC), access only to the management file and the management information is provided, thereby making it possible to carry out, at a high speed, retrieval of picture files on the disc. Thus, the number of access operations can be reduced.

Further, since the area on the recording medium is separated into a first area (file extents area) for recording data file including picture file and management file and a second area for recording management information table, retrieval of data files recorded in the first area becomes easy.

Further, a picture recording method according to this invention has hierarchical directory structure including directory (PIC MD) and subdirectories (picture directory) for recording picture data, wherein second management files are provided for every respective subdirectory. Accordingly, picture files can be caused to undergo management in the state classified for every subdirectory. Thus, management of a large number of pictures can be easily conducted.

Further, since plural low resolution picture data are recorded on the recording medium as one index, it is possible to read out, at a high speed, plural low resolution picture data by reading out the index file. Thus, the number of access operations with respect to the disc can be reduced.

Further, since there are provided a first index file (overall index file) for recording data of low resolution pictures of respective subdirectories and a second index file (picture index file) for recording all low resolution picture data in the directory, a large number of picture data can be displayed in a hierarchical manner.

A recording medium according to this invention is directed to a recording medium on which picture data are recorded, wherein a first management information for carrying out management of a rewrite disable area and a rewritable area provided on the recording medium is included. Moreover, the recording medium includes a first area provided within the rewritable area caused to undergo management by the first management information and adapted for recording a plurality of picture files in which plural picture data of different resolutions generated from one original picture data are recorded for every respective resolution, and management file which carries out management of correspondence information between respective files in the plural picture files. Further, the recording medium includes a second area provided within the rewritable area except for the first area caused to undergo by the first management information and adapted for carrying out, in predetermined recording units of the recording medium, relative positions within the first area of respective files recorded in the first area.

Thus, management of picture data recorded for every respective resolution can be precisely carried out. Accordingly, the recording area on the recording medium can be effectively utilized, and management of the respective picture data can be facilitated. Thus, designated picture data can be immediately reproduced (played back).

Moreover, since management data necessary for recording/reproducing picture files in which respective picture data are recorded are concentrated in the management file and the management information table (data U-TOC), access only to the management file and the management information is provided, thereby making it possible to carry out, at a high speed, retrieval of picture files on the disc. Thus, the number of access operations for retrieval can be reduced.

Further, since the area on the recording medium is separated into a first area (file extents area) for recording data file including picture file and management file and a second area for recording management information table, retrieval of data files recorded in the first area becomes easy.

A recording medium according to this invention is directed to a recording medium for recording/reproducing picture data, wherein the recording medium has hierarchical directory structure of directory and subdirectories formed within the directory. Further, first management file for carrying out management of all subdirectories formed within the directory and first index file which records index picture for indicating at least one picture file of picture files recorded into the subdirectories formed within the directory are provided in the directory. Moreover, second management file for carrying out management of picture files recorded in the subdirectories and second index file which records index picture for respectively indicating all picture files recorded in the subdirectories are provided in the subdirectory.

Thus, management of respective picture data recorded on the recording medium can be facilitated, and designated picture data can be immediately reproduced (played back). Moreover, a picture recording method according to this invention has a hierarchical directory structure including directory (PIC MD) for recording picture data and subdirectories (picture directory), wherein second management files are provided every respective subdirectories. Accordingly, picture files can be caused to undergo management in the state classified for every subdirectory. Thus, management of a large number of pictures can be easily carried out.

Further, since a plurality of low resolution picture data are recorded on the recording medium as one index, it is possible to read out, at a high speed, a plurality of low resolution picture data by reading out the index file. Thus, the number of access operations with respect to the disc can be reduced.

A recording medium according to this invention is directed to a recording medium on which picture data are recorded, wherein there are included a plurality of picture files in which plural picture data of different resolutions generated from one original picture data are recorded every resolutions, management file for carrying out management of correspondence information between respective files in the plurality of picture files, and management information for carrying out, in predetermined recording units of the recording medium, relative position on the recording medium between the management file and the picture file. In this case, there is employed such a data management structure to designate a desired picture file from the plural picture files having different resolutions on the basis of management data of the management file to designate position on the recording medium within the picture file designated by the management file on the basis of the management data of the management information.

Thus, management of picture data respective resolutions recorded on the recording medium can be facilitated, and designated picture data can be immediately reproduced (played back).

Moreover, since the management data necessary for recording/reproducing picture files in which respective picture data are recorded are concentrated in the management file and the management information table (data U-TOC), access only to the management file and the management information is provided, thereby making it possible to carry out, at a high speed, retrieval of picture files on the disc. Thus, the number of access operations for retrieval can be reduced.

Further, since management information for designating picture file are all recorded within the management file, even in the case where correspondence state (situation) between picture files and the display order of pictures are changed by editing operation, etc., it is sufficient to change only information of the management file without the need for reading out the high resolution file itself and the intermediate resolution picture file itself. Accordingly, the number of access operations can be reduced. Thus, updating of information can be conducted in a short time. In addition, since any data of large capacity such as picture data is not included in the management data included in the management file and the management information table and only management data exists, this is suitable for buffering into the memory. Thus, once the management file and the management information table are caused to undergo buffering into the memory, it becomes unnecessary to provide access to the optical disc in order to retrieve respective picture files.

A management method according to this invention is directed to a management method for carrying out management of picture data on a recording medium, wherein an approach is employed to carry out management of rewritable area and rewrite disable area on the recording medium by first management information recorded on the recording medium. Moreover, an approach is employed to carry out, within a first area provided in the rewritable (recordable) area, management of a plurality of picture files in which plural picture data of different resolutions generated from one original picture data are recorded fort every resolution by a management file in which correspondence state (situation) between respective files in the plural picture files is recorded. Further, an approach is employed to carry out, within a second area which is the rewritable area except for the first area, management of recording state (situation) within the second area, in management block units, by second management information recorded in the second area, and to carry out, in predetermined recording units of the recording medium, management of recording state (situation) of the first area by the picture file and the management file recorded within the first area.

Thus, the recording area on the recording medium can be effectively utilized. In addition, management of picture data for every respective resolution recorded in the recording area can be facilitated, and designated picture data can be immediately reproduced (played back).

Moreover, since management data necessary for recording/reproducing (playing back) picture files in which respective picture data are recorded are concentrated in the management file and the management information table (data U-TOC), access only to the management file and the management information is provided, thereby making it possible to conduct, at a high speed, retrieval of picture files on the disc. In addition, the number of access operations for retrieval can be reduced.

Further, since the area on the recording medium is separated into a first area (file extents area) for recording data file including picture file and management file and a second area for recording management information table, retrieval of data file recorded into the first area becomes easy.

Further, since management information for designating picture file are all recorded in the management file, even in the case where correspondence state (situation) between picture files and display order of picture is changed by editing operation, etc., it is sufficient to change only information of management file without the need for reading out the high resolution file itself and the intermediate resolution picture file itself. Accordingly, the number of access operations can be reduced, and updating of information can be conducted in a short time. In addition, since any data of large capacity such as picture data is not included in management data included in the management file and the management information table and only management data exists, this is suitable for buffering into the memory. Thus, once management file and management information table are caused to undergo buffering into the memory, it becomes unnecessary to provide access to the optical disc in order to retrieve respective picture files.

A management method according to this invention is directed to a management method for carrying out management of picture data on a recording medium, wherein there is used, as the recording medium, a recording medium having hierarchical directory structure including directory and subdirectories formed below (at the lower level (layer) of) the directory. Within the directory, there are provided a first management file for carrying out management of all subdirectories of the subdirectories formed at the lower level of the directory, and a first index file which records index picture for indicating at least one picture file of picture files recorded in the subdirectories formed at the lower level of the directory. Moreover, within the subdirectory, there are provided a second management file for carrying out management of picture files recorded into the subdirectories, and a second index file which records index picture for respectively indicating all picture files recorded in the subdirectories.

Thus, respective picture data recorded on the recording medium can be caused to undergo management by the hierarchical directory structure. For this reason, management of the respective picture data can be facilitated, and designated picture data can be immediately reproduced (played back).

Moreover, a picture recording method according to this invention has hierarchical directory structure including directory (PIC MD) and subdirectories (picture directory) for recording picture data, wherein second management files are provided for every respective subdirectory. Accordingly, management of picture files can be carried out in the state classified for every respective subdirectory. Thus, management of a large number of pictures can be easily carried out.

Further, since a plurality of low resolution picture data are recorded on the recording medium as one index, it is possible to read out, at a high speed, a plurality of low resolution picture data by reading out the index file, and the number of access operations with respect to the disc can be reduced.

A management method according to this invention is directed to a management method for carrying out management of picture data on a recording medium, wherein a plurality of picture files in which plural picture data of different resolutions generated from one original picture data are recorded for every resolution, management file for carrying out management of correspondence information between respective files in the plural picture files, and management information for carrying out, in predetermined recording units of the recording medium, management of relative position on the recording medium between the management file and the picture file are recorded onto the recording medium. Then, desired picture file is designated from the plural picture files having different resolutions on the basis of management data of the management file to designate position on the recording medium within the picture file designated by the management file on the basis of management data of the management information.

Thus, management of recording position of picture data on the recording medium can be precisely carried out. For this reason, the recording area of the recording medium can be effectively utilized. In addition, since management of recording position of picture data on the recording medium can be precisely carried out, picture data designated by user can be immediately reproduced (played back).

Moreover, since management data necessary for recording/reproducing (playing back) picture files in which respective picture data are recorded are concentrated in the management file and management information table (data U-TOC), access only to the management file and the management information is provided, thereby making it possible to carry out, at a high speed, retrieval of picture files on the disc. In addition, the number of access operations for retrieval can be reduced.

Further, since management information for designating picture file are all recorded in the management file, even in the case where correspondence state (situation) between picture files and display order of picture is changed by editing operation, etc., it is sufficient to change only information of the management file without the need for reading out the high resolution file itself and the intermediate resolution picture file itself. Accordingly, the number of access operations can be reduced and updating of information can be carried out in a short time. In addition, since any data of large capacity such as picture data is not included in management data included in the management file and the management information table and only management data exists, this is suitable for buffering into the memory. Thus, once the management file and the management information table are caused to undergo buffering into the memory, it becomes unnecessary to provide access to the optical disc in order to retrieve respective picture files.

BRIEF DESCRIPTION OF THE DRAWINGS

FIG. 26 is a view for explaining format table in the hierarchical directory structure.

FIG. 27 is a view for explaining picture parameter table in the hierarchical directory structure.

FIGS. 28(a)–28(b) are a view for explaining overall information management file in the hierarchical directory structure.

FIGS. 29(a)–29(b) are a view for explaining picture data management file in the hierarchical directory structure.

FIG. 31 is a view for explaining picture data file in the hierarchical directory structure.

FIGS. 32(a)–32(b) are a view for explaining overall index file in the hierarchical directory structure.

FIGS. 33(a)–33(b) are a view for explaining picture index file in the hierarchical directory structure.

FIG. 39 is a view for explaining display form of first index display in the still picture recording/reproducing system.

FIG. 40 is a view for explaining display form of second index display in the still picture recording/reproducing system.

FIG. 41 is a view for explaining display form of third index display in the still picture recording/reproducing system.

FIG. 42 is a view for explaining display form of fourth index display in the still picture recording/reproducing system.

BEST MODE FOR CARRYING OUT THE INVENTION

Preferred modes (forms) for carrying out a picture recording apparatus, a picture recording method, a picture reproducing (playback) method, a recording medium, and a management method according to this invention will now be described in detail with reference to the attached drawings.

Figure 1:
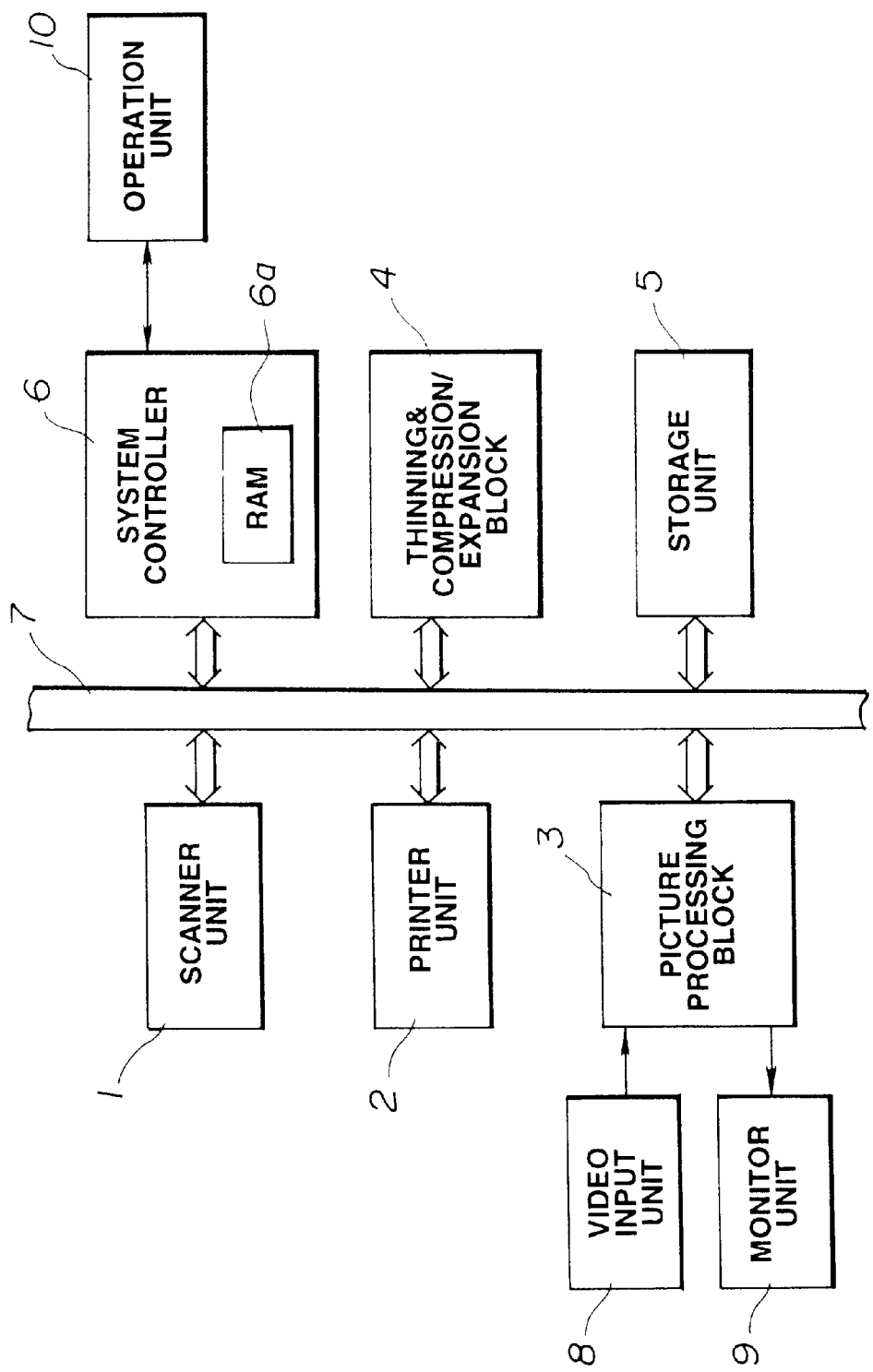
FIG. 1 is a block diagram of a still picture recording/reproducing (playback) system to which a picture recording apparatus, a picture recording method, a picture reproducing (playback) method, a recording medium and a management method according to this invention are applied.

Initially, the picture recording apparatus, the picture recording method, the picture reproducing (playback) method, the recording medium and the management method according to this invention can be applied to a still picture recording/reproducing system as shown in FIG. 1.

1 [Configuration of the still picture recording/reproducing (playback) system]

This still picture recording/reproducing (playback) system comprises a scanner unit 1 for carrying out reading operation of a picture (pictorial image) from film or photograph, etc., a printer unit 2 for carrying out print operation of a still picture corresponding to the picture data taken in or recorded at the still picture recording/reproducing system, and a picture processing block 3 for forming, from the picture data taken into the still picture recording/reproducing system, high resolution picture data for print, intermediate resolution picture data for monitor display, and low resolution picture data for index display. A video input unit 8 for taking thereinto picture data from other image equipments such as video tape recorder equipment or camera device, etc., and a monitor unit 9 on which still picture corresponding to picture data through the picture processing block 3 is displayed are connected to the picture processing block 3.

Moreover, the still picture recording/reproducing system comprises a thinning and contraction/expansion block 4 for implementing thinning and contraction/expansion processing upon picture data taken into the still picture recording/reproducing system, a storage unit 5 for recording and reproducing the picture data of respective resolutions with respect to optical disc (magneto-optical disc) provided as a recording medium in the still picture recording/reproducing system, and a system controller 6 for carrying out control of the entirety of the still picture recording/reproducing system. At the system controller 6, as described later, there is provided a random access memory (RAM) 6a for temporarily storing picture data which has been read out from the optical disc when recording the picture data after having undergone sequencing in the order of reproduction (playback). In addition, an operation unit 10 for designating taking-in, recording, reproduction (playback) and printing, etc. of the picture data is connected to the system controller 6.

The still picture recording/reproducing system is of a structure in which the scanner unit 1, the printer unit 2, the picture processing block 3, the thinning and contraction/expansion processing block 4, the storage unit 5, and the system controller 6 are connected (interconnected) through a bus line 7.

1-1 [Configuration of the scanner unit]

Figure 2:
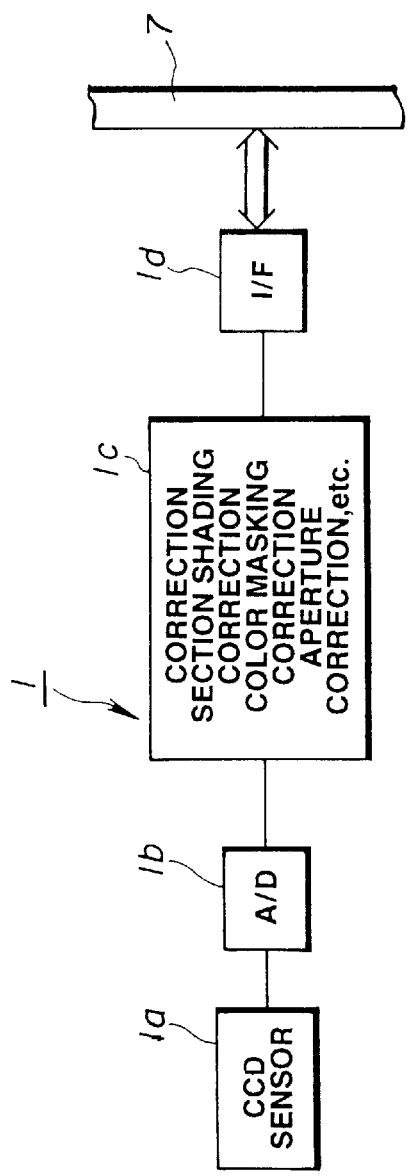
FIG. 2 is a block diagram of scanner unit provided in the still picture recording/reproducing system.

The scanner unit 1 is composed, as shown in FIG. 2, of a CCD image sensor 1a for reading still picture recorded on negative film, positive film or photograph, etc., an A/D converter 1b for allowing a picture signal delivered as an analog signal from the CCD image sensor 1a to undergo digital conversion to form picture data, a correction section 1c for implementing correction processing such as shading correction or color masking correction, etc. to the picture data from the A/D converter 1b, and an interface 1d connected to the bus line 7.

1-2 [Configuration of the printer unit]

Figure 3:
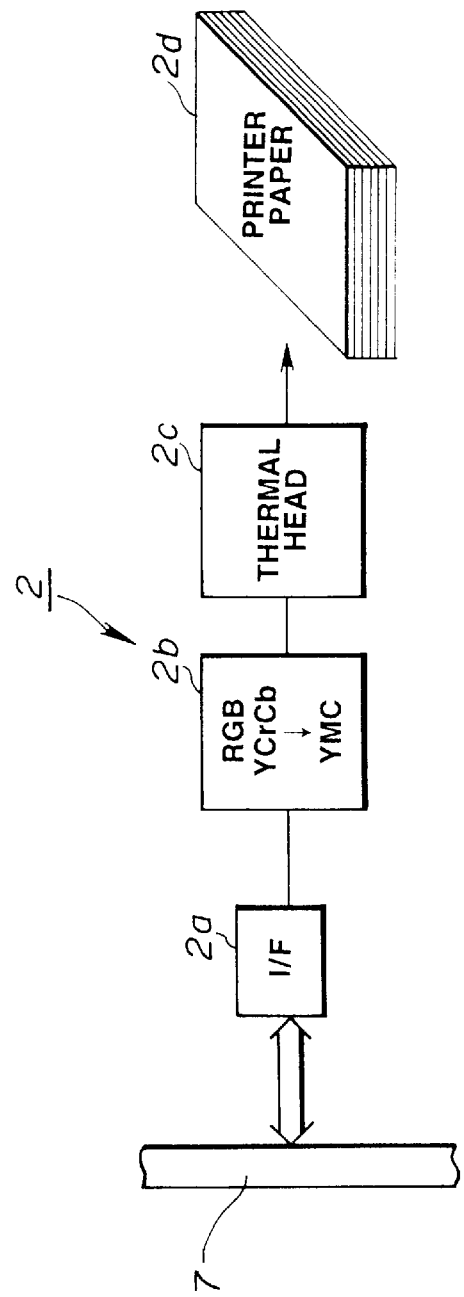
FIG. 3 is a block diagram of printer unit provided in the still picture recording/reproducing system.

The printer unit 2 is composed, as shown in FIG. 3, an interface 2a connected to the bus line 7, a data conversion circuit 2b for implementing data conversion processing suitable for print to the picture data delivered thereto, and a thermal head 2c for carrying out print operation of still picture corresponding to the picture data from the data conversion circuit 2 onto a printer paper 2d.

1-3 [Configuration of the picture processing block]

Figure 4:
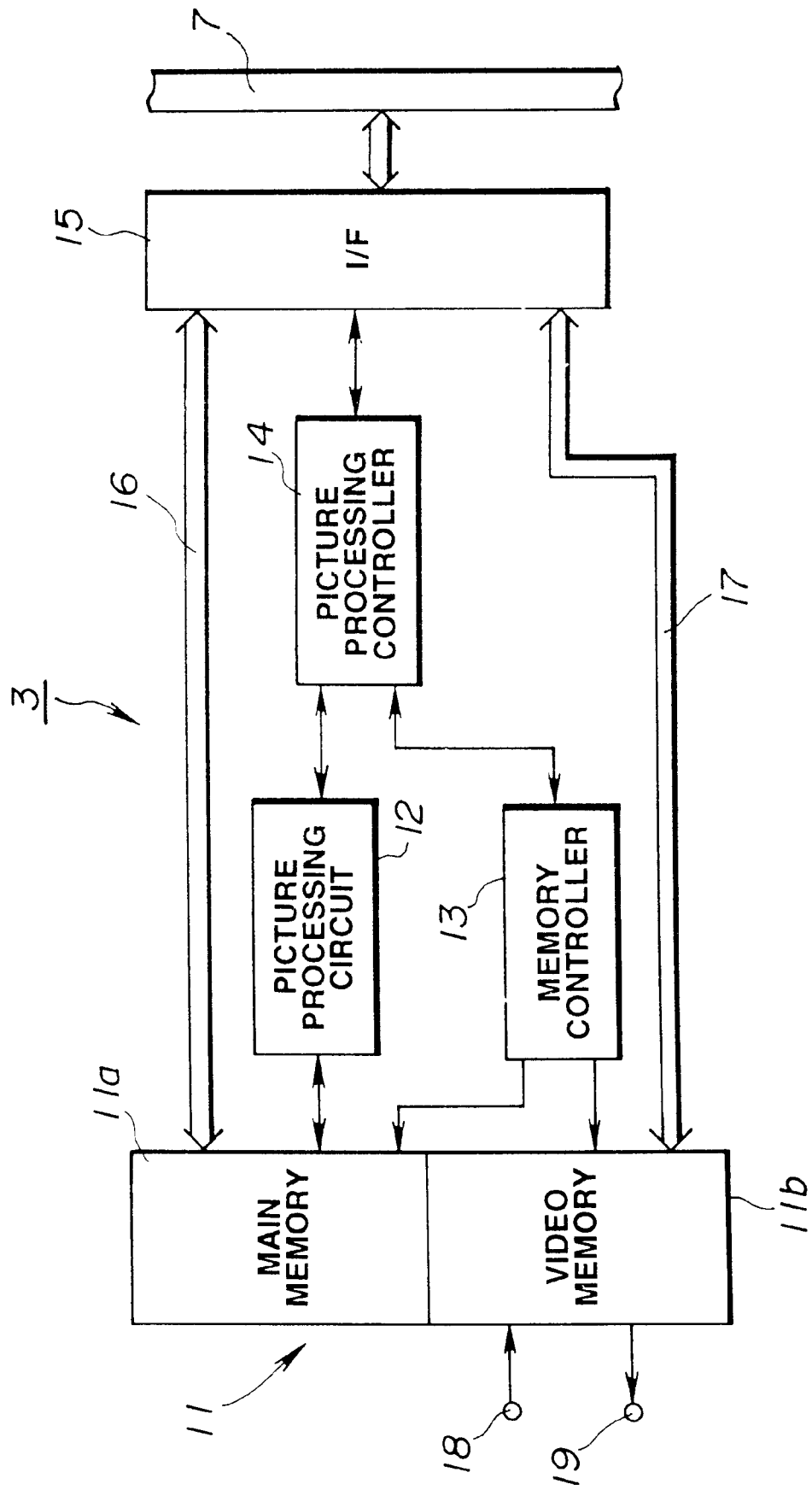
FIG. 4 is a block diagram of picture processing block provided in the still picture recording/reproducing system.

The picture processing block 3 comprises, as shown in FIG. 4, a frame memory 11 composed of a main memory h1a for temporarily storing picture data taken into the still picture recording/reproducing system and a video memory 11b for temporarily storing picture data taken thereinto through the scanner unit 1 or the video input unit 8, etc., and a picture processing circuit 12 for implementing picture processing such as expansion processing or contraction processing, etc. to the picture data which has been read out from the main memory 11a. The picture processing block 3 further includes a memory controller 13 for controlling the frame memory 11, a picture processing controller 14 for controlling picture processing operation in the picture processing circuit 12, and an interface connected to the bus line 7.

More particularly, the frame memory 11 is composed of frame memory for R in which picture data of Red (R) is subjected to read/write operation, frame memory for G in which picture data of Green (G) is subjected to read/write operation, and frame memory for B in which picture data of Blue (B) is subjected to read/write operation.

The frame memories for respective colors are of a structure, from a theoretical point of view, such that eight DRAMs (Dynamic RAMs) in total obtained by stacking four DRAMs in a depth direction in a double line form, each having memory area of 4M bits in which, e.g., the three-dimensional relationship of length, breadth and depth is expressed as 1024 pixels×1024 pixels×4 bits, having memory area of 2048×2048×8 bits. Further, the frame memory 11 is of a structure, from a theoretical point of view, such that the frame memories for respective colors having the memory area of 2048×2048×8 bits are respectively stacked in the order of R, G and B in the depth direction. For this reason, the frame memory 11 has a memory area of 2048×2048×24 bits.

1-4 [Configuration of thinning and contraction/expansion processing block]

Figure 5:
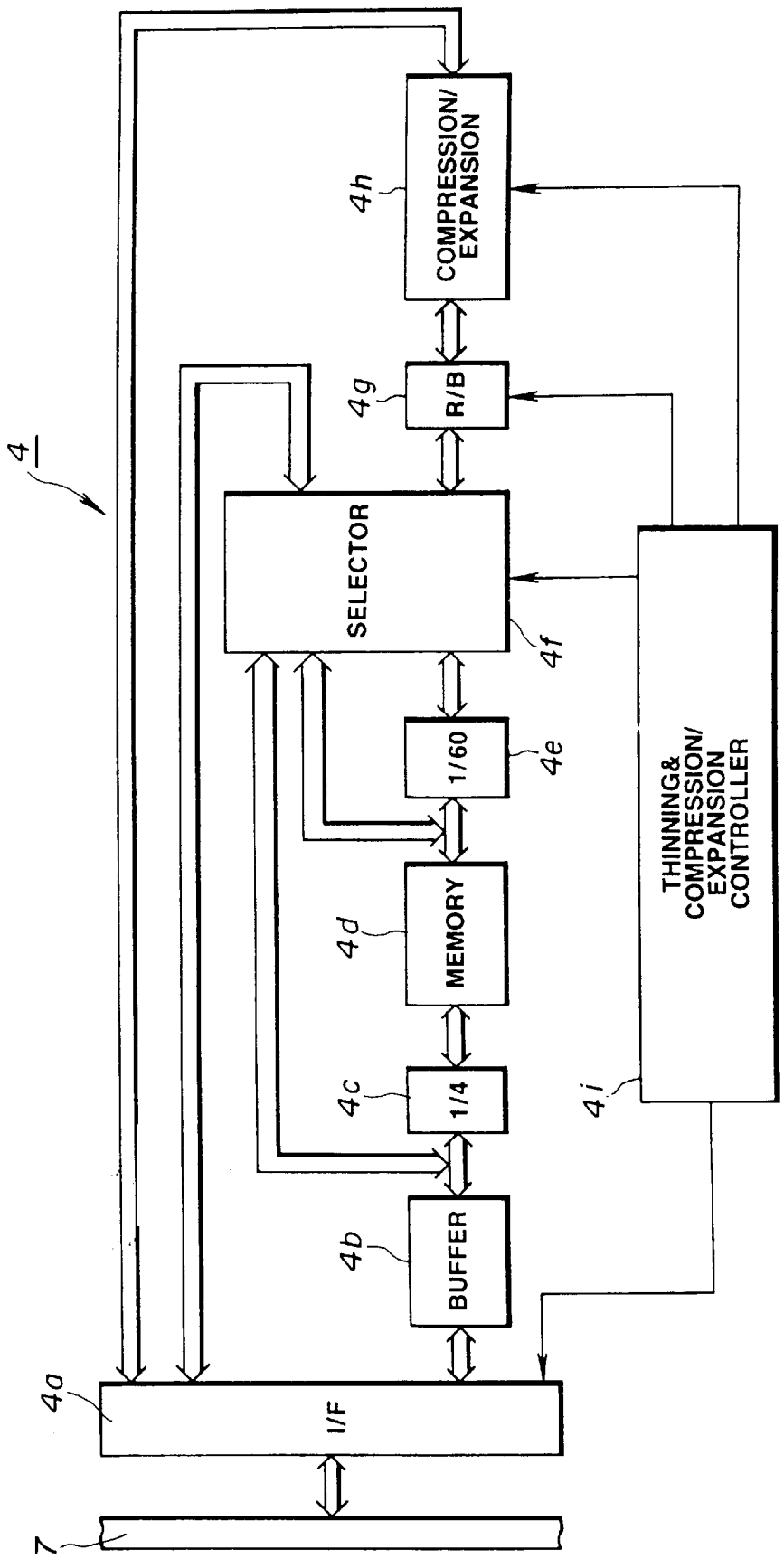
FIG. 5 is a block diagram of thinning and compression/expansion block provided in the still picture recording/reproducing system.

The thinning and contraction/expansion processing block 4 is composed, as shown in FIG. 5, of an interface 4a connected to the bus line 7, a buffer 4b for temporarily storing high resolution picture data delivered through the interface 4a, a ¼ thinning circuit 4c for allowing the high resolution picture data from the buffer 4a to undergo thinning processing into a ¼ to thereby form intermediate resolution picture data, and a memory 4d for temporarily storing the intermediate resolution picture data from the ¼ thinning circuit 4c. Moreover, the thinning and contraction/ expansion block 4 includes a ⅟₆₀ thinning circuit 4e for allowing the intermediate resolution picture data which has been read out from the memory 4d to undergo thinning processing into a ⅟₆₀ to thereby form low resolution picture data, and a selector 4f for selecting any one of the high resolution picture data from the buffer 4b, the intermediate resolution picture data from the ¼ thinning circuit 4c, and the low resolution picture data from the ⅟₆₀ thinning circuit 4e to output a selected one. Further, the thinning and contraction/expansion block 4 includes a raster/block converting circuit 4g for dividing each picture data selected by the selector 4f into blocks of predetermined pixel unit suitable for compression processing, a compression/ expansion circuit 4h for implementing fixed length encoding processing to the picture data blocked (divided into blocks) by the raster/block converting circuit 4g, and a thinning and contraction/expansion controller 4i for controlling the thinning and contraction/expansion processing operation at the thinning and contraction/expansion processing block 4.

1-5 [Configuration of the storage unit]

Figure 6:
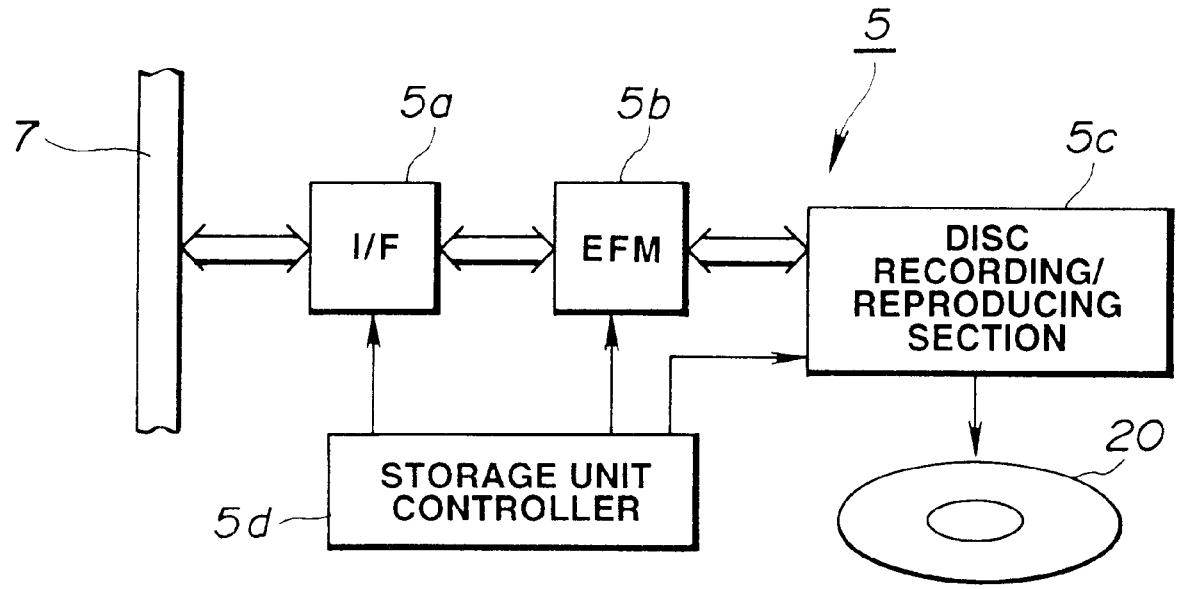
FIG. 6 is a block diagram of storage unit provided in the still picture recording/reproducing system.

The storage unit 5 is composed, as shown in FIG. 6, of an interface 5a connected to the bus line 7, an EFM circuit 5b for implementing 8–14 modulation processing to picture data of respective resolutions from the thinning and compression/expansion processing block 4, a disc recording/ reproducing section 5c for recording and reproducing picture data from the EFM circuit 5b with respect to the optical disc 20, and a storage unit controller 5d for controlling the operation of the entirety of the storage unit 5.

1-6 [Configuration of the video input unit]

Figure 7:
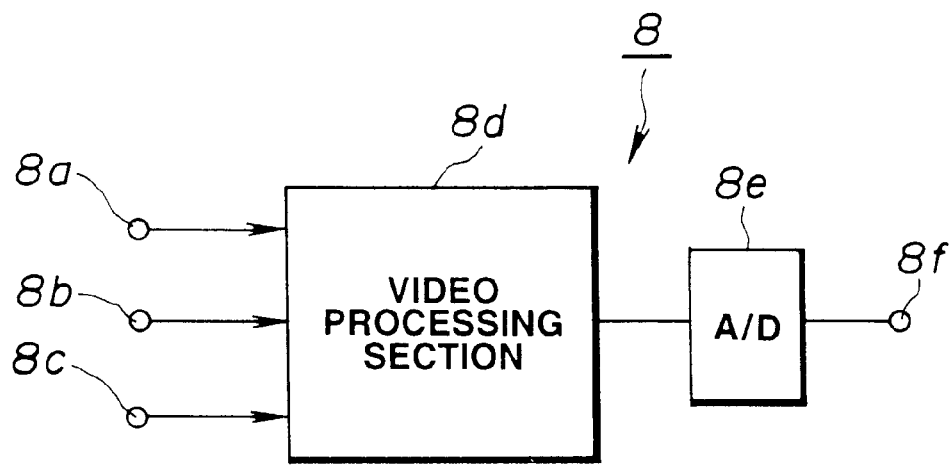
FIG. 7 is a block diagram of video input unit provided in the still picture recording/reproducing system.

The video input unit 8 is composed, as shown in FIG. 7, of an input terminal 8a for composite video signal, an input terminal 8b for video signal delivered in the Y (luminance)/C (chroma) separate format (form), an input terminal 8c for video signal delivered in the RGB format, a video processing section 8d for implementing a processing to carry out conversion into picture size suitable for the still picture recording/reproducing system to the video signals of respective formats delivered through the respective input terminals 8a to 8c, and an A/D converter 8e for converting the respective video signals delivered as an analog signal from the video processing section 8d into digital data to form respective picture data.

1-7 [Configuration of the operation unit]

Figure 8:
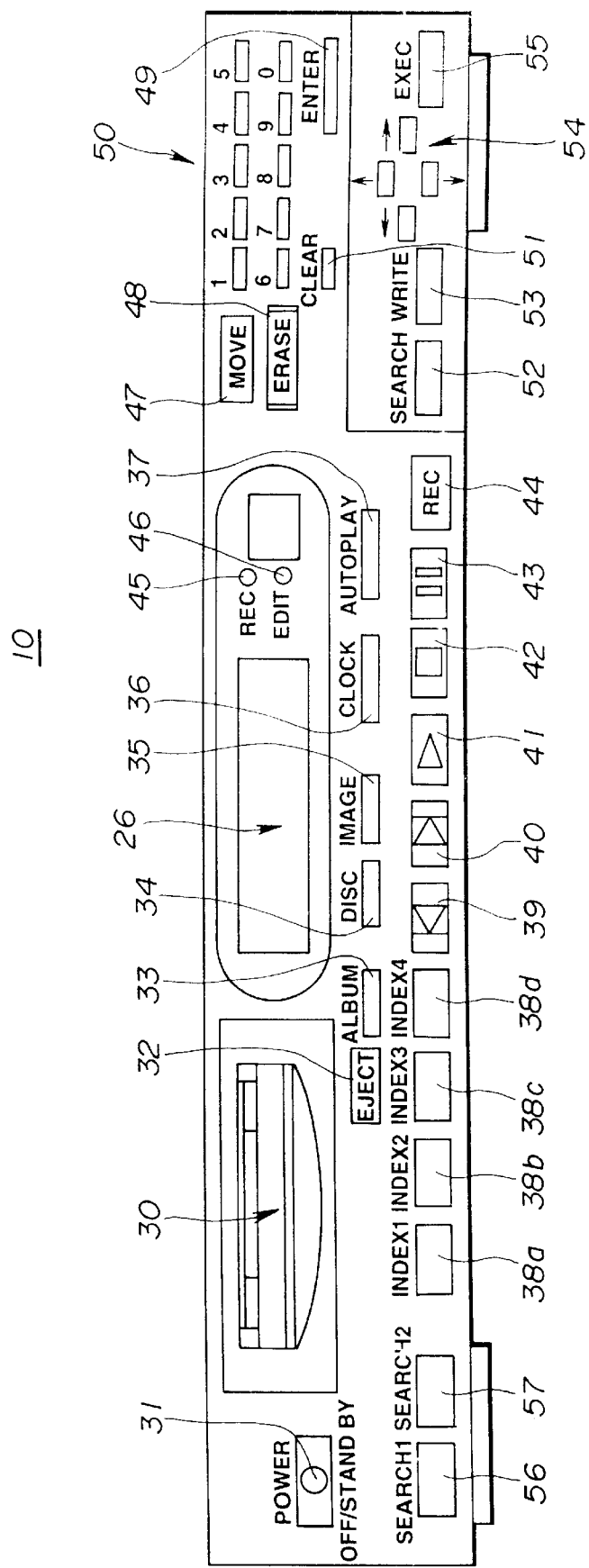
FIG. 8 is a view showing appearance of operation unit provided in the still picture recording/reproducing system.

The operation unit 10 has an appearance as shown in FIG. 8, and has, on the surface panel thereof, a disc insertion hole 30 and a display section 26 formed by a liquid crystal display plate. Moreover, the operation unit 10 includes a power key 31 for turning ON the main power supply of the storage unit 5, an eject key 32 for designating ejection (taking-out) of the optical disc 20 inserted through the disc insertion hole 30, and an album key 33 for carrying out album selection within the disc.

Further, the operation unit 10 includes a disc key 34 for designating the display of disc name and the album name, etc., an image key 35 for designating the display of picture (image) name, key word and recording date, etc., a clock key 36 for designating the display of current date and time, etc., and an automatic play (auto play) key 37 for designating automatic playback (auto play) to automatically play back (reproduce) the picture image of designated album in the order of recording, or to automatically picture images of designated respective albums in a designated order.

Further, the operation unit 10 includes a first index key 38a for designating a first index display to display, e.g., 25 picture images constituting a selected album by one picture, a second index key 38b for designating a second index display to display only the first picture images of respective albums by one picture, a third index key 38c for designating a third index display to display as far as several picture images from the first of respective albums by one picture, and a fourth index key 38d for designating a fourth index display to display picture images of respective albums played back (reproduced) at intervals of predetermined number of picture images by one picture.

Further, the operation unit 10 includes a first album search key 56 for designating a first album search display to display only the leading picture images of respective albums one by one to carry out retrieval of a desired album, a second album search key 57 for designating second album search display to display as far as several picture images from the first of respective albums one by one to carry out retrieval of a desired album, a return key 39 for designating the playback (reproduction) of a picture advanced (in point of time) by one with respect to the current picture, a feed key 40 for designating the playback (reproduction) of a picture retreated (in point of time) by one with respect to the current picture, a playback (reproduction) key for designating the playback (reproduction) of a picture, and a step key 42 for designating the stop of recording playback (reproduction).

Further, the operation unit 10 includes a temporary stop key 43 for designating temporary stop of the automatic playback, a recording designation key 44 for designating recording of a picture, a REC indicator 45 turned ON at the time of recording, an edit indicator 46 turned ON at the time of editing, etc., and a move key 47 used in the case of moving a desired picture to a desired position within corresponding album or to a desired position of any other album.

Further, the operation unit 10 includes an erase key 48 for designating erasing of a recorded picture, an enter key 49 used for the designation of a desired picture in moving the desired picture within a corresponding album or moving it to any other album by using the above-mentioned move key 47, a ten key 50 used in inputting figures (numeric values) or characters, and a clear key 51 for designating erasing of figure or character, etc. inputted by the ten key 50.

Since the above-mentioned respective keys 31 to 51 have high use frequency, those keys are provided in the state where they are all exposed to the surface panel.

In addition, the operation unit 10 includes a retrieval key 52 for designating retrieval of a desired picture, a write key 53 for designating recording of an album name or a picture name, etc., a vertical/horizontal movement key 54 for designating a character, etc. to be inputted, and an EXEC key 55 for designating a recording of character, etc. designated by the vertical/horizontal movement key 54.

These respective keys 52 to 55 are ordinarily covered with the surface cover because they are used for special use purpose, such as, for example, at the time of recording of album name and picture name, etc. As occasion demands, the user uncovers the surface cover to use such keys.

2 [Outline of the recording operation]

The first recording operation of the still picture recording/ reproducing (playback) system as constructed above will now be described.

Initially, in the case where the desired picture data is recorded onto an optical disc 20 of the storage unit 5, the user operates the operation unit 10 to designate the destination of the taking-in of the picture data (scanner unit 1 or video input unit 8), and to set the destination of the output of the picture data which has been taken in to the storage unit 5. Thus, the system controller 6 controls the scanner unit 1 or the video input unit 8 so that it is in operative state.

2-1 [Description of the operation of the scanner unit]

The scanner unit 1 is adapted so that it can read both pictures of reflection type manuscript and transmission type manuscript. In a more practical sense, the scanner unit 1 can read, e.g., photograph of E size, photograph of L size, and photograph of A6 size as the reflection type manuscript, and can read negative film of 35 mm, or Brownie size as the transmission type manuscript. It is to be noted that the scanner unit 1 can read manuscript obtained by allowing, negative film of the 35 mm, or Brownie size to undergo print at the original size. When the film or photograph, etc. is mounted on the manuscript reading table, the scanner unit 1 reads this manuscript by scanning CCD line sensor 1a shown in FIG. 2. The CCD line sensor 1a forms a picture signal corresponding to the picture which has been read to deliver it to A/D converter 1b. The A/D converter 1b digitizes the picture signal delivered from the CCD line sensor 1a to thereby form picture data to deliver it to correction system 1c. For example, in the case where picture has been read from the 35 mm film, the correction system 1c corrects this picture data so that there is provided picture data of size (dimensions) of 1200 pixels×1700 pixels as the size (dimensions) of length×breadth to output the corrected picture data.

Moreover, in the case where manuscripts to be read are film of Brownie size, photograph of E size, photograph of L size, and photograph of A6 size, the scanner unit 1 respectively makes corrections into picture data of sizes of 1298 pixels×975~1875 pixels, 1050 pixels×1450 pixels, 1120 pixels×1575 pixels, and 1325 pixels×1825 pixels to output corrected picture data.

2-2 [Description of the operation of the video input unit]

The video input unit 8 is adapted as shown in FIG. 7 so that, e.g., video signals of three formats of composite video signals, video signals delivered in the Y (luminance)/C (chroma) separate format, and video signals delivered in the format of RGB from video tape recorder equipment, etc. can be inputted thereto. These video signals are delivered to video processing system 8d through input terminals 8a to 8c, respectively.

The video processing system 8d changes pixels of the video signals of the respective formats into pixels of cubic lattice, and makes a change such that their pixel sizes have 480 pixels×640 pixels to deliver them to A/D converter 8e. The A/D converter 8e digitizes the video signals to thereby form picture data corresponding to the video signals of the respective formats to output them through output terminal 8f.

2-3 [Description of the operation of the picture processing block]

Picture data formed by the scanner unit 1 or the video input unit 2 are picture data of high resolution such that, e.g., the dimensional relationship between length and breadth is expressed as 1024 pixels×1536 pixels, and are delivered to video memory 11b within frame memory 3 through input terminal 18 of the picture processing block 3 shown in FIG. 4.

The memory controller 13 is operative so that when picture data of high resolution is delivered to the video memory 11b, it carries out write-in control and read-out control so as to temporarily store such picture data and to read out the stored picture data of high resolution. This high resolution picture data is transferred to thinning and compression/expansion processing block 4 through data line 17, interface 15, bus line 7 and data line 16 in order, and is transferred to main memory 11a. The memory controller 13 carries out write-in control of the main memory 11a so as to temporarily store the high resolution picture data which has been transferred to the main memory 11a.

When the high resolution picture data is stored into the main memory 11a, the picture processing controller 14 controls the picture processing circuit 12 and the memory controller 13 so as to convert the high resolution picture data into, e.g., picture data of intermediate resolution for monitor display of 480 pixels×640 pixels. Thus, the high resolution picture data is read out from the main memory 11a by read-out control of the memory controller 13, and is delivered to the picture processing circuit 12. Then, the high resolution picture data is converted into intermediate resolution picture data by the picture processing circuit 12, and is delivered to the video memory 11b through the data line 16, the interface 15, the bus line 7 and the data line 17. The memory controller 13 is operative so that when the intermediate resolution picture data is delivered to the video memory 11b, it allows the video memory 11b to undergo write-in control so as to temporarily store such picture data and allows the video memory 11b to undergo read-out control so as to read out it. Thus, the intermediate resolution picture data stored in the video memory lib is read out, and is then delivered to monitor unit 9 shown in FIG. 1 through output terminal 19.

The intermediate resolution picture data delivered to the monitor unit 9 is converted into picture data in analog form by a D/A converter so that a picture signal for monitor display of intermediate resolution is provided. Thus, the picture image which has been taken in by the scanner unit 1 or the video input unit 8 is displayed on the monitor unit 9.

In this example, the picture processing controller 14 shown in FIG. 4 is operative so that in the case of picture processing such as expansion processing or contraction processing, etc. of picture which has been taken in by the scanner unit 1 or the video input unit 8, it controls the picture processing circuit 12 so that the designated picture processing is implemented to the picture data which has been read out from the main memory 11a. The picture data to which the designated picture processing has been implemented by the picture processing circuit 12 is delivered to the monitor unit 9. Thus, the picture to which the designated picture processing has been implemented is displayed on the monitor unit 9. In addition, the picture processing controller 14 delivers data indicating picture processing implemented to the picture data (picture processing information) to the thinning and compression/expansion processing block 4 through the interface 15 and the bus line 7.

2-4 [Description of the operation of the thinning and compression/expansion processing block]

Then, the user confirms by the picture image displayed on the monitor unit 9 as to whether or not the corresponding picture image is the desired one, whereby in the case where the corresponding picture image is the desired one, the user operates the recording designation key 44 of the operation unit 10 shown in FIG. 8 to designate recording of the picture image displayed on the monitor unit 9.

The system controller 6 shown in FIG. 1 is operative so that when the recording designation key 4 is caused to undergo awn ON operation, it detects this operation to deliver data indicating that designation of the recording has been made and the picture processing information, in the case where such information exists, to the thinning and compression/expansion controller 4i of the compression/ expansion processing block 4 through the bus line 7 and the interface 4a shown in FIG. 5.

The thinning and compression/expansion controller 4i is operative so that in the case where the picture processing information exists, it controls the interface 4a so as to temporarily store such data and to carry out taking-in of the high resolution picture data. When the high resolution picture data is taken into the thinning and compression/expansion processing block through the interface 4a, it is temporarily stored into the buffer 4b. When the high resolution picture data is stored into the buffer 4b, the thinning and contraction/expansion controller 4i allows the buffer 4b to undergo read-out control so as to deliver the high resolution picture data to the ¼ thinning circuit 4c and the selector 4f, e.g., every line.

The ¼ thinning circuit 4c implements a thinning processing such that (the number of) pixels of the high resolution picture data is reduced to one fourth (¼) to thereby form intermediate resolution picture data of 480 pixels×640 pixels to deliver it to the memory 4d. The thinning and compression/expansion controller 4i is operative so that when the intermediate resolution picture data is delivered to the memory 4d, it controls the memory 4d so as to temporarily store such picture data and to read out it. The intermediate resolution picture data which has been read out from the memory 4d is delivered to the ⅙₀ thinning circuit 4e and the selector 4f.

The ⅙₀ thinning circuit 4e implements a thinning processing such that (the number of) pixels of the intermediate resolution picture data which has been read out from the memory 4d is reduced to one sixtieth (⅙₀) to thereby form low resolution picture data of 60 pixels×80 pixels (picture data for index) to deliver it to the selector 4f.

The selector 4f is subject to switching control by the thinning and compression/expansion controller 4i. Namely, the thinning and compression/expansion controller 4i allows the selector 4f to undergo switching control, e.g., so as to select picture data of respective resolutions delivered to the selector 4f in the order of high resolution picture data, intermediate resolution picture data and low resolution picture data to output the selected one. The picture data of respective resolutions from the selector 4f are delivered to the raster/block converting circuit 4g.

The raster/block converting circuit 4g divides the respective picture data into, e.g., processing block units of 8 pixels×8 pixels which are processing unit of compression encoding to deliver them to the compression/expansion circuit 4h.

As stated above, the picture data of respective resolutions are divided into processing block units of 8 pixels×8 pixels at the raster/block converting circuit 4g. In this case, the low resolution picture data has picture size of 60 pixels×80 pixels. For this reason, when attempt is made to divide the low resolution picture data into processing block units of 8 pixels×8 pixels, because the number of pixels in a longitudinal direction cannot be divided by eight (8), it is impossible to divide the low resolution picture data in the processing block units of 8 pixels×8 pixels. As described above, the raster/block converting circuit 4g is operative so that when the low resolution picture data is delivered thereto, it adds dummy data of 4 pixels×80 pixels to the upper row (line) side or the lower row (line) side to thereby allow the low resolution picture data of 60 pixels×80 pixels to be low resolution picture data of 64 pixels×80 pixels. By such processing, the number of pixels in the longitudinal direction can be divided by eight (8). Thus, the raster/block converting circuit 4g divides the low resolution picture data of 64 pixels×80 pixels into 8 processing blocks and 10 processing blocks to deliver them to the compression/expansion circuit 4h. It is to be noted that since the dummy data is eliminated in the index display, there is no possibility that pictures according to the dummy data (e.g., black pictures or white pictures) are displayed in the state added to the index picture.

The compression/expansion circuit 4h is composed of a Discrete Cosine Transform circuit (DCT circuit), a quantizing circuit, and a fixed length encoding circuit which are not shown. Accordingly, the picture data of respective resolutions are first delivered to the DCT circuit.

The DCT circuit carries out orthogonal transform processing to transform the picture data of respective resolutions into picture data on the frequency base to form DCT coefficients, thus to deliver, to the quantizing circuit, those picture data of respective resolutions to which the orthogonal transform processing has been implemented.

The quantizing circuit carries out quantization processing of the picture data of respective resolutions by using, e.g., suitable quantization coefficients set by the system controller 6 to deliver quantized picture data to the fixed length encoding circuit.

The fixed length encoding circuit implements fixed length encoding processing to DCT coefficients of the picture data of respective resolutions quantized by the suitable quantization coefficients to feed the result of fixed length encoding processing back to the thinning and compression/expansion controller 4i. The thinning and compression/expansion controller 4i forms quantization coefficients optimum for quantizing that picture data in accordance with the result of the fixed length encoding processing to deliver them to the quantizing circuit. The quantizing circuit carries out quantization of the picture data by using the optimum quantization coefficients set for the second time to deliver it to the fixed length encoding circuit. Thus, at the fixed length encoding circuit, picture data of respective resolutions are permitted to undergo fixed length encoding so that they have predetermined data length.

In a more practical sense, by such compression encoding processing, the picture data of intermediate resolution is caused to undergo fixed length encoding processing so that it has data length of 2 clusters twice greater than one cluster which is one recording unit, the picture data of high resolution is caused to undergo fixed length encoding processing so that it has data length of 8 clusters, and the picture data of low resolution is caused to undergo fixed length encoding processing so that it has data length of ⅒₅ clusters. The picture data of respective resolutions which have been caused to undergo fixed length encoding in this manner are delivered to the storage unit 5 shown in FIG. 6 through the interface 4a and the bus line 7. In addition, in the case where picture processing information is added to the delivered picture data as described above, the thinning and compression/expansion controller 4i delivers the picture processing information to the storage unit 5 along with the picture data of respective resolutions.

2-5 [Description of the operation of the storage unit]

Picture data of respective resolutions and picture processing information from the thinning and compression/expansion processing block 4 are delivered to the interface 5a of FIG. 6. The storage unit controller 5d is operative so that when the picture data of respective resolutions and the picture processing information are delivered to the interface 5a, it controls the interface 5a so as to take them into the storage unit 5. The picture data of respective resolutions and the picture processing information which have been taken into the storage unit 5 through the interface 5a are delivered to the EFM circuit 5b. When the picture data of respective resolutions and the picture processing information are delivered to the EFM circuit 5b, the storage unit controller 5d controls the EFM circuit 5b so as to implement a so called EFM processing (8–14 modulation processing) to the picture data of respective resolutions and the picture processing information which have been caused to undergo fixed length encoding. The picture data of respective resolutions and the picture processing information which have been caused to undergo EFM processing are delivered to the disc recording/reproducing section 5c. When the picture data of respective resolutions and the picture processing information are delivered to the disc recording/reproducing section 5c, the storage unit controller 5d controls the disc recording/reproducing section 5c so as to record the picture data of respective resolutions and the picture processing information onto the optical disc 20. Thus, the picture data of respective resolutions and the picture processing information thereof are recorded onto the optical disc 20.

In a more practical sense, the optical disc 20 is, e.g., a magneto-optical disc having a diameter of 64 mm, and is adapted so that picture data corresponding to 200 pictures can be recorded at every respective resolution. Further, the picture data corresponding to 200 pictures are caused to undergo management in the state divided into four albums in total with 50 picture data being one album. Accordingly, in the case where user carries out recording of such picture data, he selects an album on which the corresponding picture data is recorded by using the operation unit 10. Thus, the system controller 6 controls the disc recording/reproducing section 5c through the storage unit controller 5d so as to record, in the order of taking-in, the picture data of respective resolutions onto the album selected by the user.

It is to be noted that, in this instance, the picture data of low resolution are recorded as picture for index for displaying a plurality of pictures recorded on the album within one picture on screen, the picture data of intermediate resolution are recorded as picture for monitor display for displaying a desired one picture recorded on the album, and the picture data of higher resolution are recorded as picture for print for carrying out print of picture corresponding thereto.

3 [Description of the first recording operation]

Outline of the recording operation has been described as above. Explanation will be given in more detail in the state where the recording operation is classified into the first to third recording operations. Initially, the first recording operation will be carried out by the procedure as indicated by the flowchart of FIG. 9.

Figure 9:
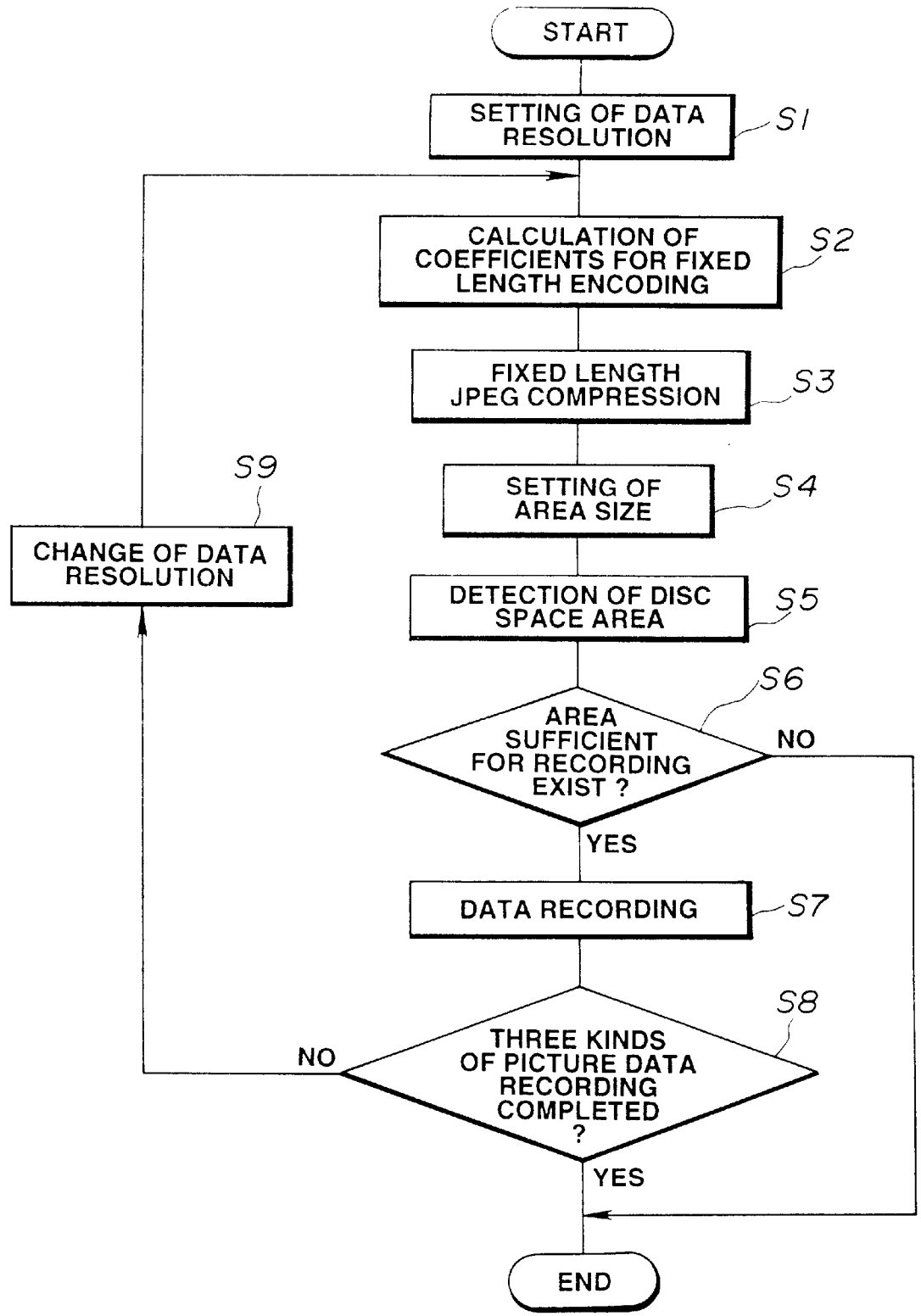
FIG. 9 is a flowchart for explaining first recording operation of the still picture recording/reproducing system.

When the system controller 6 shown in FIG. 1 detects designation of recording of a picture data by the user, the processing operation indicated by the flowchart shown in FIG. 9 starts to proceed to step S1.

At the step S1, the thinning and contraction/expansion controller 4i shown in FIG. 5 first allows the selector 4f to undergo switching control so as to select the picture data of high resolution. Thus, the processing operation proceeds to step S2.

At the step S2, the thinning and compression/expansion controller 4i sets, at the compression/expansion circuit 4h, quantization coefficients, etc. used at the compression/expansion circuit 4h. Thus, the processing operation proceeds to step S3.

At the step S3, the thinning and compression/expansion controller 4i controls the compression/expansion circuit 4h so as to implement the above-described fixed length encoding processing to the high resolution picture data to thereby allow the high resolution picture data to undergo fixed length encoding into data length corresponding to eight clusters. Thus, the processing operation proceeds to step S4.

At the step S4, the compression/expansion controller 4i sets the area size of high resolution picture data caused to undergo recording (corresponding to 8 clusters in total of 1024 pixels×1536 pixels). Thus, the processing operation proceeds to step S5.

At the step S5, the thinning and compression/expansion controller 4i forms retrieval data which makes a request for the retrieval of the recording area sufficient for allowing the picture data of high resolution corresponding to 8 clusters to be recorded to deliver it to the storage unit controller 5d of the storage unit 5. When the retrieval data is delivered, the storage unit controller 5d control the disc recording/reproducing section 5c so as to carry out retrieval of space area corresponding to the 8 clusters. Further, the storage unit controller 5d is operative so that in the case where the space area corresponding to eight clusters exists, it delivers data indicating existence of the space area to the thinning and contraction/expansion controller 4i, while in the case where the area corresponding to eight clusters does not exist, it delivers, to the compression/expansion controller 4i, data indicating that the space area does not exist. Thus, the processing operation proceeds to step S6.

At the step S6, the thinning and contraction/expansion controller 4i discriminates on the basis of data indicating presence or absence of the space area from the storage unit controller 5d whether or not space area corresponding to eight clusters exists on the optical disc 20. As a result, in the case of No, the routine shown in FIG. 9 is completed as it is. In the case of YES, the processing operation proceeds to step S7. In this example, in the case where the space area is not detected and the routine shown in FIG. 9 is completed as it is, the storage unit controller 5d delivers, to the system controller 6, data indicating that no space area exists. Then, display section 26 of the operation unit 10 is controlled by the system controller 6 so as to display message, e.g., "There is no space area permitting data to be recorded", etc. Thus, the user can take a suitable measure to substitute a new optical disc for the optical disc loaded at present.

At the step S7, the thinning and compression/expansion controller 4i delivers high resolution picture data to the disc recording/reproducing section 5c along with the picture processing information. Then, the storage unit controller 5d controls the disc recording/reproducing section 5c so as to record the high resolution picture data onto the optical disc. 20. Thus, the processing operation proceeds to step S8.

At the step S8, the thinning and contraction/expansion controller 4i discriminates whether or not three kinds of picture data of the high, intermediate and low resolution picture data are all recorded. In the case of YES, the processing operation is completed as it is. In the case of No, the processing operation proceeds to step S9.

At this time point, since only recording of the picture data of high resolution has been completed, at the step S8, the discrimination result of No is provided. Thus, the processing operation proceeds to step S9. At the step S9, the compression/expansion controller 4i allows the selector 4f to undergo switching control so as to subsequently select the picture data of intermediate resolution. Thus, the processing operation returns to the step S2.

At a time subsequent thereto, at the step S2, by the compression/expansion controller 4i, quantization coefficients, etc. caused to undergo fixed length encoding into 2 clusters are calculated. At the step S3, fixed length encoding processing is carried out on the basis of the calculated quantization coefficients, etc. Thus, intermediate resolution picture data of fixed data length of two clusters are formed. Then, at the steps S4 to S7, space area is detected. The intermediate resolution picture data of 2 clusters are recorded into the space area.

At this point, recording operations of the high resolution picture data and the intermediate resolution picture data are completed. For this reason, at step S8, the discrimination result No is provided. Thus, the processing operation returns to the step S9.

At the step S9, the thinning and compression/expansion controller 4$i$ allows the selector 4$f$ to undergo switching control so as to subsequently select the low resolution picture data. Thus, the processing operation returns to the step S2.

At a time subsequent thereto, at the step S2, by the system controller 6, quantization coefficients for carrying out fixed length encoding into $\frac{1}{15}$ clusters are calculated. At the step S3, fixed length encoding is carried out on the basis of the calculated quantization coefficients, etc. Thus, picture data of low resolution of fixed data length of $\frac{1}{15}$ clusters are formed. Then, at the steps S4 to S7, space area is detected. Thus, the low resolution picture data of $\frac{1}{15}$ clusters are recorded into the space area.

At this time point, recording operations of picture data of respective resolutions are all completed. For this reason, at the step S8, the discrimination result of YES is provided. Thus, recording is thus completed.

As stated above, such an approach is employed to form picture data of intermediate resolution and picture data of low resolution on the basis of the picture data of high resolution which has been read out from the frame memory 3 to record picture data of different resolution of the same picture onto the optical disc 20, thereby making it possible to select picture data of resolution corresponding to output equipment or use purpose of picture data to reproduce it.

Namely, when only the picture data of high resolution is recorded as picture data recorded onto the optical disc 20, in the case where picture image is displayed on the monitor unit 9, the number of pixels is too many in the case of the picture data of high resolution. For this reason, suitable thinning processing is implemented thereto to deliver the data thus processed to the monitor unit. However, such an approach is employed to record three kinds of picture data as described above, thereby making it possible to directly read out picture data of intermediate resolution for monitor. For this reason, the time required until picture data is displayed on the monitor unit 9 can be reduced.

Moreover, since picture data of necessary resolution can be directly read out, there is no necessity of carrying out thinning processing, etc. in dependency upon equipment. Thus, circuit for such thinning processing, etc. can be omitted.

Further, since the two kinds of picture data are formed on the basis of picture data of high resolution from the frame memory 3, the time required for taking in picture data can be reduced to more degree in the case where the three kinds of picture data are separately delivered. In addition, since the frame memory 3 is only required to once undergo read-out control, constraint time of the frame memory 3 can be shortened.

Further, since the picture data of respective resolutions are recorded after having respectively undergone fixed length encoding, recording and read-out times can be fixed and the number of pictures to be recorded can be fixed. In addition, since data size to be handled is fixed, the configuration of the file management system can be simplified.

When the picture data of respective resolutions are recorded into the suitable space area, the picture data of respective resolutions are recorded at random on the optical disc 20. The specification of the storage unit 5 is such that, e.g., minimum recording unit is 1 cluster (64 K bytes), data recording rate (speed) is 150 K bytes/sec., recording time per each cluster is 64 K/150K≈0.43 sec., and the maximum seek time is 0.5 sec. The maximum seek time is longer than the recording time per each cluster. For this reason, when picture data of respective resolutions are recorded at random on the optical disc 20, desired picture data is caused to undergo recording/reproduction after several times of seek operations are carried out. For this reason, it takes a lot of time in recording/reproduction.

In addition, when picture data of respective resolutions are recorded at random, in the case where erasing/editing work, etc. for picture data is carried out, space areas of data sizes corresponding to respective resolutions take place on the disc. For this reason, search for space area becomes difficult.

4 [Description of the second recording operation]

In the second recording operation, in recording picture data of respective resolutions onto optical disc 20, picture data are respectively recorded into predetermined recording areas in a divided manner for every picture data of respective resolutions.

Figure 10:
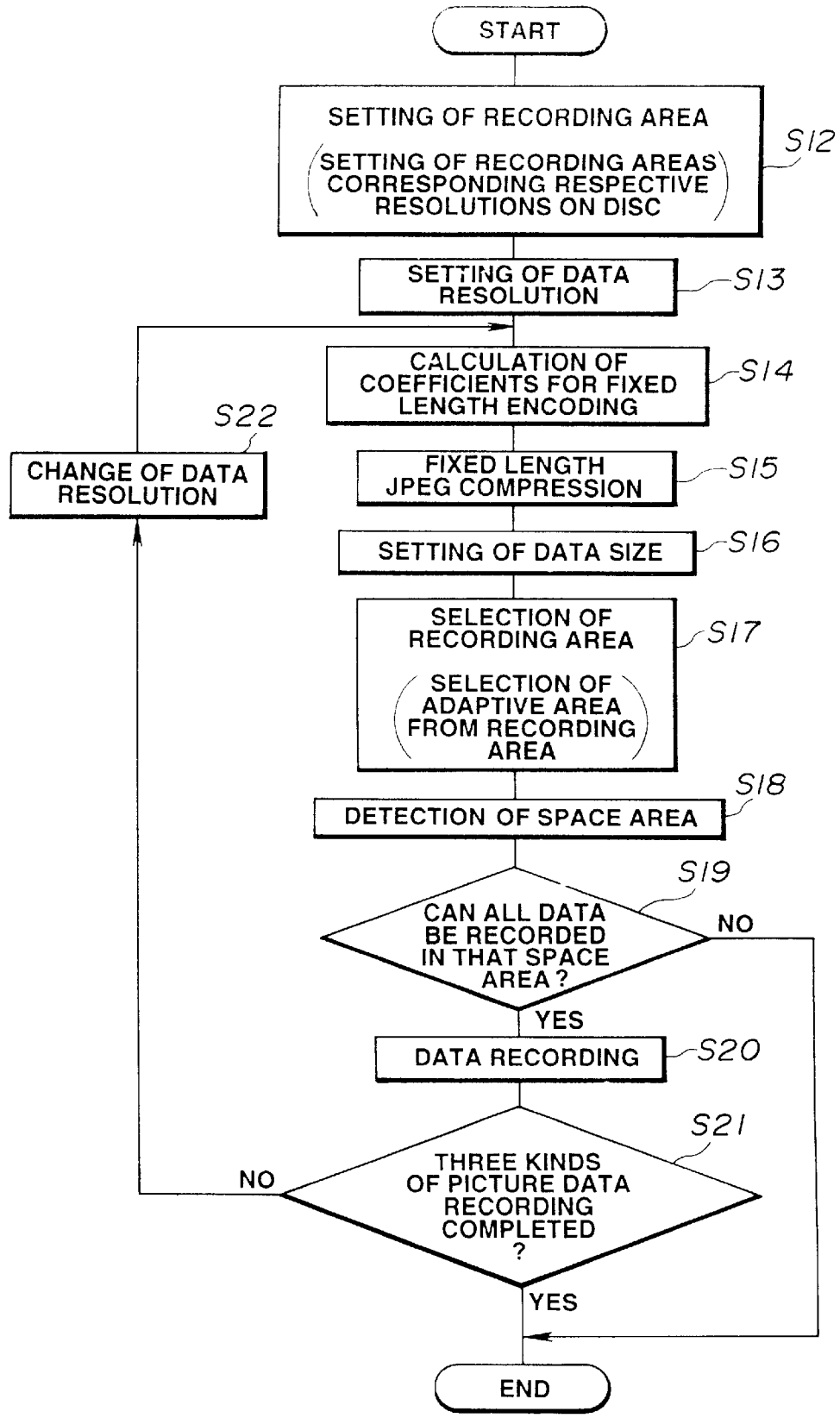
FIG. 10 is a flowchart for explaining second recording operation of the still picture recording/reproducing system.
Figure 11:
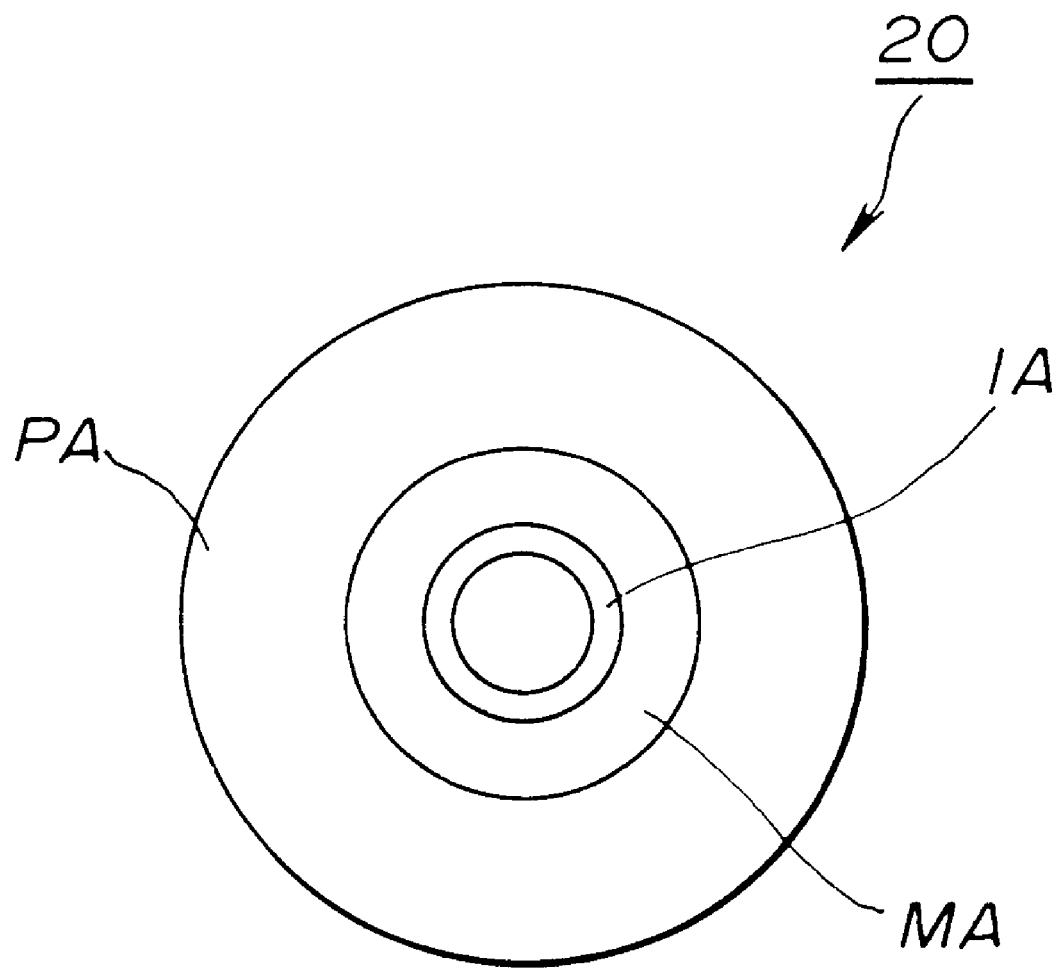
FIG. 11 is a model view for explaining recording area every picture data of respective resolutions formed on optical disc by the second recording operation.

Namely, the second recording operation is as indicated by the flowchart of FIG. 10. When the system controller 6 detects designation of recording of picture data by the user, the processing operation indicated by the flowchart starts to proceed to step S12. The entire recording area of the optical disc 20 corresponds to, e.g., 2200 clusters. For this reason, the storage unit controller 5$d$ of the storage unit 5 divides the recording area of the optical disc 20, as shown in FIG. 11, from the inner circumferential side to the outer circumferential side, three areas of recording area IA of picture data of low resolution corresponding to 14 clusters, recording area MA of picture data of intermediate resolution corresponding to 200 clusters and recording area PA of picture data of high resolution corresponding to 1800 clusters to recognize respective recording areas IA, MA, PA. Thus, the processing operation proceeds to step S13. At a time subsequent thereto, the storage unit controller 5$d$ controls the disc recording/reproducing section 5$c$ on the basis of recording areas IA, MA, PA of the respective picture data thus recognized.

At the step S13, the selector 4$f$ is caused to undergo switching control so as to select the picture data of high resolution through the compression/expansion controller 4$i$. Thus, the processing operation proceeds to step S14.

At the step S14, the thinning and compression/expansion controller 4$i$ sets, at the compression/expansion circuit 4$h$, quantization coefficients, etc. used in the compression/expansion circuit 4$h$. Thus, the processing operation proceeds to step S15.

At the step S15, the thinning and contraction/expansion controller 4$i$ controls the compression/expansion circuit 4$h$ so as to implement the above-described fixed length encoding processing to the picture data of high resolution to thereby allow the picture data of high resolution to undergo fixed length encoding into data length corresponding eight clusters. Thus, the processing operation proceeds to step S16.

At the step S16, the storage unit controller 5$d$ controls the disc recording/reproducing section 5$c$ so as to set the data size corresponding to eight clusters. Thus, the processing operation proceeds to step S17.

At the step S17, the storage unit controller 5d sets, at the disc recording/reproducing section 5c, recording area PA of the picture data of high resolution. Thus, the processing operation proceeds to step S18.

At the step S18, the storage unit controller 5d controls the disc recording/reproducing section 6c so as to detect space area of the optical disc 20 on the basis of the data size and the recording area which have been set. Thus, the processing operation proceeds to step S19.

At the step S19, the storage unit controller 5d discriminates as to whether or not the high resolution picture data corresponding to eight clusters can be all recorded in the space area detected at the step S18. In the case of NO, this routine is completed as it is. In the case of YES, the processing operation proceeds to step S2. In this example, in the case where no space area is detected and the routine shown in FIG. 10 is completed as it is, the display section 26 of the operation unit 10 is controlled by the system controller 6 so that the storage section controller 5d delivers, to the system controller 6, data indicating that there is no space area to display message indicating that, ,e.g., "there is no space area sufficient to permit data to be recorded", etc. Thus, the user can take a measure to substitute a new optical disc for the optical disc loaded at present, etc.

At the step S20, the storage unit controller 5d controls the disc recording/reproducing section 5c so as to record the picture data of high resolution corresponding to eight clusters into the space area on the optical disc 20 detected at the steps S18, S19. Thus, the processing operation proceeds to step S21.

At the step S21, the storage unit controller 5d discriminates whether or not three kinds of picture data of picture data of high, intermediate and low resolutions are all recorded. In the case of YES, the processing operation is completed as it is. In the case of No, the processing operation proceeds to step S22.

At this time point, since only recording operation of the picture data of high resolution is completed, at the step S21, discrimination result of No is provided. Thus, the processing operation proceeds to step S22.

At the step S22, the thinning and compression/expansion controller 4i allows the selector 4f to undergo switching control so as to subsequently select the intermediate resolution picture data. Thus, the processing operation returns to the step S14.

At a time subsequent thereto, at step 14, quantization coefficients, etc. for carrying out fixed length encoding into two clusters are calculated. At step S15, fixed length encoding processing is carried out on the basis of the calculated quantization coefficients, etc. Thus, picture data of intermediate resolution of fixed data length of two clusters are formed. Then, at the steps S16 to S20, data size and recording area MA of picture data of intermediate resolution are set. Then, corresponding space is detected. The picture data of intermediate resolution of data length of two clusters are recorded into the corresponding space area.

At this time point, recording operations of the picture data of high resolution and picture data of intermediate resolution have been completed. For this reason, at the step S21, the discriminating result of No is provided. Thus, the processing operation returns to the step S22.

At the step S22, the thinning and compression/expansion controller 4i allows the selector 4f to undergo switching control so as to subsequently select the low resolution picture data. Thus, the processing operation returns to the step S14.

At a time subsequent thereto, at the step S14, quantization coefficients, etc. for carrying out fixed length encoding into $1/15$ clusters are calculated. At step S15, fixed length encoding processing is carried out on the basis of the calculated quantization coefficients, etc. Thus, picture data of low resolution of fixed data length of $1/15$ clusters are formed. Then, at the steps S16 to S20, data size and recording area IA of picture data of low resolution are set. Then, corresponding space area is detected. Thus, the picture data of low resolution of data length of $1/15$ clusters are recorded into the corresponding space area.

At this point, recording operations of the picture data of respective resolutions have been all completed. For this reason, at the step S21, discrimination result of YES is provided. Thus, the recording operation is completed.

As stated above, the recording area on the optical disc is divided into three recording areas in dependency upon data quantities of picture data of respective resolutions to record picture data of respective resolutions which have been caused to undergo fixed length encoding into the respective recording areas IA, MA, PA. Accordingly, it is sufficient to seek for the recording area of corresponding resolution at the time of recording/reproduction to carry out recording/reproduction. For this reason, the recording/reproduction time can be shortened.

Moreover, even if space areas of the data size corresponding to respective resolutions take place on the disc as the result of the fact that erasing/editing work for picture data, etc. is carried out, picture data of the same data size are recorded into the corresponding areas. For this reason, retrieval of space area can be facilitated. This can contribute to reduction of the recording time.

Meanwhile, even if such an approach is employed to carry out division into recording areas of respective resolutions to record picture data thereinto, if they are not recorded in the order of reproduction (playback) within the recording area, in the case where there is a need for of continuously reading out pictures, such as, for example, at the time of automatic play for automatically reading out recorded pictures successively one by one, or at the time of browsing in which the automatic playback is carried out at high speed, it also takes much time.

5 [Description of the operation]
of the third recording operation

In view of the above, in the third recording operation, picture data of respective resolutions are recorded, successively in the order of reproduction (playback), into respective divided recording areas of the optical disc.

Figure 12:
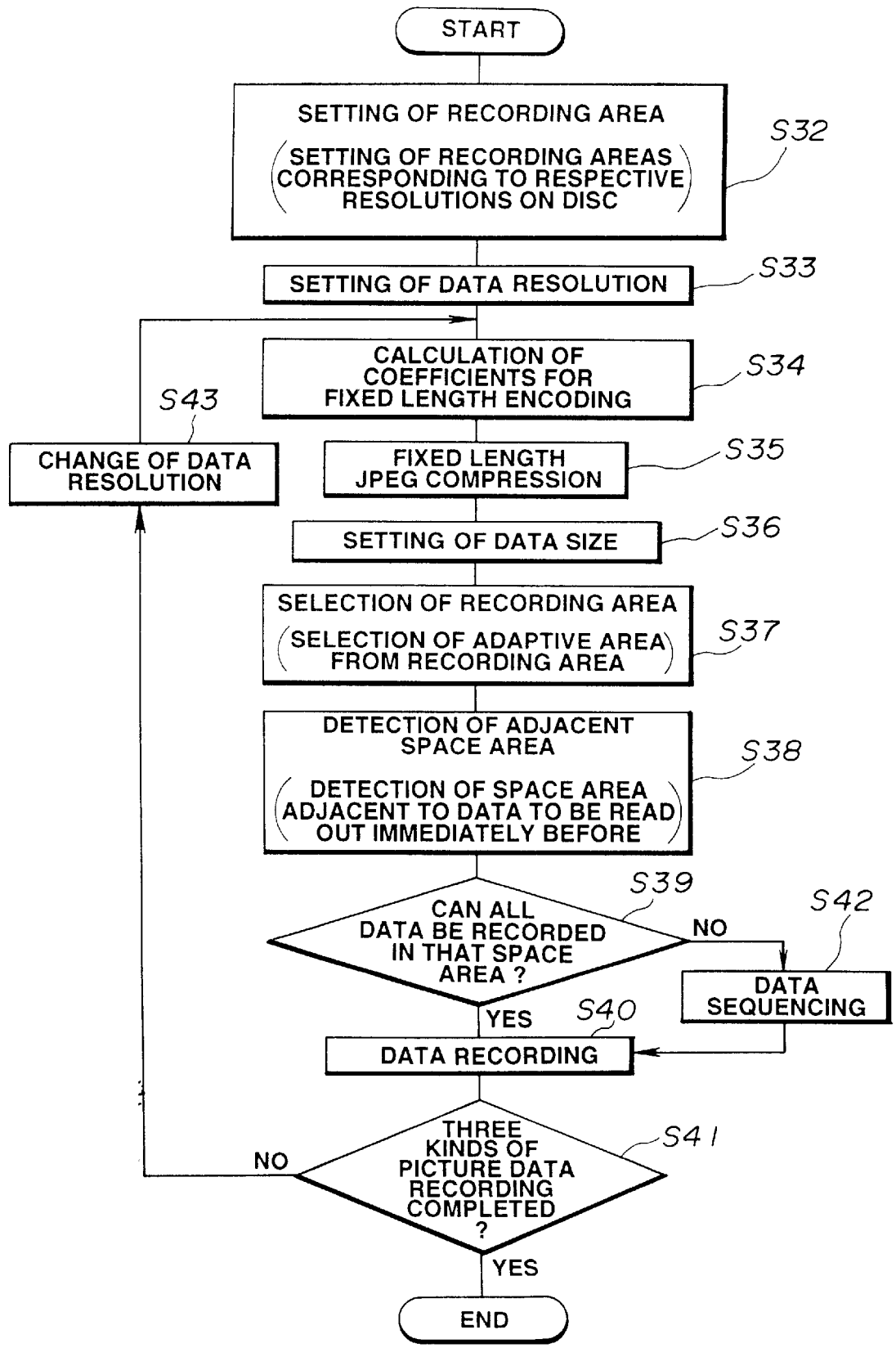
FIG. 12 is a flowchart for explaining third recording operation of the still picture recording/reproducing system.

Namely, the third recording operation is as indicated by the flowchart of FIG. 12. The processing operation by the flowchart shown in FIG. 12 starts when the storage unit controller 5d of the storage unit 5 detects designation of recording of picture data by the user to proceed to step S32.

At the step S32, the storage unit controller 5d tri-sects the recording area on the optical disc 20, as shown in FIG. 11, from the inner circumferential side to the outer circumferential side, so that the area corresponding to 14 clusters becomes the recording area IA for picture data of low resolution, the area corresponding to 200 clusters becomes the recording area MA for picture data of intermediate resolution, and the area corresponding to 1800 clusters becomes the recording area PA for picture data of high resolution to recognize these respective recording areas IA, MA, PA. Thus, the processing operation proceeds to step S33.

At the step S33, the thinning and compression/expansion controller 4i allows the selector 4f to undergo switching control so as to select the picture data of high resolution. Thus, the processing operation proceeds to step S34.

At the step S34, the thinning and compression/expansion controller 4i sets, at the compression/expansion circuit 4h, quantization coefficients, etc. used in the compression/expansion circuit 4h. Thus, the processing operation proceeds to step S35.

At the step S35, the thinning and compression/expansion controller 4i controls the compression/expansion circuit 4h so as to implement the above-described fixed length encoding processing to the picture data of high resolution to thereby allow the picture data of high resolution to undergo fixed length encoding so that they have data length corresponding to 8 clusters. Thus, the processing operation proceeds to step S36.

At the step S36, the storage unit controller 5d sets, at the disc recording/reproducing section 5c, data size corresponding to eight clusters. Thus, the processing operation proceeds to step S37.

At the step S37, the storage unit controller 5d sets, at the disc recording/reproducing section 5c, recording area PA of picture data of high resolution. Thus, the processing proceeds to step S38.

At the step S38, the storage unit controller 5d controls the disc recording/reproducing section 5c so as to detect space area continuous by 8 clusters on the optical disc 20 on the basis of the data size and the recording area which have been set. Thus, the processing operation proceeds to step S39.

At the step S39, the storage unit controller 5d is operative so that in the case where current picture data of high resolution are recorded into the space area detected by the disc recording/reproducing section 5c, it discriminates whether or not the recorded picture data are recorded in the order of reproduction (playback). In the case of NO, the processing operation proceeds to step S42. In the case of YES, the processing operation proceeds to step S40.

At the step S42, the storage unit controller 5d controls the disc recording/reproducing section 5c so as to temporarily read out picture data within the recording area PA for picture data to transfer the picture data thus read out to the RAM 6a within the system controller shown in FIG. 1. Then, the system controller 6 allows the picture data transferred into the RAM 6a to undergo sequencing so that they are in the order of reproduction (playback) to transfer them to the disc recording/reproducing section 5c for a second time. Thus, the processing operation proceeds to the step S40.

At the step S40, the storage unit controller 5d controls the disc recording/reproducing section 5c so as to record the picture data in the order of reproduction (playback) onto the optical disc 20. Thus, the processing operation proceeds to step S41.

At the step S41, the storage section controller 5d discriminates whether or not three kinds of picture data of high, intermediate and low resolutions are all recorded. In the case of YES, the processing operation is completed as it is. In the case of NO, the processing operation proceeds to step S43.

At this point, since only the recording operation of the picture data of high resolution has been completed, discrimination result of NO is provided. Thus, the processing operation proceeds to step S43.

At the step S43, the thinning and contraction/expansion controller 4i controls the selector 4f so as to subsequently select picture data of intermediate resolution. Thus, the processing operation returns to the step S34.

At a time subsequent thereto, at the step S34, quantization coefficients, etc. for allowing the picture data of intermediate resolution to undergo fixed length encoding into two clusters are calculated. At step S35, the fixed length encoding processing is carried out on the basis of the calculated quantization coefficients, etc. Thus, picture data of intermediate resolution of fixed data length of two clusters are formed. Then, at the steps S36 to S40, data size and recording area MA of picture data of intermediate resolution are set. Thus, the picture data of intermediate resolution of data length of two clusters are recorded, successively in the order of reproduction (playback), into the space area of the recording area MA.

At this point, recording operations of the picture data of high resolution and the picture of intermediate resolution have been completed. For this reason, at the step S41, discrimination result of NO is provided. Thus, the processing operation returns to the step S43.

At the step S43, the thinning and compression/expansion controller 4i allows the selector 4f to undergo switching control so as to subsequently select the picture data of low resolution. Thus, the processing operation returns to the step S34.

At a time subsequent thereto, at the step S34, quantization coefficients, etc. for allowing the picture data of low resolution to undergo fixed length encoding into 1/15 clusters are calculated. At step S35, the fixed length encoding processing is carried out on the basis of the calculated quantization coefficients, etc. Thus, picture data of low resolution of fixed data length of 1/15 clusters are formed. Then, at the steps S36 to S40, data size and recording area 1A for picture data of low resolution are set. Thus, the picture data of low resolution of data length of 1/15 clusters are recorded, successively in order of reproduction (playback), into the space area of the recording area 1A.

At this point, recording operations of the picture data of respective resolutions have been all completed. For this reason, at the step S41, discrimination result of YES is provided. Thus, the third recording operation has been completed.

As stated above, such an approach is employed to record, in order of reproduction (playback), the picture data of respective resolutions caused to have fixed data length into the respective divided areas, thereby making it possible to continuously read out picture data without seeking at the automatic play (playback) or at the time of browsing. For this reason, the automatic play (playback) and/or browsing operations can be facilitated, and can be carried at high speed.

It is to be noted while in the case where picture data cannot be continuously recorded in the order of reproduction (playback) at the step S39, and the processing operation proceeds to step S42 to carry out sequencing of data to record those picture data, there may be an approach such that in the case where picture data cannot be continuously recorded in the order of reproduction (playback), those picture data are recorded into the space area to internally carry out sequencing when the recording operation is completed. In this case, the recording time when viewed from the user side can be reduced to a higher degree as compared to the case where sequencing is carried out in advance to conduct recording.

6 [Description of the format of the optical disc]

The format of the optical disc 20 on which picture data of respective resolutions and management data as described above are recorded will be as described below.

In explanation of the format, units relating to the format will be described below.

[Cluster] Recording/reproduction unit of the disc One cluster includes main data area of 32 sectors and subdata area of 4 sectors, etc.

[Logical block] Area in which data are actually recorded within one sector. This area is indicated by 2048 bytes. 32 sectors can be represented by 32 logical blocks.

[Logical cluster] Unit actually used as the data recording area within the cluster (which is the same area as the main data area). Accordingly, the logical cluster size becomes 32 sectors.

[Allocation block] This allocation block indicates the same data unit as the logical cluster, and one logical cluster size is represented as one allocation block. Accordingly, the number of clusters and the number of allocation blocks are in correspondence with each other on the disc. Positions of files on the disc are all designated by these allocation block Nos.

[Parts] Track portions physically continuous on the disc and in which a series of data are recorded.

[Volume] Unit including all of parts in which general data including picture data are recorded.

6-1 [Cluster structure]

Recording (and reproduction (playback)) is carried out with respect to the optical disc 20 with "cluster" being one unit. One cluster corresponds to two to three rounds (circumferences) of tracks. These clusters are continuous in point of time, whereby one track, i.e., data track is formed. The one cluster includes the subdata area of 4 sectors and the main data area of 32 sectors. One sector is 2352 bytes. Addresses are recorded for every respective one sector.

It is to be noted that the area in which data are actually recorded within respective sectors is the area of 2048 bytes, and other bytes are used for header by synchronization (sync) pattern or address, etc., and error correction code, etc.

The subdata area of four (4) sectors are used for subdata or linking area, etc., and recording of TOC data, audio (speech) data or picture data, etc. is carried out in the main data area of 32 sectors.

6-2 [Track structure]

The area of the optical disc 20 is roughly divided, as shown in FIG. 13(*a*), into pit area in which data are recorded by emboss pits and MO area caused to serve as magneto-optical area and in which grooves are provided. The pit area is caused to serve as reproduction (playback) only management area in which P-TOC (Premastered Table Of Contents) which is management information recorded on the optical disc 20 is recorded, and P-TOC sectors which will be described later are repeatedly recorded.

The area up to the lead-out area of the outermost circumference of the disc succeedingly to the pit area of the innermost circumference side is caused to be a MO area, and the area from the position succeeding to the pit area up to the position immediately before the lead-out area is caused to be a recordable area. Further, the leading area of the recordable area is caused to be a recording/reproduction (playback) management area, which is used for recording of U-TOC which is TOC for management of recording/reproduction (playback) of audio data, etc., or as calibration area for trially writing laser power of the optical pick-up.

The U-TOCs are recorded continuously by three clusters at a predetermined position within the recording/reproduction (playback) management area. Which cluster address within the recording/reproduction management area records U-TOC is indicated by P-TOC.

Recordable user area in which audio data or picture data are actually recorded serves as an area succeeding to the recording/reproduction (playback) management area. In the recordable user area, audio data tracks having audio data including picture data, etc. are recorded as indicated by, e.g., M1, M2, M3, and data files are recorded as indicated by FL1, FL2, FL3.

In the portion (area) which serves as the innermost circumferential side at the portion caused to be a data file, data U-TOC for management of the data file is recorded. In this example, data U-TOC is recorded at the position immediately before data file FL1.

Moreover, in the recordable user area, the portion where no picture data/audio data is recorded is caused to be free area. Namely, this area is unrecorded or not yet recorded area, and is caused to undergo management as recordable area for picture data or audio data in future.

In a more practical sense, management is carried out as shown in FIG. 13(*b*) in the U-TOC with respect to the disc recorded as shown in FIG. 13(*a*). Namely, with respect to audio data track which serves as M1, M2, M3, start addresses and end addresses thereof are caused to undergo management. In addition, also with respect to the free area, management is similarly carried out.

However, with respect to the portion where data files FL1, FL2, FL3 including picture data, etc. and data U-TOC are recorded, management is carried out by U-TOC collectively as single data track. Additionally, EB indicates an area in which data file is not actually recorded within the data track caused to undergo management by U-TOC.

On the other hand, the data U-TOC is allocated at the leading portion of the area caused to undergo management as data track by U-TOC as shown in FIGS. 13(*b*) and (*c*). This data U-TOC serves to allow recording positions of respective data files FL1, FL2, FL3 and unrecorded or not yet recorded block EB within the data track to undergo management in cluster units.

Accordingly, in the case of the recording medium used in the picture recording/reproducing system, position of the recordable area on the disc is caused to undergo management by P-TOC, and U-TOC carries out management of position of the data track area within the recordable area. Further, data U-TOC recorded at the leading portion within corresponding data track carries out management, in cluster units, positions of data files FL1, FL2, FL3 including picture data, etc. recorded within the data track.

It is to be noted that while explanation has been given in the above-described track structure in connection with the case where audio tracks M1, M2, M3 are recorded on the disc, since there is no necessity of recording audio data in this picture recording/reproducing (playback) system, the entirety of the recordable user area is used as data track.

6-3 [Data track]

In the U-TOC, management of parts as data track is only carried out. Management with respect to individual data files within the data track are carried out by data U-TOC.

An example of the structure of the data track is shown in FIG. 14. As shown in FIG. 14(*a*), data U-TOC is recorded at the physically leading position into the data track. Namely, data U-TOC is recorded at the position closer to the innermost disc inner circumferential side within the data track. In the case where the data track is separated into plural parts, data U-TOC is allocated (provided) at the leading portion of the parts located at the innermost disc inner circumferential side.

This data U-TOC includes boot area of one (1) cluster and volume management area of sixteen (16) clusters as shown in FIG. 14(*b*). Moreover, the area succeeding to the data U-TOC is caused to be file extents area. In this file extents area, data files FL1 to FL3 including actual picture data, etc. are recorded as shown in FIG. 14(*a*). Moreover, data files can be further recorded in the unrecorded or not yet recorded block EB.

The volume management area includes 512 management blocks of 0 to 511 as shown in FIG. 14(*c*). Data area in one management block is 2048 bytes. Further, data in the management block is caused to serve as management information for recording/reproduction (playback) of actual data file.

In respective management blocks, block numbers of 0 to 511 are attached thereto. Moreover, the management block of the block number 0 is used as volume descriptor VD. Further, the management block of the block number 1 is used as volume space bitmap VSB, and the management blocks of the block numbers 2 and 3 are used as the management table.

The use mode (form) with respect to the management blocks of the block numbers 0 to 3 are standardized as above. Management block of the block number 4 and management blocks succeeding thereto are used directory record block DRB, and extents record block ERB in dependency upon use mode (form), etc. of the file extents area.

Respective management blocks of the management area have size of one logical block (one sector). In the case where data is recorded into the management area and is reproduced therefrom, this logical block (management block) is caused to be minimum unit for recording/reproduction, and is caused to be management unit within the management area.

On the other hand, in the case of recording picture data into the file extents area, allocation block including the area of one logical cluster (32 sectors) is caused to be minimum unit for recording/reproduction, and is caused to be management unit within the file extents area.

6-4 [Volume descriptor] (First management block)

The leading management block in the volume management area is used as volume descriptor VD. This volume descriptor VD serves to carry out basic management of data track (volume) on the disc.

Figure 15:
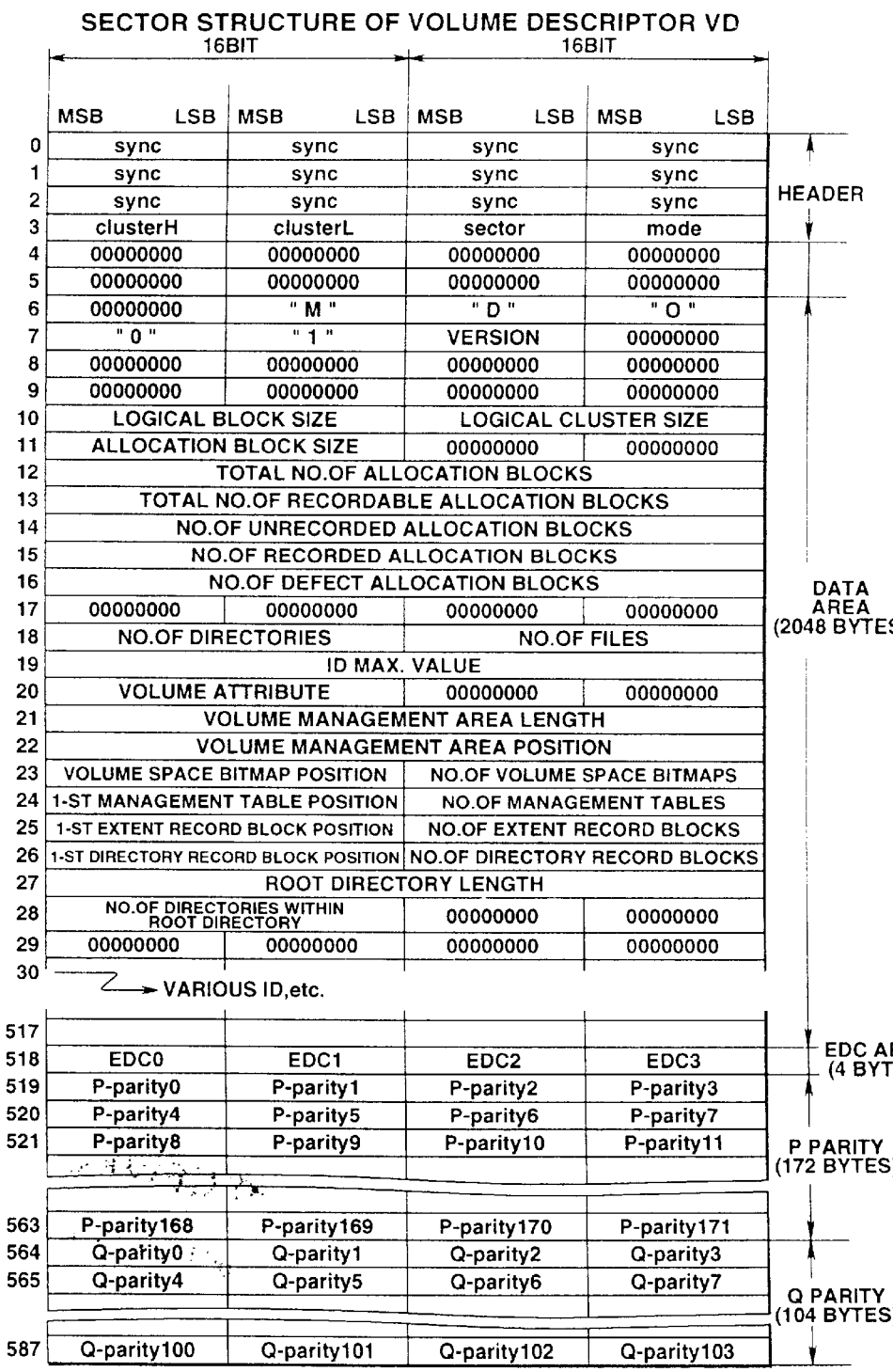
FIG. 15 is a view for explaining sector structure of volume descriptor.

Sector structure of the volume descriptor VD is shown in FIG. 15. In this sector, various management information are recorded in the area of 2048 bytes serving as data area succeedingly to the header in which synchronization (Sync) pattern and address are recorded.

Initially, at the portion from the second byte to the sixth byte of the data area, code of "PICMD" is recorded, e.g., by ASCII code, as ID indicating sector of volume descriptor. Succeedingly thereto, version ID of this system is recorded.

Subsequently, logical block size, logical cluster size and allocation block size are recorded. The logical block corresponds to actual data area within the sector in the data track, and sector in the data track is such that 2048 bytes of 2352 bytes is set as the data area. Accordingly, "2048" which is the byte length is recorded as logical block size.

It is to be noted that this logical block is caused to serve as minimum recording unit for carrying out recording/reproduction within the management area.

Moreover, the logical cluster size indicates the number of logical blocks in the logical cluster. The logical cluster is the cluster in which management information and/or data are actually recorded. Further, one cluster is caused to includes 36 sectors. Since 32 sectors (32 logical blocks) among these sectors are used for data recording, "32" is indicated as logical cluster size.

The number of logical blocks in the allocation block is indicated as the allocation block size. The allocation block indicates the same data unit as the logical cluster, and is the portion in which management information and/or data file are actually recorded in the data track.

For example, the area of 32 sectors as the logical cluster in the volume management area or the file extents area shown in FIG. 14(*b*) is caused to be one allocation block. It is to be noted that this allocation block is caused to be the minimum unit for recording/reproduction within the file extents area.

Subsequently, the total number of allocation blocks is recorded. This is the total number of allocation blocks within the volume. In the case of the hybrid disc where audio data and picture data are mixed, the number of allocation blocks in the pit area is also included. Moreover, the number of allocation blocks in the recordable area is recorded as the total number of recordable allocation blocks. In the case of the premastered disc, that number is caused to be zero.

Moreover, the number of allocation blocks which have not yet been recorded of recordable allocation blocks within volume is recorded as the number of unrecorded or not yet recorded allocation blocks. Further, the number of allocation blocks already recorded of recordable allocation blocks within volume is recorded as the number of already recorded allocation blocks. Furthermore, the number of allocation blocks including defect such as crack or flaw is recorded as the number of defect allocation blocks. In addition, the number of directories within the volume and the number of data files within the volume are recorded.

Subsequently, ID maximum value is recorded. ID numbers are attached to the directory or the data file in the order of generation. The above-mentioned ID maximum value becomes the maximum value thereof. Subsequently, volume attribute is recorded.

Here, whether or not volume management is recorded in the mirror mode, whether or not corresponding file is invisible file, whether or not the present state is in the write protect state, whether or not back-up is required, and the like are recorded.

Subsequently, as the length of the volume management area, byte length thereof is recorded. Moreover, the first allocation block No. of the volume management area is recorded as the position on the disc of the volume management area. Subsequently, similarly to the volume descriptor, with respect to other management blocks formed by using management block within the volume management area, i.e., volume space bitmap VSB, management table MT, extents record block ERB and directory record block DRB, positions of first allocation blocks and the numbers of allocation blocks are respectively recorded. Namely, it is possible to retrieve position of the first directory by the allocation block No. recorded as the first directory record block DRB.

Subsequently, the byte length of directory and the number of subdirectories within the directory are recorded. Further, although indicated as various IDs, etc. in FIG. 15, various IDs and character set codes, etc. are recorded within the data area at times subsequent thereto.

Namely, boot system ID, volume ID and character set code thereof, publisher ID and its character set code, data prepare ID and its character set code, application ID and its character set code are recorded. Moreover, date at which the volume is formed, date at which the volume is updated, expiration date and effective date are recorded. Further, the area of 1024 to 2047 bytes in the data area is caused to be system extension area.

Additionally, EDC area of 4 bytes and ECC area of 276 bytes are allocated (provided) succeedingly to the data area. P parity of 172 bytes and Q parity of 104 bytes are recorded into the ECC area.

6-5 [Volume space bitmap] (Second management block)

Management block of the block No. 1 in the volume management area is used as volume space bitmap VSB. This volume space bitmap VSB indicates recording state of the file extents area in all allocation block units.

Figure 16:
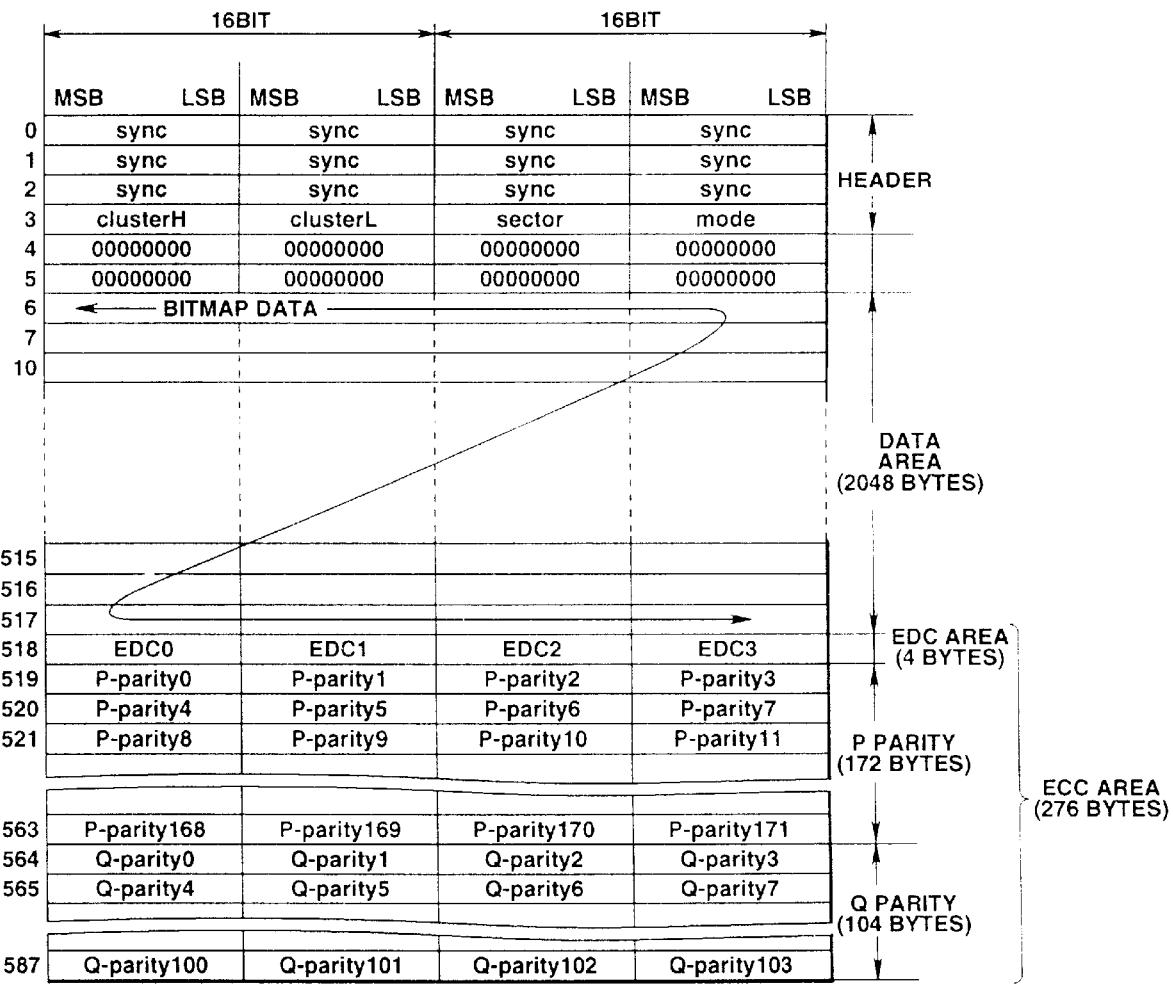
FIG. 16 is a view for explaining sector structure of volume space bitmap.

Sector structure of the volume space bitmap VSB is shown in FIG. 16. In this sector, succeedingly (subsequently) to the header in which synchronization pattern and address are recorded, in the area of 2048 bytes serving as data area, two bits are respectively allocated per respective one allocation blocks, and its type is indicated. Also in the sector of the volume space bitmap VSB, EDC area and ECC area are allocated (provided) succeedingly to the data area.

Figure 17:
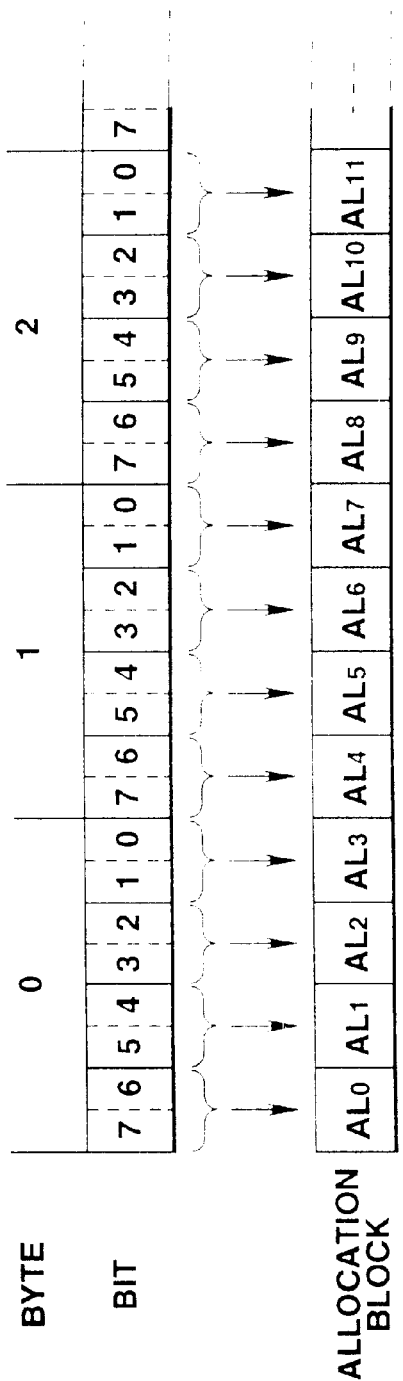
FIGS. 17(a)–17(b) are a view for explaining the configuration of allocation block.

The content of the data area is shown in FIG. 17(*a*). Allocation block number are attached in ascending order from number 0 to the allocation block in the data track. Bits 7, 6 in the first byte of the data area of the volume space bitmap VSB are allocated to the allocation block AL0 of No. 0, and bits are respectively allocated by two bits succeedingly thereto to allocation blocks AL1, AL2 and so on. Accordingly, in the data area of the volume space bitmap VSB, information from allocation block AL0 up to allocation block AL8191 can be recorded. The disc used in this picture recording/reproducing (playback) system has 2200 clusters. In practice, information are recorded in the allocation blocks from AL0 to AL2000.

The information of 2 bits is defined as shown in FIG. 17(*b*) so that it is caused to be "00" with respect to unrecorded or not yet recorded allocation blocks, it is caused to be "01" with respect to already recorded allocation blocks, it is caused to be "10" with respect to defect allocation blocks, and it is caused to be "11" with respect to undefined or not yet defined allocation blocks. It is to be noted that, with respect to the remainder portion in the data area, i.e., bits in which corresponding block does not exist, the information of 2 bits is caused to be "11".

6-6 [Management table]

Management blocks of the block No. 2 and the block No. 3 in the volume management area are used as the management table MT.

Figure 18:
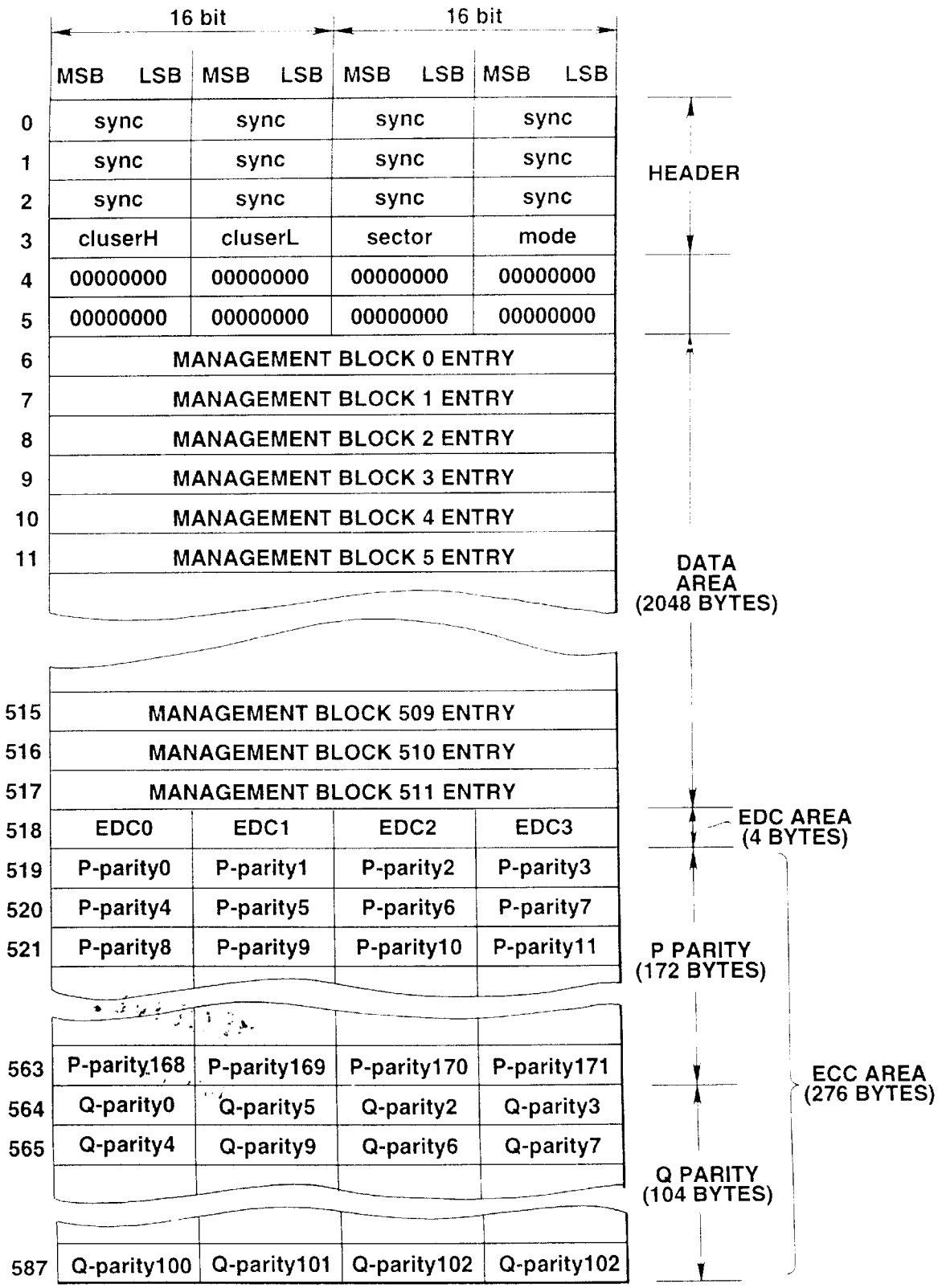
FIG. 18 is a view for explaining sector structure of management table.

This management table MT indicates the use mode (form) of respective management blocks in the volume management area. Sector structure of the management table MT is shown in FIG. 18. In this sector, succeedingly (subsequently) to the header in which synchronization pattern and address are recorded, in the area of 2048 bytes serving as data area, four bytes are respectively allocated with each respective one management block to carry out management of respective management blocks.

Namely, respective use contents of 512 management blocks in the volume management area are indicated by the management block 0 entry to the management block 511 entry. Additionally, EDC area and ECC area are allocated (provided) succeedingly (subsequently) to the data area.

Figure 19:
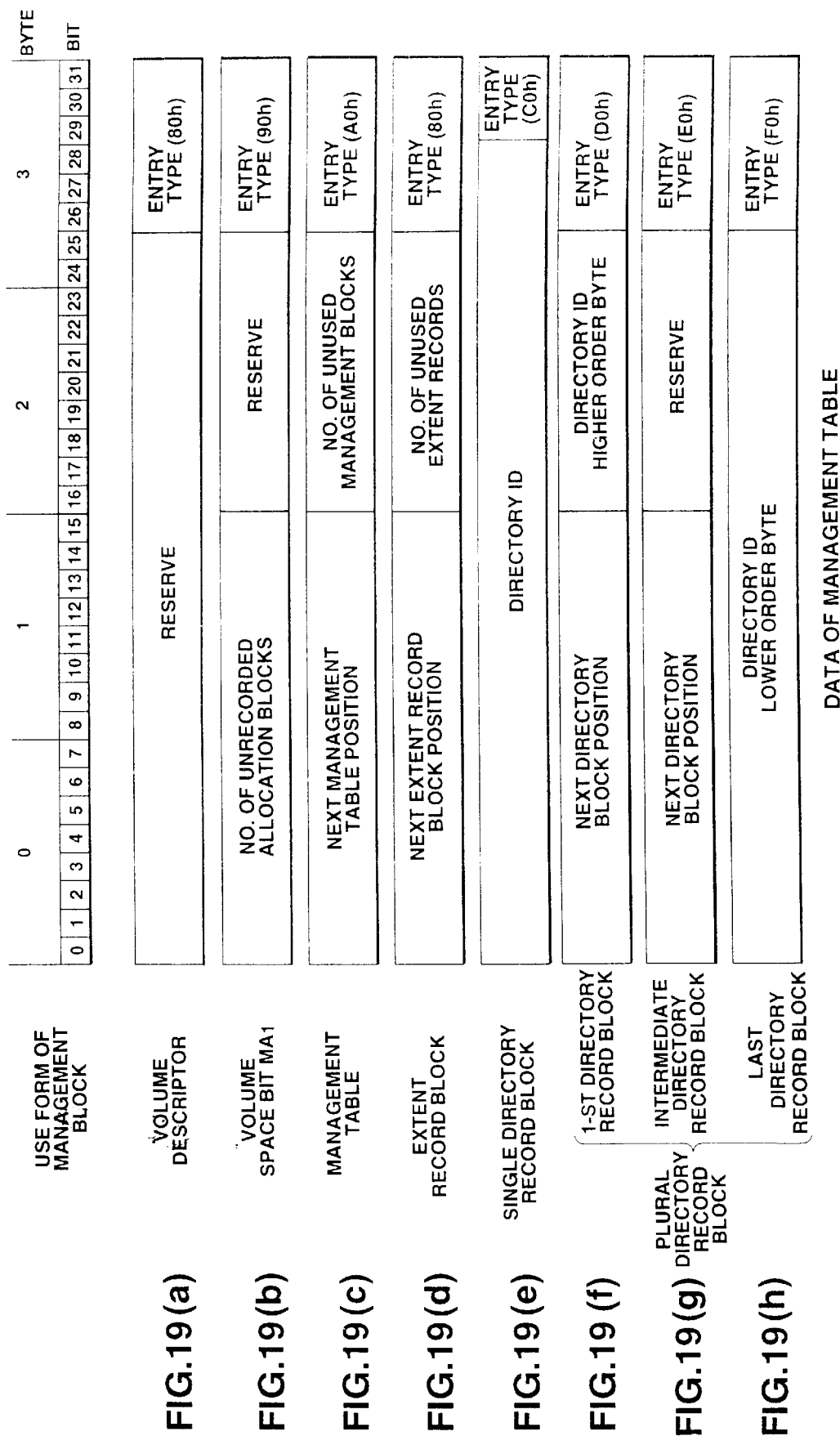
FIGS. 19(a)–19(h) are a view for explaining respective data recorded into management table.

The data content of 4 bytes in respective entries from the management block 0 entry to the management block 511 entry is shown in FIG. 19. The first management block (management block 0) is used for the volume descriptor as described above. In this case, in the management block 0 entry, in order to indicate that the management block 0 is a volume descriptor, "80h" is recorded as the entry type at the fourth byte as shown in FIG. 19(*a*).

Moreover, the second management block (management block 1) is used for the volume space bitmap as described above. In this case, in the management block 1 entry, in order to indicate that the management block 1 is the volume descriptor, "90h" is recorded as the entry type at the fourth byte as shown in FIG. 19(*b*). In addition, the number of unrecorded allocation blocks is recorded at the first and second bytes.

In the entry corresponding to the management block caused to be the management table, as shown in FIG. 19(*c*), the position of the next management table is recorded at the first and second bytes, and the number of unused or not yet used management blocks is recorded at the third byte. Further, in order to indicate that corresponding management block is management table, "A0h" is recorded as entry type at the fourth byte.

In the entry corresponding to the management block caused to be extents record block, as shown in FIG. 19(*d*), position of the next extent record block is recorded at the first and second bytes, and the number of unused or not yet used extent record blocks is recorded at the third byte. In addition, in order to indicate that corresponding management block is extent record block, "B0h" is recorded as the entry type at the fourth byte.

In the directory record block, the directory is completed by directory record unit recorded by one management block. There are instances where the directory record block is used by itself and there are instances where directory record units included in one directory are recorded in the state divided into plural management blocks, i.e., plural directory record blocks.

In the case where a certain manage block is caused to be single directory record block, in the entry corresponding to that management block, as shown in FIG. 19(*e*), the directory ID is recorded at (the area of) 0th to 29-th bits, and the last 2 bits are caused to be "00h" as entry type.

Moreover, in the case where a certain management block is caused to be the first directory record block of plural directory record blocks, at the entry corresponding to that management block, as shown in FIG. 19(*f*), the position of the next directory record block is recorded at the first and second bytes, and high order byte of directory ID is recorded at the third byte. In addition, in order to indicate that corresponding management block is the first directory record block, "D0h" is recorded as the entry type at the fourth byte.

In the case where a certain management block is caused to be intermediate directory record blocks (i.e., except for the first and last directory record blocks) of plural directory record blocks, in the entry corresponding to that management block, as shown in FIG. 19(*g*), the position of the next directory record block is recorded at the first and second bytes. In addition, in order to indicate that the corresponding management block is the intermediate directory record block, "E0h" is recorded as the entry type at the fourth byte.

In the case where a certain management block is the last directory record block of plural directory record blocks, in the entry corresponding to that management block, as shown in FIG. 19(*h*), a lower order byte of directory ID is recorded at the first, second and third bytes. In addition, in order to indicate that the corresponding management block is the last directory record block, "F0h" is recorded as the entry type at the fourth byte.

6-7 [Directory record block] Third management block

Management block of the block No. 3 and management blocks succeeding (subsequent) thereto in the volume management area are used as directory record block DRB. In the directory record block DRB, one or plural directory record units are recorded. As the directory record unit, there are directory record unit for directory for constituting directory and directory record unit for file for designating, in correspondence with certain data file, the position thereof. In the directory record block, in accordance with file and subdirectory formed within the directory, the directory record unit for file and the directory record unit for directory are recorded in the mixed state.

Figure 20:
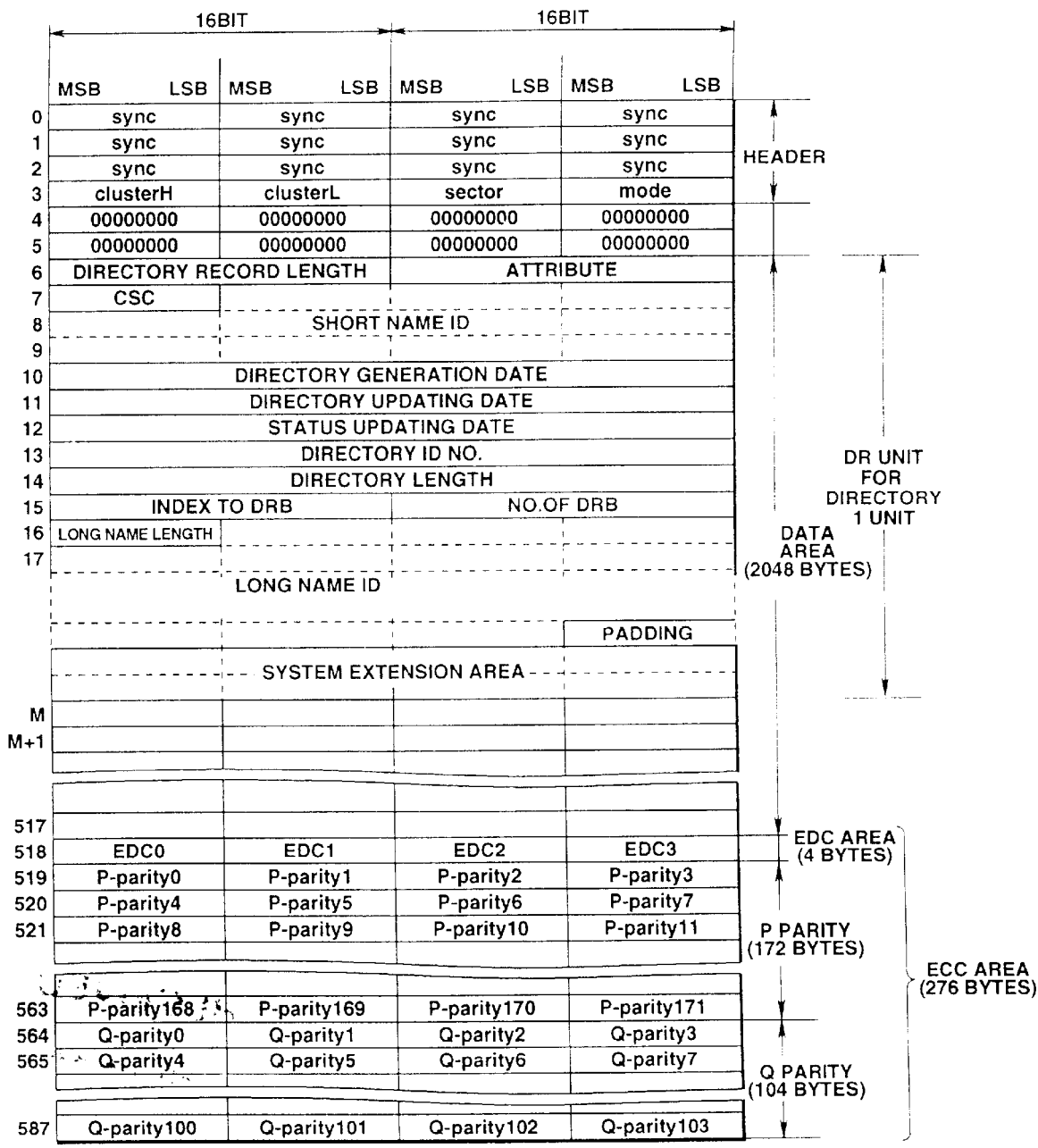
FIG. 20 is a view for explaining sector structure of directory record for directory.

FIG. 20 shows the sector structure of directory record block DRB in which directory record unit for directory for constituting directory is recorded. In this sector, succeedingly (subsequently) to the header in which synchronization pattern and address are recorded, in 2048 bytes serving as data area, one or plural directory record units can be recorded.

As one unit of the directory record unit, directory record length is first indicated. Since the length of one unit of the directory record unit is caused to be variable length, the byte length of corresponding directory record unit is indicated by the directory record length. Subsequently, the attribute of directory is recorded. By this attribute, various attributes such as, for example, whether or not corresponding directory record unit is directory record unit for directory, whether directory included in corresponding directory record unit is invisible directory or system directory, etc. are indicated. Namely, whether or not the position of the data file is indicated by using extents record block which will be described later is indicated.

Subsequently, a character set code and a short name ID are recorded. The character set code indicates the kind of character of the short name ID. The short name ID is recorded by 11 bytes. A directory name is recorded into the short name ID of 11 bytes by the ASCII code of 11 characters or less.

Subsequently, directory formation date and directory updating date are recorded, and updating date of the directory record unit is recorded as status updating date. Further, directory ID No. and directory length are indicated.

Subsequently, "Index to DRB" and "No. of DRB" are recorded. The index to DRB indicates the position within the volume management area of the first directory record block DRB in which the content of the designated subdirectory is described by any one value of management numbers 0 to 511. In addition, the No. of DRB indicates the number of directory record blocks for indicating the designated directory by management block number.

Subsequently, the length of a long name ID is recorded, and the long name ID by that length is recorded. Namely, the long name ID is variable length. It is to be noted that in the instances where the long name ID is not recorded, the length of the long name is caused to be "00h" at that time. Moreover, only in the case where the length of the long name ID is even bytes, "00h" is recorded as padding for filling excess byte. The byte subsequent to the long name ID is utilized as system extension area.

One unit of the directory record unit corresponding to the directory is constituted as stated above, and plural directory record units as stated above may be provided within the data area of 2048 bytes.

Additionally, EDC area and ECC area are allocated (provided) succeedingly (subsequently) to the data area.

Figure 21:
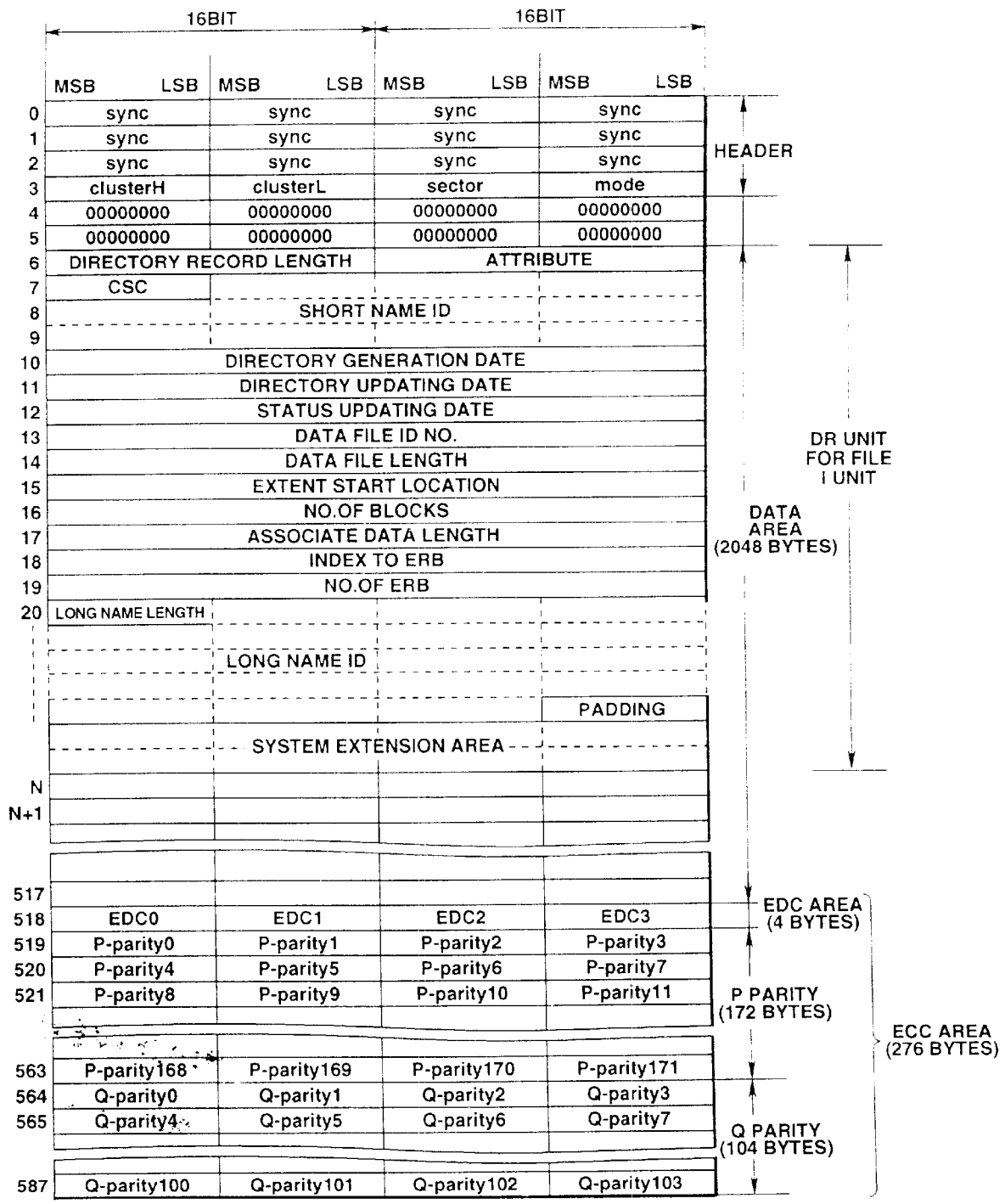
FIG. 21 is a view for explaining sector structure of, directory record for file.

Sector structure of directory record block DRB in which directory record unit for file corresponding to a certain data file is recorded is shown in FIG. 21.

In this sector, subsequently to the header in which synchronization pattern and address are recorded, in 2048 bytes serving as the data area, one or plural directory record units corresponding to the data file can be recorded.

As one unit of the directory record unit, similarly to the directory record unit in FIG. 20, directory record length is first indicated and attribute is subsequently recorded. By this attribute, various attributes such as whether or not corresponding directory record unit corresponds to the directory, whether or not corresponding data file is an invisible file or a system file, or whether or not the corresponding data file position is designated by an extent record unit, etc. are indicated.

Subsequently, similarly to the directory record unit of FIG. 20, character set code, short name ID for recording the file name, directory formation (preparation) date, directory updating date and status updating date are recorded. In the short name ID, data file name is recorded in the short name ID by ASCII code of 11 characters or less.

Subsequently, data indicating ID No. of data file and data file length are recorded. Subsequently, "extent start location" and "No. of blocks" are recorded. This extent start location indicates the position of file recorded in the file extent area by allocation block No. No. of blocks indicates the number of allocation blocks used from the start position designated by extent start location.

Subsequently, "index to ERB" and "No. of ERB" are recorded. This index to ERB indicates, by management block No. of 0 to 511, the position within volume management area of extents record block including data for indicating respective distributed positions of data file recorded in a distributed manner. No of ERB indicates, by the number of management blocks, the number of extents record block for indicating the data file recorded in a distributed manner, i.e., dispersely recorded data file.

Thereafter, the length of long name ID which is variable length is recorded, and long name ID by that length is recorded. In the case where no long name ID is recorded, the length of the long name is caused to be "00h". Moreover, only in the case where the length of long name ID is even bytes, "00h" is recorded as padding in order to fill excess or remainder bytes. Bytes subsequent to the long name ID are utilized as system extension area.

One unit of the directory record unit corresponding to the data file is constituted as stated above, and such plural directory record units may be provided within the data area of 2048 bytes. Additionally, EDC area and ECC area are provided succeedingly (subsequently) to the data area.

In recording data file such as picture file, etc. onto the disc, there are two kinds of cases as described below. The method of designating position of data file changes in dependency upon respective cases.

The first case is the case where continuous space areas corresponding to data of picture files to be recorded can be ensured on the disc. At this time, picture file is recorded as single file in physically continuous areas. Namely, one file is recorded so that it is constituted with continuous allocation blocks. Ordinarily, picture file is recorded into areas physically continuous in this way. In this case, the position of the data file is indicated by allocation block No. recorded as extent start location within the corresponding directory record unit for the file.

The second case is the case where continuous space areas corresponding to data of picture files to be recorded cannot be ensured on the disc. At this time, one file is recorded, in a distributed manner, in the areas distributed on the disc. Namely, one file is recorded so that it is constituted by plural separate allocation blocks. In this case, the position within the management area of the extents block is: designated by the management block No. recorded as index to ERB included within the directory record unit for file, and positions of respective distributed areas are designated on the basis of data included within the extents record block. Explanation will be given later in connection with the extents record block. It is to be noted that no data of index ERB is recorded in the first case, and no extent start location is recorded in the second case.

6-8 [Extent record block]

Management block of the block No. 4 and management blocks succeeding (subsequent) thereto within the volume management area can be used as extent record block ERB. This extent record block is used in the case where one data file is recorded into distributed areas designated by separate allocation blocks as described above, and data for indicating allocation block positions of the respective distributed areas are recorded in the extent record block.

In the extent record block, 64 extent record units (ER units) at the maximum are recorded. This extent record unit consists of ER unit and ER unit for descriptor. The ER unit for index is recorded as the leading unit of plural ER units within ERB, and serves to carry out management of use state (situation) of the second ER unit and ER units succeeding thereto. The second ER unit and ER units succeeding thereto are used as ER unit for descriptor, and positions of allocation blocks of respective distributed areas are designated by data included within these units.

Figure 22:
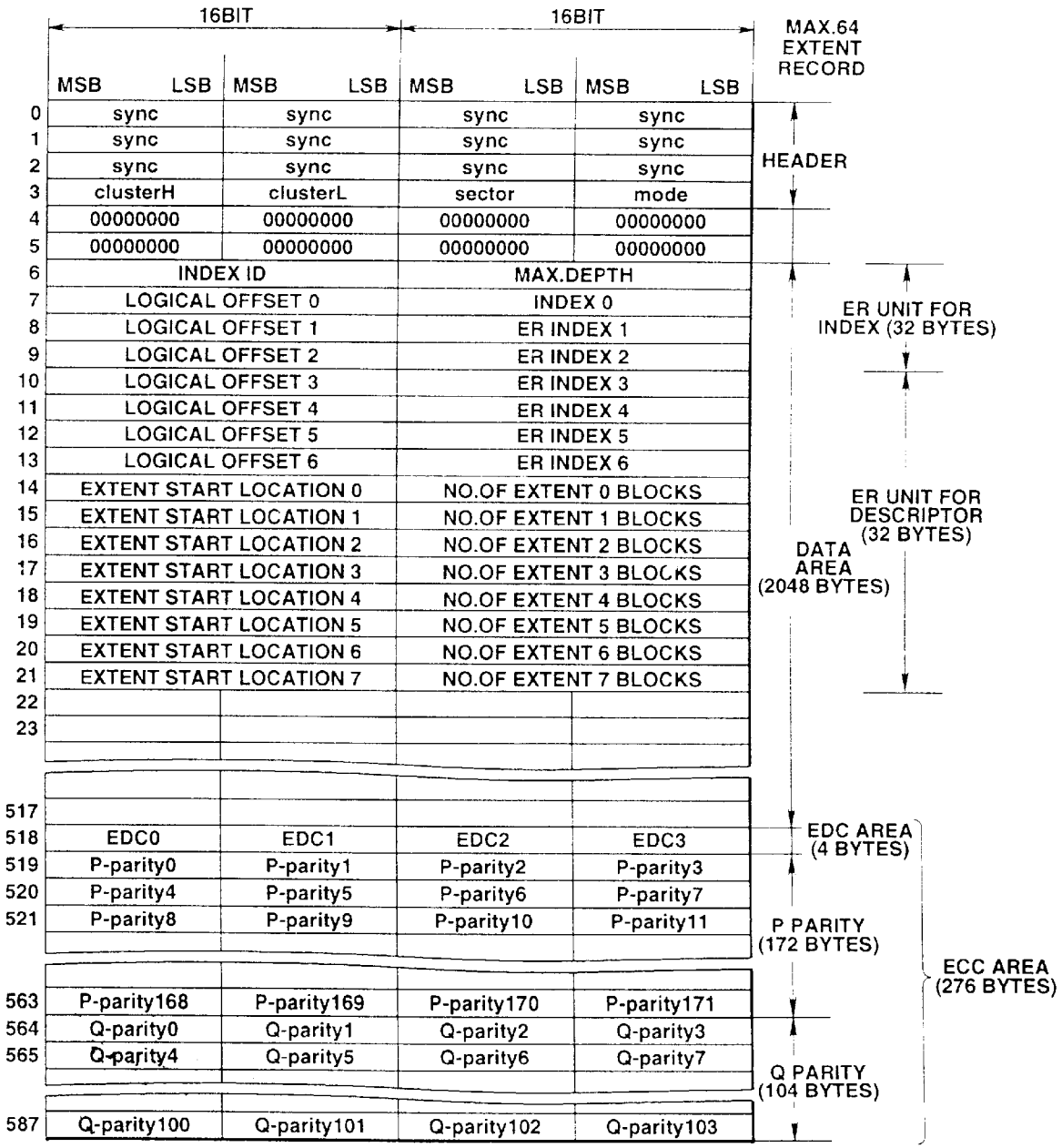
FIG. 22 is a view for explaining sector structure of extent record block.

FIG. 22 shows the sector structure of the extent record block DRB. In this sector, succeedingly (subsequently) to the header in which synchronization pattern and address are recorded, in the area of 2048 bytes serving as data area, 64 extent record units can be recorded. One extent record unit consists of 32 bytes.

In FIG. 22, the extent recording unit of the first 32 bytes of the data area indicates the example where it is used as the extent record unit for index.

In the extent record unit for the index, index ID is first recorded. This index ID is expressed as "FFFF", and indicates that corresponding extent record unit is used as extent record unit for the index.

Subsequently, maximum depth is recorded. Tree structure of extent record is constructed by the extent record unit for the index, and subtree hierarchy designated from the extent record unit is indicated by the maximum depth. In the case where the extent record unit for the index designates extent record unit including extent descriptor, i.e., in the case of the lowest layer (level), the maximum depth is expressed as "0000h".

Thereafter, logical offsets and ER indices can be recorded by seven at the maximum. ER index is data indicating that the data indicating distributed area corresponds to one of 64 ER units which can be recorded within the extent record block, and any one of ER unit numbers of 0 to 63 is recorded in the ER index. In the logical offset, data indicating that ER unit indicated by the ER index corresponds to which ER unit of ER units for constituting data file is recorded.

In the example of FIG. 22, the second ER unit and ER units succeeding (subsequent) thereto are used as ER unit for descriptor. In this ER unit for descriptor, eight extent start locations at the maximum and the number of allocation blocks are recorded. In the extent start location, allocation block No. indicating position of one distributed area is recorded. As the allocation block No., data indicating the number of allocation blocks that the corresponding distributed area has is recorded. Accordingly, one distributed area is designated by one extent start location and one allocation block number. Thus, eight extent start locations and the number of allocation blocks can be recorded in one DR unit for descriptor. For this reason, eight distributed areas at maximum can be designated by one DR unit for descriptor.

Moreover, in the case where eight distributed areas or more are designated, it is sufficient that the third ER unit is newly used as ER unit for descriptor to link an ER unit newly recorded with the third ER unit as the ER unit for descriptor succeeding (subsequent) to the ER unit for descriptor recorded in the second ER unit by the ER unit for index.

Explanation will now be given in the case where positions of data files recorded in plural distributed areas are designated by ERB.

Initially, position within the management block area of ERB is designated by index to ERB recorded within the DR unit for file of DRB. Subsequently, data of "FFFF" is registered at the leading portion of the first ER unit of ERB. For this reason, the first ER unit can be judged as ER unit for index. Further, in order to search the first ER unit constituting the data file, it is sufficient to search the portion where data of logical offset is expressed as "0000". Thus, in the ER unit for index, data of ER index corresponding to "0000" of logical offset is determined. Eight distributed areas are respectively designated by eight extent start locations and the number of allocation blocks recorded in the ER unit for descriptor indicated by the data of the ER index. Thus, positions of files distributed on the disc can be grasped by data within the management area. For this reason, there is no necessity of retrieving the disc in reading out the file. Accordingly, high speed reproduction (playback) can be carried out.

7 [Description of file and the hierarchical structure of file]

As the file used in this picture recording/reproducing (playback) system, there are management file, picture file, index picture file, and audio data file, etc.

Expander (Expanding Operator) of file name for the management file is "PMF". When it is detected that this expander is PMF, the corresponding file is discriminated as a management file. As the management file, there are overall information management file (OVF_INF. PMF), picture data management file (PIC_INF. PMF), print data management file (PRT_INF. PMF), and reproduction (playback) control management file (PMS_INF. PMF), etc. More practical explanation of the respective management files will be given later.

Moreover, expander of file name for picture file is "PMP". When it is detected that the expander is PMP, the corresponding file is discriminated as the picture file. As the picture file, there are high resolution picture file, and intermediate resolution picture file which records intermediate resolution picture SD plane. The intermediate resolution picture file includes file PSNnnnn. The PMP file having picture data of 640 pixels×480 pixels has an aspect ratio of 4:3 and includes file PSWnnnn. The PMP file having picture data of 848 pixels×480 pixels for an aspect ratio of 16:9. The high resolution picture file includes file PHPnnnn. The PMP file having picture data of 1536 pixels×1024 pixels has an aspect ratio of 3:2, and includes file PHWnnnn. The PMP file having picture data of 1920 pixels×1080 pixels has aspect ratio of 16:9. Moreover, as a file for recording ultra (super) high resolution picture data as one of high resolution picture files, there is file PUPnnnn. The PMP file having picture data of 3072 pixels×2048 pixels has an aspect ratio of 3:2.

It is to be noted that with respect to the file name of the picture file in which the expander is caused to be PMP,. the leading three characters (e.g., PHP, etc.) are determined by the kind of picture, and five characters (nnnnnn) succeeding (subsequent) thereto are determined by picture numbers given in the order of preparation of files.

Figure 23:
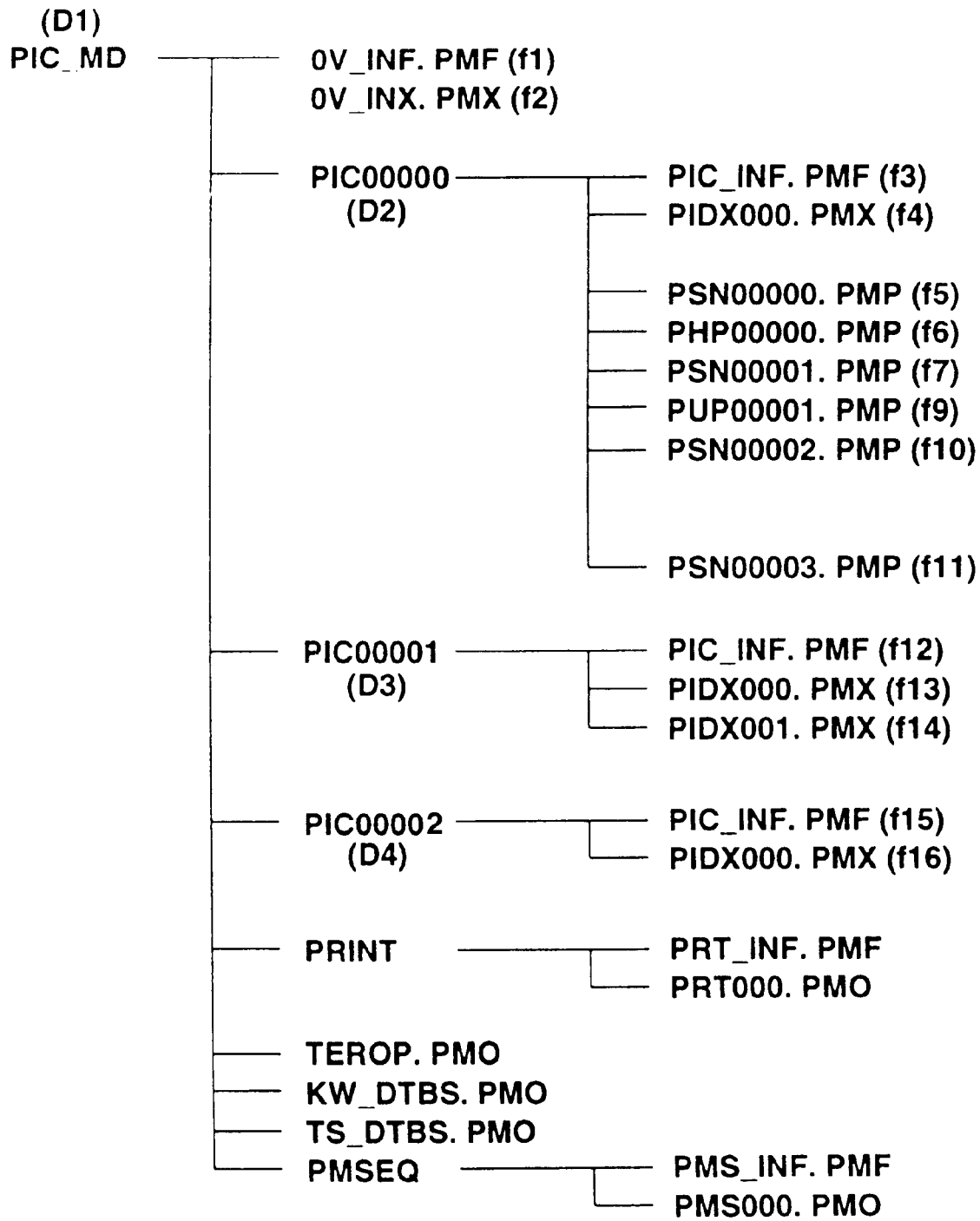
FIG. 23 is a view for explaining hierarchical directory structure for carrying out management of picture data for every respective resolution in the still picture recording/reproducing system.

In the case where a picture data is recorded in this picture recording/reproducing (playback) system, the optical disc has hierarchical directory structure, as shown in FIG. 23, consisting of directory D1 (PIC_MD) for picture recording, and the 0-th picture directory D2 (PIC00000) and the first picture directory, D3 (PIC00001) as subdirectory provided at the lower level (layer) thereof. Five characters succeeding (subsequent) thereto are determined by directory numbers given in the order of preparation of directories of the picture directory.

Respective picture data recorded on the optical disc 20 are, as shown in FIG. 23, such that directory D1 (PIC_MD)

is provided as directory for recording picture data so that file management is carried out therewithin. In addition, plural files are caused to further undergo management by subdirectories.

Namely, when an example thereof is indicated, there are provided, within the directory, D1, overall information management file f1 (OV_INF. PMF) for carrying out management of the entire information, overall index file f2 (OV_IDX. PMX) for carrying out management of the entire index file, and respective picture directories D2 to D4 (PIC00000 to PIC00002) of respective albums. Moreover, there are provided, within the directory (PIC_MD), print directory (PRINT) for carrying out management of print information such as tint (hue) of prin print size, and rotation, etc., Telop directory, (TEROP. PMS) for carrying out management of Telop such as title, etc. picture subjected to monitor display, key word retrieval directory (KW_DTBS. PMO) attached to picture numbers of respective pictures or the respective pictures, time stamp directory (TS_DTBS. PMO) for carrying out management of recording date, etc. of picture, and reproduction (playback) control directory (PMSEQ) for carrying out management of a program reproduction such that only designated picture is reproduced.

In this example, as the picture directory, directories from picture directory.(PIC00000) in which directory No. is "a" up to picture directory (PIC00002) in which directory No. is 2 are respectively provided.

In the picture directory (PIC00000), picture data management file f3 (PIC_INF. PMF) for carrying out management of plural picture files in which directory No. is designated by "00000", and picture index file f4 (PIDX000. PMX) in which index pictures of the corresponding picture directory D2 are collected are recorded.

In the picture directory D2 (PIC00000) designated by the directory No. 00000, intermediate resolution picture file f5 (PSN00000. PMP) and high resolution picture file f6 (PHP00000. PMP) generated from picture data in which the picture No. is designated by 00000 are recorded. Moreover, intermediate resolution picture file f7 (PSN00001. PMP) and ultra (super) high resolution picture file f9 (PUP00001. PMP) generated from picture file data in which picture No. is designated by 00001 are recorded. In addition, intermediate resolution picture file f10 (PSN00002. PMP) generated from picture data in which picture No. is designated by 00002 and intermediate resolution picture file f11 (PSN00003. PMP) generated from picture data in which picture No. is designated by 00003 are recorded.

In the picture directory (PIC00001) in which directory No. is designated by "00001", the above-described picture data management file (PIC_INF. PMF) and two index files (PIDX000. PMX, PIDX001. PMX) for carrying out management of index pictures of the respective pictures are recorded. It is to be noted that index picture corresponding to the picture file recorded in the picture directory (PIC00001) is caused to undergo management by the two picture index files, and these two index files are used formally in the state where they are linked with each other.

In the print directory (PRINT), print data management file (PRT_INF. PMF) for carrying out management of plural print data files and print data file (PRT000. PMO to PRT nnn. PMO) caused to undergo management by the print data management file are recorded.

In the reproduction (playback) control directory (PMSEQ), reproduction control management file (PMS_INF. PMF) for carrying out management of reproduction control data file recorded in the reproduction control directory (PMSEQ) and plural reproduction control data files (PMS000. PMO to PMS nnn. PMO) for controlling the picture sequence are recorded.

Figures 14A, 14B, 14C:
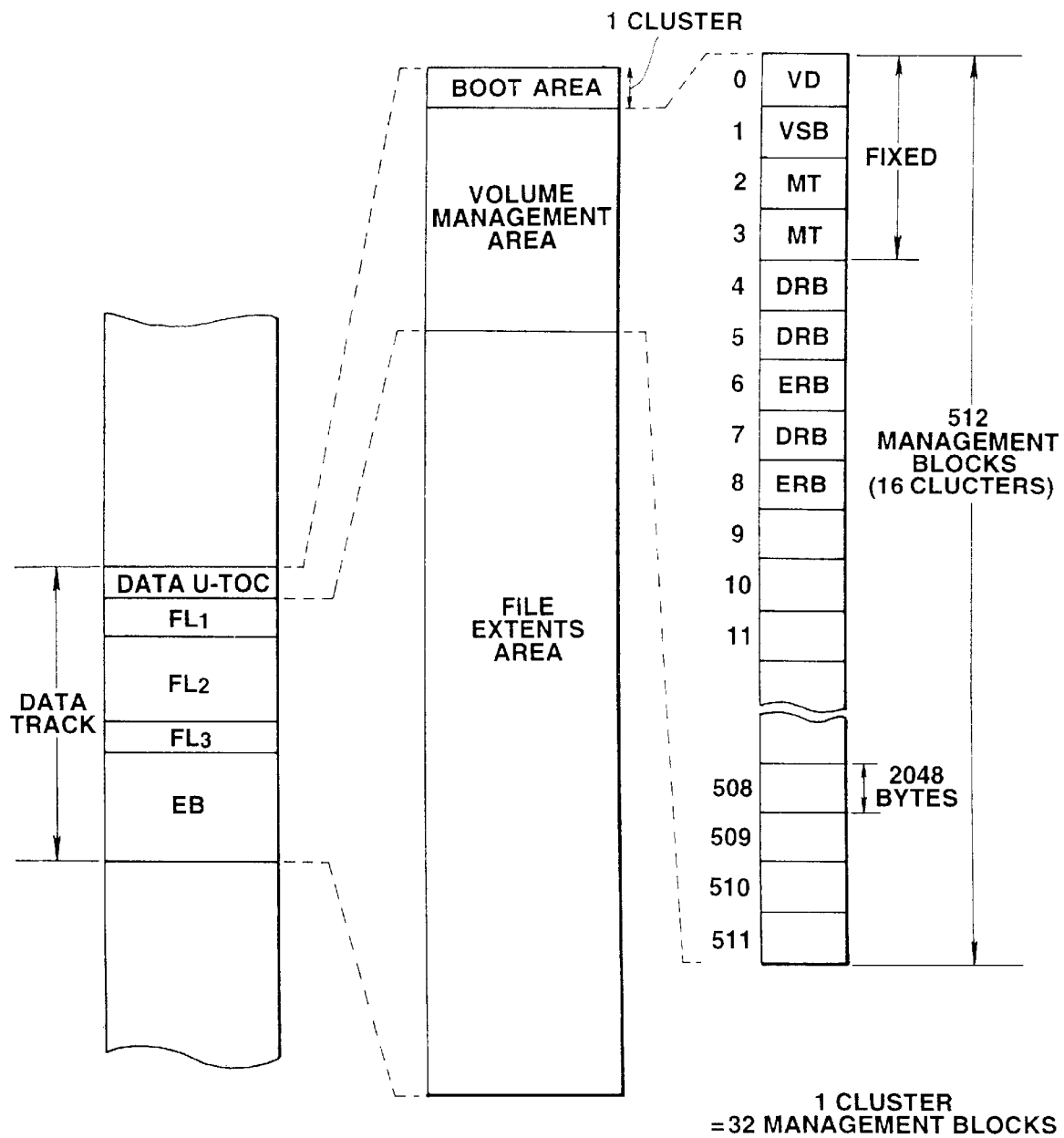
FIGS. 14(a)–14(c) are a view for explaining management block formed in data U-TOC.

As has been explained with reference to the FIG. 14(c) mentioned above, block numbers of 0 to 511 are attached to the management blocks, and volume descriptor VD, volume space bitmap VSB, management table MT, management table MT, directory record block DRB, directory record block DRB, extents recorded block ERB, directory record block DRB, extents record block ERB . . . are allocated in order from block No. 0.

Figure 24:
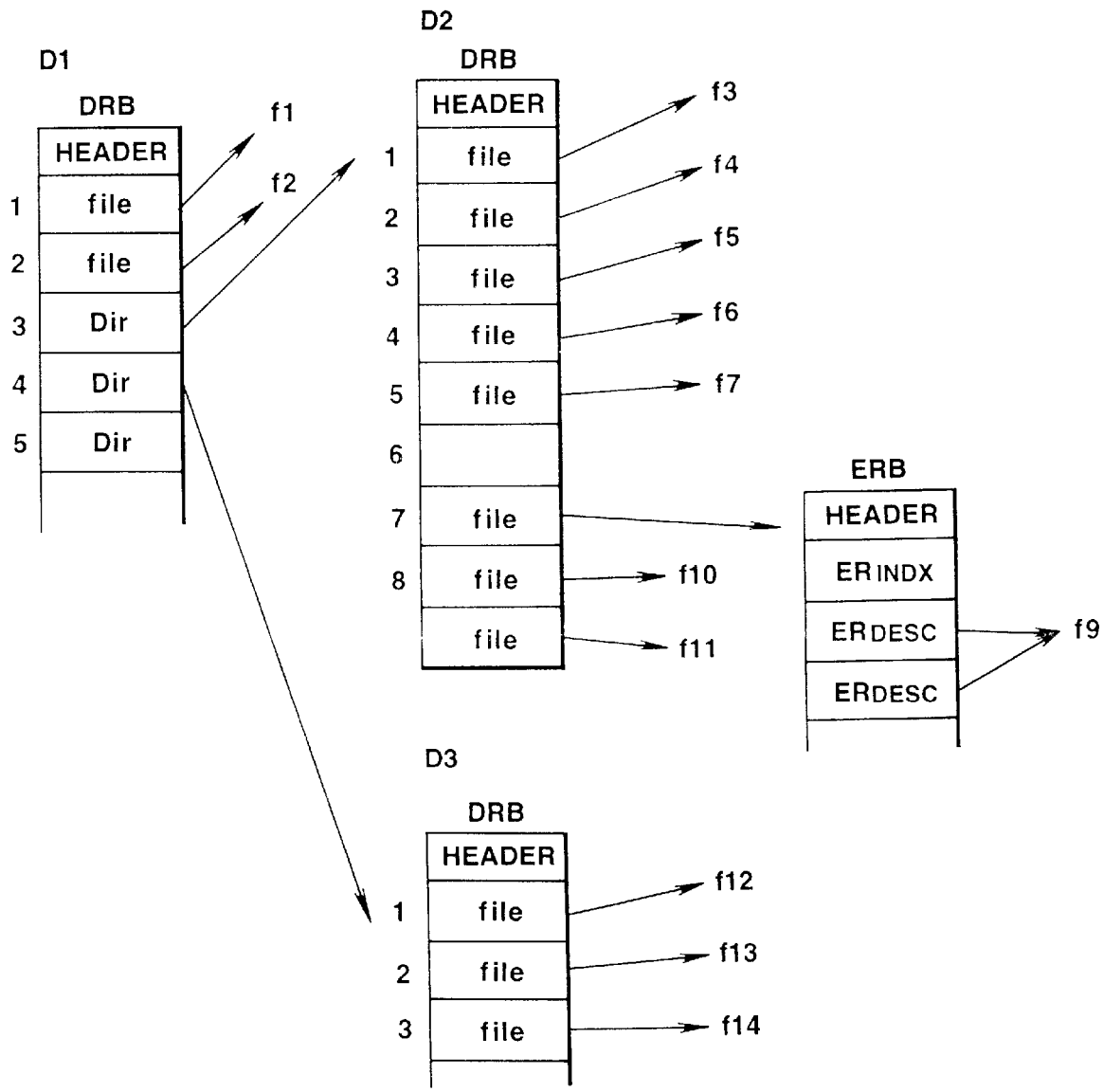
FIG. 24 is a view for explaining DRB and ERB constituting the management block.

The directory record block DRB for indicating directory D1 (PIC_MD) is adapted so that it can be discriminated by data of the volume descriptor VD that this block is the fourth block of the management block. In FIG. 24, in the directory record block DRB recorded in the fourth block of the management block, two DR units for files for indicating recording positions of the overall information management file f1 and the overall index file f2 shown in FIG. 23 mentioned above are provided succeedingly (subsequently) to the header.

In a more practical sense, in the DR unit for file recorded in the first unit, allocation block position of the overall information management file f1 is indicated by the allocation block No. recorded as Extent Start Location. Moreover, in the DR unit for file recorded in the second unit, allocation block position of the overall index file f2 is indicated by the allocation block No. recorded as Extent Start Location. It is to be noted that since the overall information management file fl and the overall index file f2 are recorded in allocation blocks continuous on the optical disc 20, they are not recorded in Index to ERB in the DR unit for file.

In the units succeeding, the two DR unit two files, i.e., the third and fourth units, two DR units for directory for indicating picture directory D2 indicated by the directory No. "00000" and picture directory D3 indicated by the directory No. "00001" are provided.

In a more practical sense, in this DR unit for directory, relative position within the management block of DRB corresponding to picture directory D2 is indicated by management block numbers of 0 to 511 recorded as "Index to DRB". In this example, in data of "Index to DRB" in the DR unit for directory of the third unit, "005" is recorded as data indicating block position within the management block of DRB of the picture directory D2. Similarly, in data of "Index to DRB" of DR unit for directory of the fourth unit, "007" is recorded as data indicating block position within the management block of DRB of the picture directory D3.

As described above, block position of DRB of the fifth block of the management block is designated by DR unit for directory which is the third unit in DRB of the fourth block of the management block.

DRB of the fifth block is a block in which data relating to picture directory D2 is recorded. In this DRB, eight units for file are provided succeedingly (subsequently) to the header.

In seven DR units for file provided in the first to seventh units, data for indicating recording positions of picture data management file f3, picture index file f4, first intermediate resolution picture data file f5, high resolution picture data file f6, second intermediate resolution picture data file f7, super high resolution picture data file f9, and third intermediate resolution picture data file f10 are recorded. Similarly to the above-described DR unit for file, in respective DR units for file, recording positions of the picture data management file f3, the picture index file f4, the intermediate resolution picture data file f5, the high resolution picture data file f6 and the intermediate resolution picture data file f7 are respectively indicated by allocation block numbers recorded as Extent Start Location.

In the DR unit for file provided at the seventh unit, data for indicating recording position of the super high resolution picture data file (f9) is recorded. This super high resolution picture data file is recorded by data length of, e.g., 18 clusters. In the case where continuous space areas corresponding to 18 clusters do not exist on the optical disc 20, this file is recorded in the state distributed into allocation blocks which are not continuous.

In the case where one file is recorded in the distributed state in this way, an approach is adopted such that, with respect to data of extent start location of DR unit for file, ERB is provided between DRB and picture file f9 to be designated without directly designating respective distributed areas of the file thus to designate positions of respective distributed areas of picture file by data of the ERB.

In the ERB, four extent record units (ER units) are provided succeedingly (subsequently) to the header as shown in FIG. 22. In this example, 64 ER units can be provided at maximum.

The first ER unit is used as ER unit for index and the second and third ER units are used as ER unit for descriptor. In the ER unit for index, index data relating to the second ER unit and ER units succeeding thereto are recorded. Moreover, in the ER unit for index, data corresponding to the number of ER units in which ER index and logical offset are used are recorded. ER index is data indicating which one of 64 ER units exists, and is indicated by any one of ER unit Nos. of 0 to 63. Logical offset is data indicating that ER unit indicated by ER index is data indicating which of ER units constitute one file.

In the ER unit for descriptor, eight Extent Start positions and eight numbers of Extent blocks can be recorded. The extent start position is data for indicating start position of the distributed area, and is represented by allocation block No. Moreover, the number of Extent blocks is data for indicating data length of the distributed area, and is represented by the number of allocation blocks. Accordingly, it is possible to designate eight distributed areas on the basis of data of Extent start position and the number of Extent blocks.

Figure 25:
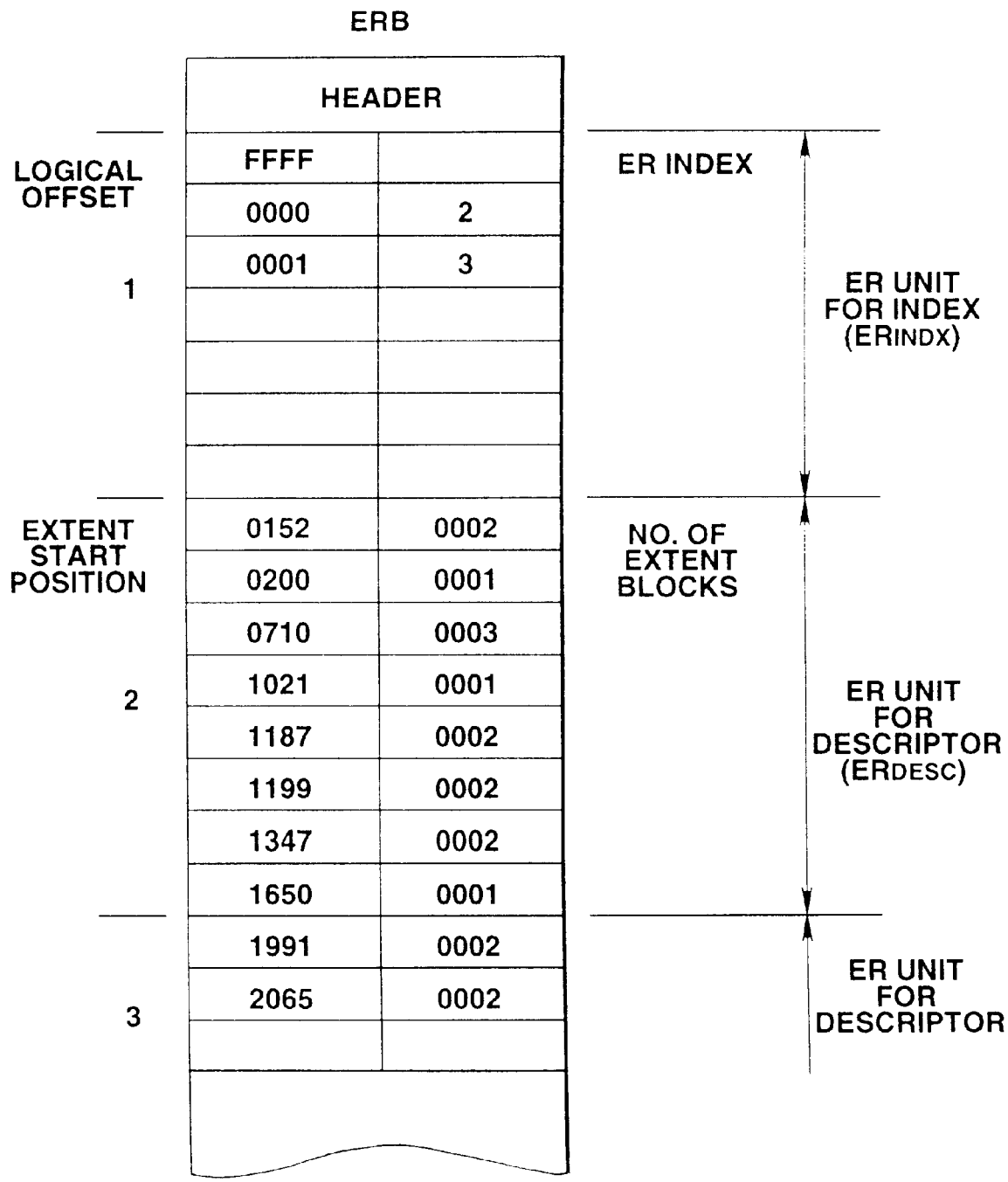
FIG. 25 is a view for explaining the configuration of ERB constituting the management block.

Namely, as shown in FIG. 25, data of "FFFFh" indicating ER unit for index is registered at the leading portion of the first ER unit. In order to retrieve the first ER unit constituting data of the super high resolution picture data file f9, it is sufficient to retrieve the portion where data of logical offset is expressed as "0000". Since "2" is recorded as data of ER index corresponding to "0000" of logical offset is recorded in the ER unit for index, it is possible to detect that the second ER unit is the first ER unit constituting data of the file f9.

When reference is made to the second ER unit (ER unit for descriptor), it is seen that the start position of the first divisional area of the file f9 is "0152" in terms of the allocation No., and data length of the first divisional area is "0002" in terms of the number of allocation blocks. Similarly, in the ER unit for descriptor, data relating to the second divisional area to the eighth divisional area are recorded in succession.

Then, "0001" which is the next data of the logical offset "0000" in the index is retrieved as data subsequent to the ER unit for descriptor which is the second ER record. Since data of the ER index in which logical offset is expressed as "0001" is recorded as "3", it is indicated that the third ER unit exists as data continuous to the second ER unit. When reference is made to the third ER unit (ER unit for descriptor), allocation block Nos. indicating start positions of the ninth distributed area and the tenth distributed area and the number of allocation blocks indicating data length are respectively recorded.

As stated above, respective allocation block positions of distributed areas distributed into 10 areas are indicated by the ER unit for descriptor of ERB. For this reason, also in the case where one file is recorded in distributed manner, it is possible to determine positions of respective distributed areas within the management block having ERB. For this reason, also in the case where distributed respective areas are continuously reproduced from the optical disc 20 as one file, there is no necessity of individually retrieving, on the disc, respective distributed areas on the disc. Thus, high speed access can be made.

While, in this embodiment, recording of the super high resolution picture file has been taken as the example where picture file is recorded in distributed manner on the disc, such distribution recording is carried out in the case where the unrecorded area on the disc becomes lesser so that continuous areas corresponding to 18 clusters cannot be ensured. Moreover, in the case where continuous areas corresponding to eight clusters cannot be ensured similarly to the above, distribution recording is carried out also with respect to the high resolution picture file. It is to be noted that in ordinary recording, the super high resolution picture file and the high resolution picture file are recorded in continuous area.

8 [Configuration of file]

The respective files include header and data body. Start address of the data body is prescribed (provided) by the header. The data body starts from, e.g., address of multiple of 4. With respect to data of 2 bytes or more, preference is given to higher order byte. Moreover, the data size is caused to be multiple of 4 except for respective picture data which have been subjected to fixed length encoding (including dummy data of 00h added when the above-described low resolution picture data is subjected to raster block conversion), and character train is terminated with null data (00h). It is to be noted that there may be employed a configuration in which space area is provided between the header and the data body.

8-1 [Configuration of the header]

The header includes a plurality of tables. "Format table" indicating the corresponding file which will be described in this chapter, is allocated to the leading portion, and option tables such as the picture processing information, etc. are allocated in an arbitrary order. Moreover, respective tables are started from, e.g., address of multiple of 4, and the interval between the table and the next table is 256 bytes or less. It is to be noted that there may be employed a configuration in which space data exists between the table and the next table.

In a more practical sense, as a kind of the table, there exist format table (10h), name table (11h), comment table (12h), disc ID table (14h), picture parameter table (20h), recording information table (21h), color management parameter table (22h), and option table (90h), etc. (symbol within the parenthesis identification symbol (ID) of each table).

8-2 [Format table]

The format table includes, as shown in FIG. 26, table ID (1 byte), next table pointer (1 byte), format version (2 byte), file form (1 byte), file form version (1 byte), the number of all tables (1 byte), space area (reserved: 1 byte), data start address (4 bytes), data size (4 bytes), and space area (reserved: 4 bytes). They are all recorded in binary (B) data form.

Moreover, as "file form" recorded by 1 byte, the overall information management file is recorded by "00h", the picture data management file is recorded by "01h", the print data management file is recorded by "03h", the reproduction control management file is recorded by "05h", the picture data file is recorded by "10h", the overall index file is recorded by "11h", and the picture index file is recorded by "12h". Moreover, the print data file is recorded by "30h", Telop data file is recorded by "32h", the key word retrieval data file is recorded by "33h", the time stamp retrieval data file is recorded by "34h", and the reproduction control data file is recorded by "35h".

8-3 [Picture parameter table]

This picture parameter table is recorded into the headers of respective picture files for recording high resolution picture data and intermediate resolution picture file data, and information relating to the original picture data which provide the basis of the high resolution picture data and the intermediate resolution picture data are recorded as parameter.

In this picture recording/reproducing (playback) system, high resolution picture data and intermediate resolution picture data are prepared on the basis of original picture data taken from a scanner, etc., and are recorded as high resolution picture file and intermediate resolution picture file. However, since the original picture itself is not recorded on the disc by any means, there is no possibility that the original picture data is left. However, it is possible to determine, on the basis of respective information, how the original picture which provides the basis of the high resolution picture data is recorded, and are processed on the basis of data of picture parameter tables recorded in the header of the picture file so that high resolution picture data and intermediate resolution picture data are prepared. Accordingly, in order to allow information relating to the original picture data to be left, data of these picture parameter tables are recorded into the header of the picture file along with the picture data, and are not caused to undergo rewrite operation.

In the picture parameter table, as shown in FIG. 27, table ID of 1 byte, next table pointer of 1 byte, picture size (lateral size) of 2 bytes, picture size (longitudinal size) of 1 bytes, picture component of 1 byte, length and breadth discrimination of 1 byte, wide ID of 1 byte, compression rate of corresponding picture data of 1 byte, copyright/editorial right of 1 byte, and input equipment ID information of 1 byte are recorded. In addition, space area (reserved) of 3 bytes and information indicating presence or absence of the dummy data of 1 byte, etc. are recorded.

The "Picture size" is information indicating the size of the number of pixels of picture. Moreover, the "Picture component" is such that "00h" is recorded in the case where the ratio between luminance (Y), color difference (Cr) and color difference (Cb) is 4:2:0, "01h" is recorded in the case of "orthogonal" of 4:2:0, "01h" is recorded in the case of "orthogonal" of 4:2:2 and "20h" is recorded in the case of "orthogonal" of 4:2:2. It is to be noted that "orthogonal" indicates that Y data and C data of the leading portion are in correspondence with each other.

Moreover, the "length and breadth discrimination" is rotation information (in counterclockwise direction) for displaying picture, and is such that "00h" is recorded in the case of ordinary lateral display, "01h" is recorded in the case of the longitudinal display rotated by 90 degrees with respect to the lateral display, "02h" is recorded in the case of lateral display rotated by 180 degrees with respect to the lateral display, and "03h" is recorded in the case of longitudinal display rotated by 270 degrees with respect to the lateral display. Additionally, "FFh" is undefined at present.

These respective information are all reproduced so that they can be displayed. For this reason, user displays this picture parameter table on monitor unit 9, thereby making it possible to simply recognize parameters of corresponding picture.

8-4 [Overall information management file (first management file)]

The overall information management file is management file for synthetically carrying out management of all data files recorded in the directory (PIC MD).

The overall information management file includes header and data body as shown in FIG. 28(a). In the header, format table (10h), name table (11h), comment table (12h), disc ID table (14h), and option table (90h) are recorded.

In the data body, total number of pictures of 2 bytes, next picture directory No of 2 bytes, total number of picture directories of 2 bytes, information indicating presence or absence of reproduction control directory of 1 byte, the number of reproduction control files of 1 byte, the number of print data files of 1 byte, and information indicating presence or absence of Telop data file of 1 byte are recorded. In addition, information indicating presence or absence of retrieval information file of 1 byte, automatic start file No. of 1 byte, last access picture directory No. of 2 bytes, last access picture No. of 2 bytes, pass word of 8 bytes, narration language information of 6 bytes, space area (reserved) of 2 bytes, and picture directory information unit of 48 bytes are recorded by N (N is the number of picture directories). It is to be noted that these respective information are all recorded in binary data form.

The "Total number of pixels" is information indicating the total number of pixels of picture of ordinary resolution (intermediate resolution picture data), having aspect ratio of 3:4, "Next picture directory No." is information in which 1 is added to the last No. of the picture directory, and "Total number of picture directories" is information indicating the number (N) of picture directories. In addition, "presence or absence of the number of files of telop data is such that "00h" is recorded in the case where no telop data exists and "01h" is recorded in the case where telop data exists.

As described above, picture directory information unit consisting of 48 bytes is recorded in a manner caused to be in correspondence with index picture recorded in the overall index file. In this overall index file, respective one index pictures that user has selected of index pictures included in respective picture directories are recorded in the order of the picture directories. Accordingly, since respective one index pictures are taken out from the picture directories, index pictures having the same number (N) as that of the picture directories are recorded.

Moreover, one picture directory information unit corresponds to one index picture recorded in the overall index file, and picture directory information unit corresponding to index picture recorded in the m-th overall index file is recorded as the m-th unit.

Namely, these picture directory information units are recorded in the same order as the recording order of the index picture of the overall index file and by the same number as above.

Respective picture directory information units consist, as shown in FIG. 28(b), of directory No. of 2 bytes, index picture No. of 2 bytes, the number of pictures within directory of 2 bytes, index picture individual information of 1 byte, character ID code of 1 byte, directory name of 36 bytes, and space area of 4 bytes. While information are all recorded in binary data form except for the "directory name", the "directory name" is recorded by ASCII code (A). It is to be noted that if the "directory name" is recorded by codes except for ASCII code, such as, for example, ISO code or JIS code, etc., its data form becomes "C".

In the directory No., directory No. for indicating picture directory including picture file corresponding to index picture is recorded. In the index picture No., picture No. for indicating No. of picture file corresponding to index picture is recorded. Thus, when the user designates the m-th index picture of the overall index file, reference is subsequently made to the m-th picture directory information from the leading picture directory information. Subsequently, what picture directory includes designated picture index can be judged by data of directory No. recorded in the picture directory information unit to which reference has been made.

In addition, in the index picture individual information, rotation information, etc. in displaying index picture on the monitor is recorded. In displaying the index picture, display is carried out on the basis of the data.

8-6 [Picture data management file]

Respective one picture data management files are provided in the picture directories, and data for carrying out management of respective pictures stored in the directory is recorded.

The picture data management file consists of header and data body as shown in FIG. 29(a). In the header, format table (10h), name table (11h), comment table (12h), disc ID table (14h) and option table (90h) are recorded.

Moreover, in the data body, link ID of 1 byte, space area (reserved) of 3 bytes, next picture No. of 2 bytes, No. of pictures of 2 bytes, space area (reserved) of 2 bytes, No. of picture index files of 1 byte, Next, picture index file No. of 1 byte, index file information of 4×256 bytes, and picture information units of 16 bytes are recorded by N (the number of pictures). It is to be noted that these respective information are recorded in binary data form.

The "No. of pictures" is information indicating total number of pictures (N) in the picture directory. Moreover, "index file information" are arranged (allocated) in accordance with display order, and, e.g., 256 entries are prepared irrespective of the number of actually existing index files.

As stated above, the picture information unit includes 16 bytes is recorded in a manner caused to be in correspondence with index picture recorded in picture index file which will be described later.

In this picture index file, index pictures for indicating all picture files included in the picture directory are recorded in the order of display. Accordingly, N number of index pictures which have the same number as the total number N of pictures in the picture directory are recorded in the picture index file.

Moreover, one picture information unit corresponds to one index picture recorded in the picture index file, and picture information unit corresponding to the m-th index picture recorded in this picture index file is recorded as the m-th unit.

Namely, these picture information units are recorded in the same order as the recording order of the index picture of the picture index file and by the same number as above.

In the "picture information unit", as shown in FIG. 29(b), directory No. of 2 bytes, picture No. of 2 bytes, picture kind information of 1 byte, picture individual information of 1 byte, No. of links of 1 byte, narration information of 1 byte, key word retrieval data No. of 2 bytes, time stamp retrieval data No. of 2 bytes, Telop No. of 2 bytes, and space area (reserved) of 2 bytes are recorded. It is to be noted that these information are respectively recorded in the binary data form.

In the directory No., directory No. for indicating picture directory including picture file corresponding to index picture is recorded. In the picture No., picture No. for indicating Number of picture file corresponding to the index picture is recorded. Thus, when the user designates the m-th index picture of the picture index file, reference is then made to the m-th picture information unit from the leading portion. Subsequently, which picture directory includes the designated picture index is judged by data of the directory No. recorded in the picture information unit to which reference has been made. Further, which picture file of that picture directory is judged by picture No.

In addition, data indicating picture kind such as "PSN" representing intermediate resolution picture file and "PHP" representing high resolution picture file, etc. are recorded in the picture kind information. In designating the high resolution picture file and the intermediate resolution picture file by the index picture, file name (leading three characters) is designated on the basis of the picture kind information.

8-7 [Print data management file]

Figure 30:
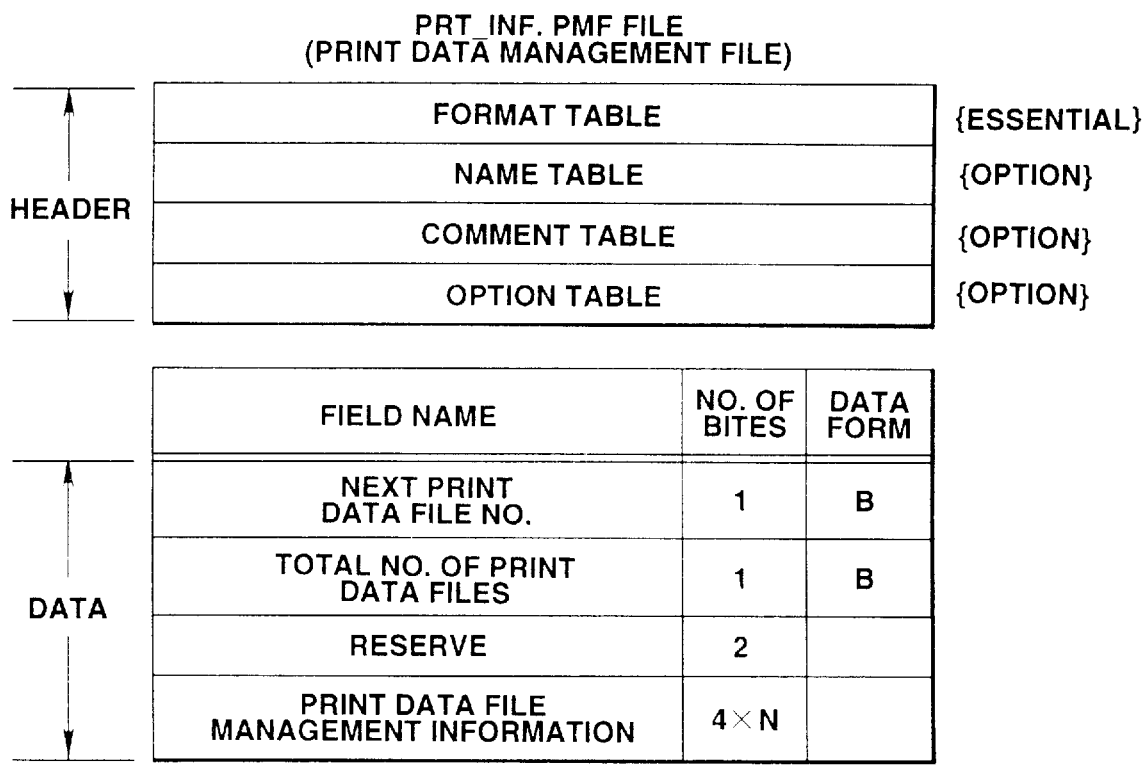
FIGS. 30(a)–30(b) are a view for explaining print data management file in the hierarchical directory structure.

The print data management file includes header and data body as shown in FIG. 30. Format table (10h), name table (11h), comment table (12h), and option table (90h) are recorded in the header.

Next print data file No. of 1 byte, total No. of print data files of 1 byte, space area, (reserved) of 2 bytes, and print data file management information of 4×N (number of) bytes are recorded in the data body.

As the "next print data file No.", value obtained by adding 1 to No. of the last print data file is recorded. As the "total No. of print data files", total number of the print data files are recorded. As the "print data file management information", the number of print data files is recorded.

In the "print data file management information", as shown in FIG. 30(b), print data file No. of 1 byte, print execution ID of 1 byte, and space area (reserved) of 2 bytes are recorded. The print data file No. is information indicating the number of print data file. In addition, as the "print execution ID", "00h" is recorded in the case where no print is carried out, and "01h" is recorded in the case where print is carried out.

8-8 [Picture data file]

The picture data file includes header and data body as shown in FIG. 31. Format table, picture parameter table, divisional management table, name table, comment table, copy right information table, recording date table, color management information table, appearance information table, camera information table, scanner information table, laboratory information table, and option table are recorded in the header. It is to be noted that the "format table" and the "picture parameter table" are essential (inevitable) recording matter in the case of constituting the system, and other tables are option matter.

Data recorded in these respective tables are data indicating condition in processing original picture data to generate high resolution data or intermediate resolution picture data. Thus, there is no possibility that data recorded in these tables are replaced in the ordinary recording/reproduction.

The data body is adapted so that high resolution picture data or intermediate resolution picture data which has been caused to undergo fixed length encoding is recorded thereinto.

8-9 [Overall index file]

Respective one index pictures that user has selected of plural index pictures included in respective directories are recorded into the overall index file in the order displayed on the monitor. Thus, the same number of pictures as that of respective picture directories are recorded in the overall index file.

The overall index file is a set of index picture data (low resolution picture data), and the header of the file itself is not provided. The number of index pictures is recorded as the "total number of directories" by the above-described overall information management file. In addition, respective indices are arranged (allocated) in the same order as the order of the management files.

In a more practical sense, the overall index file includes only data body of index picture data 0 to N each having 4096 bytes as shown in FIG. 32(a). The respective index picture data include header and data body as shown in FIG. 32(b). Format table is recorded in the header. It is to be noted that space area is provided succeedingly (subsequently) to the format table so that arbitrary user information can be recorded. Index picture data (low resolution picture data) is recorded into the data body. It is to be noted that space area is provided in the data body succeedingly (subsequently) to the index picture data.

8-10 [Picture index file]

In the picture index file, index picture for indicating all picture files included in the picture directory is recorded in the order of display order. Accordingly, N index pictures having the same number as the total number of pictures in the picture directory are recorded in the picture index file.

Moreover, the picture index file is a set of index picture data (low resolution picture data). This picture index file is of a structure as shown in FIG. 33(a) in which it includes no header of the file itself, and instead includes headers for every respective index pictures. The number of index pictures is recorded as the total number of directories by the overall information management file. In addition, respective indices are arranged (allocated) in the same order as the order of the management files.

In more practical sense, as shown in FIG. 33(b), the respective index picture data include header including format table and space area, and data body including low resolution picture data which has been caused to undergo fixed length encoding and space area. The total capacity of the header and the low resolution picture data is, e.g., 4096 bytes. In addition, the header is of fixed capacity of 256 bytes including space area as well.

8-11 [Print data file]

Figure 34:
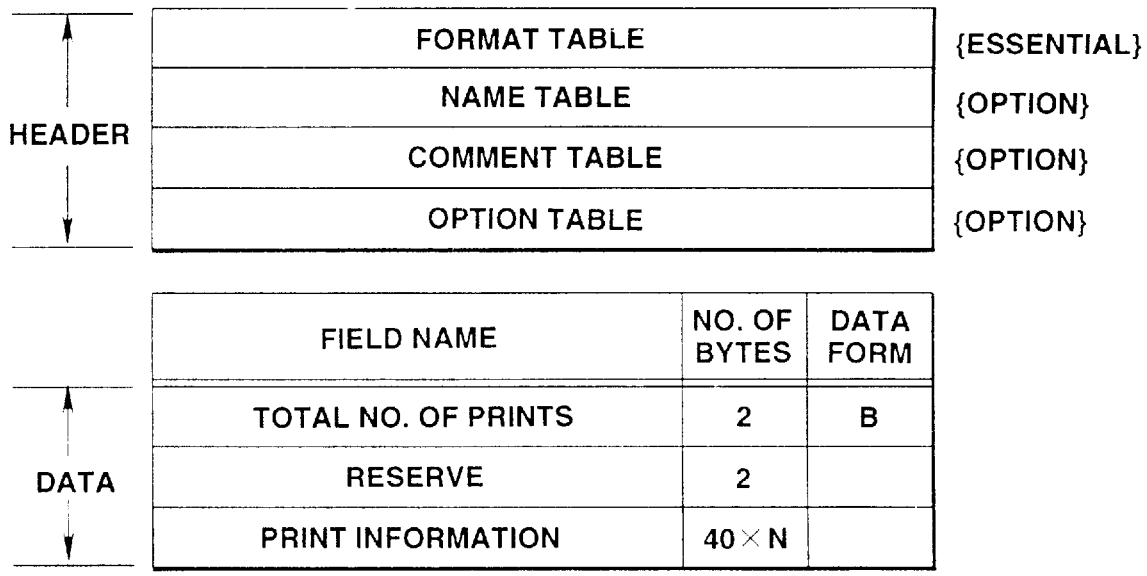
FIGS. 34(a)–34(b) are a view for explaining print data file in the hierarchical directory structure.

The print data file includes header and data body as shown in FIG. 34(a). Format table, name table, comment table, and option table are recorded in the header. Moreover, total number of prints of 2 bytes, space area (reserved) of 2 bytes, and print information of 40×N (number of) bytes are recorded in the data body.

The "total number of prints" is information indicating total number of pictures subjected to print, and the "print information" is information indicating total number of 40 bytes×prints. It is to be noted that these information are respectively recorded in binary data form.

In the "print information", as shown in FIG. 34(b), picture directory No. of 2 bytes, picture No. of 2 bytes, picture kind of 1 byte, and the number of prints of 2 bytes, etc. are recorded. It is to be noted that the number of prints of the same picture is recorded as "the number of prints".

9 [Recording operation]

The recording operation based on the premise of the hierarchical directory structure and the respective file configurations described above will now be described. This recording operation is as indicated by respective flowcharts of FIGS. 35 and 36. Initially, in the flowchart shown in FIG. 35, when the user allows power supply key 31 shown in FIG. 8 to be turned ON, storage unit 5 is brought into stand-by state. Thus, the processing operation by this flowchart starts to proceed to step S51.

At the step S51, the user inserts an optical disc 20 into a disc insertion hole 30 shown in FIG. 8. The processing operation then proceeds to step S52. Thus, the optical disc 20 inserted through the disc insertion hole 30 is loaded into the storage unit 5, resulting in the state where picture data can be recorded.

Figures 13A, 13B, 13C:
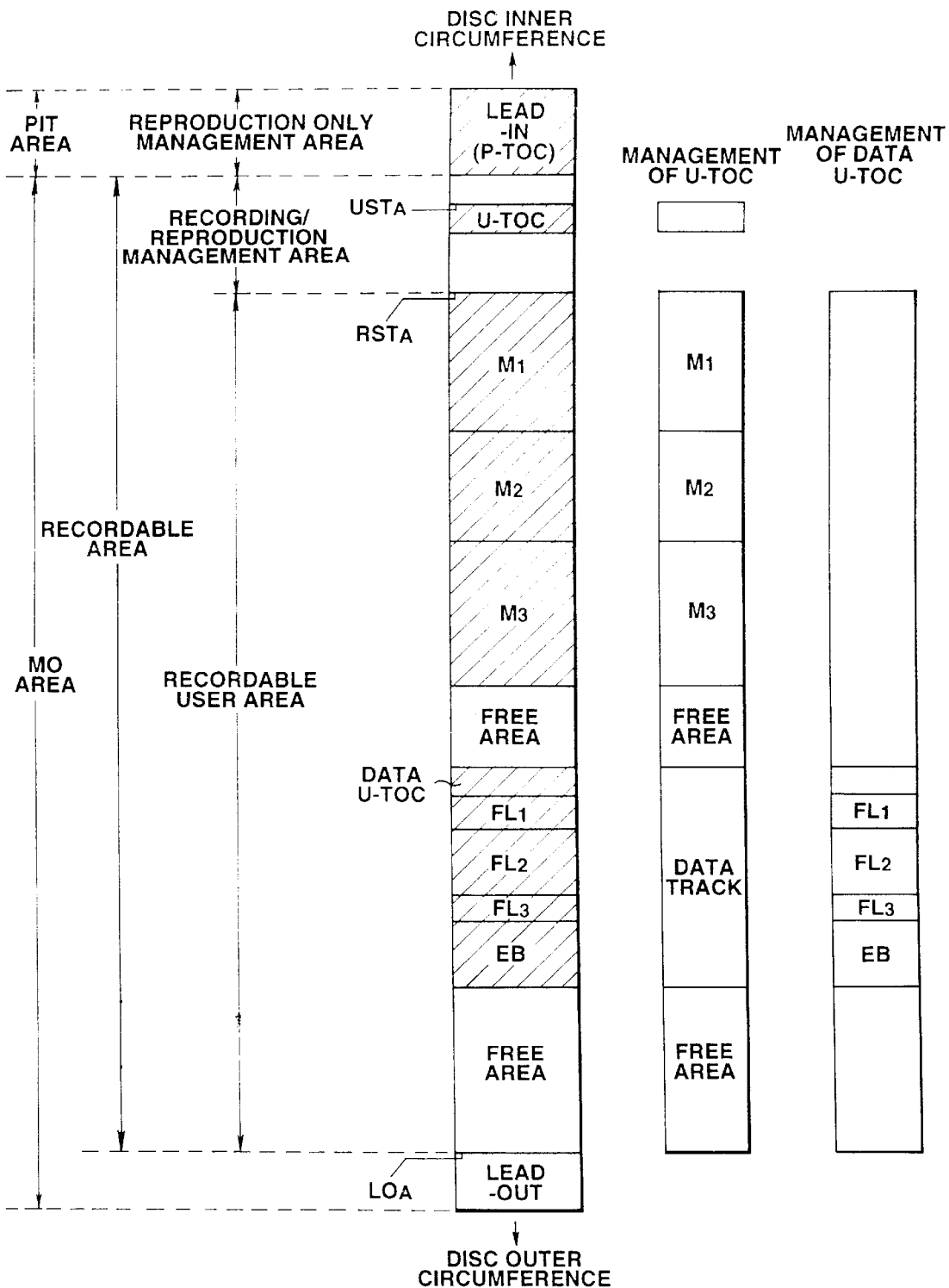
FIGS. 13(a)–13(c) are a view for explaining data structure of picture data recorded on the optical disc.

At the step S52, storage unit controller 5d shown in FIG. 6 controls the disc recording/reproducing section 5c so as to read P_TOC and U_TOC on the optical disc 20 shown in FIG. 13(a). Then, the controller 5d transfers respective data of the P_TOC and the U_TOC thus read out to system controller 6 shown in FIG. 1. The system controller 6 detects respective data of the P_TOC and the U_TOC thus transferred to thereby confirm whether or not data U_TOC exists, and confirms recording position of the U_TOC. In a more practical sense, it is impossible to carry out, by the U_TOC, management of the area where data file is formed. For this reason, the system controller 6 judges, in the case where the data file exists, that U_TOC exists at the leading portion of the data file. Thus, the processing operation proceeds to step S53.

At the step S53, the storage unit controller 5d controls the disc recording/reproducing section 5c so as to read the data U_TOC on the optical disc 20 shown in FIG. 13(a). Then, the controller 5d transfers data of the data U_TOC to RAM 6a of the system controller 6. The system controller 6 temporarily stores the data of the data U_TOC into the RAM 6a to read out therefrom to thereby determine the positions of respective directories and respective files. Thus, the processing operation proceeds to step S54. It is to be noted that retrieval of memory position of file will be described in detail, under the heading of Description of operation at the time of retrieval which will be described later.

At the step S54, the system controller 6 discriminates, on the basis of the data of the data U_TOC stored in the RAM 6a, whether not directory (PIC_MD) and overall information management file exist to thereby discriminate whether or not the optical disc is formatted for recording of picture data. In the case of NO, this optical disc 20 is formatted for recording of picture data to once complete this routine so that the optical disc 20 is in stand-by state until designation of recording is made for a second time. In the case of YES, the processing operation proceeds to step S55.

At the step S55, the system controller 6 controls the disc recording/reproducing section 5c so as to read out all management files through the storage section controller 5d, and temporarily stores, into the ROM 6a, all the management files which have been read out. Thus, the processing operation proceeds to step S56.

At the step S56, the system controller 6 carries out display control of monitor unit 9 so as to display picture to select the recording mode of picture to be recorded from now. In a more practical sense, select picture of the HD recording mode for recording picture of high resolution of 1024 pixels×1536 pixels and select picture of the UD recording mode for recording picture of super high resolution of 2048 pixels×3072 pixels are displayed on the monitor unit 9.

It is to be noted that while the picture of intermediate resolution is recorded at fixed data length of 2 clusters as described above, there may be employed an approach in which recording mode for recording picture of the intermediate resolution by fixed data length of 1 cluster is provided so that any one of the fixed length encoding at the data length of 2 clusters and fixed length encoding at the data length of 1 cluster can be selected by the user's intention. Thus, when the recording mode of fixed data length of 2 clusters is selected, intermediate resolution picture data of high resolution can be recorded. On the other hand, when the recording mode of the fixed data length of 1 cluster is selected, the number of recordable pictures can be increased although resolution is somewhat poor.

At the step S57, the system controller 6 detects operation state of the operation unit 10 to thereby discriminate whether any one of the HD recording mode and the UD recording mode is selected. In the case of NO, the step S57 is repeated until the above-mentioned selection is made. In the case of YES, the processing operation proceeds to step S58.

At the step S58, the system controller 6 calculates, on the basis of the total number of recorded pictures (total number of pictures of intermediate resolution picture data) in the overall management file stored in the RAM 6a, and the number of pictures and picture kind information of picture information in the picture data management file, the number of recordable pictures in the HD recording mode or the UD recording mode designated by user.

In a more practical sense, recording of about 200 pictures can be carried out by combination of only intermediate resolution picture data of 2 clusters and high resolution picture data of 8 clusters, and recording of about 100 pictures can be carried out by combination of only intermediate resolution picture data of 2 clusters and super high resolution picture data of 18 clusters. For this reason, when the recorded capacity is subtracted from recordable capacity in the entirety of the optical disc 20, the number of recordable pictures in the case where the HD recording mode is selected and the number of recordable pictures in the case where the UD recording mode is recorded are respectively calculated.

Subsequently, at step S59, the system controller 6 reads out picture directory information unit in the overall management file from the RAM 6a to allow the monitor unit 9 to undergo display control so as to display data of directory name, directory No. and the number of pictures within the directory, etc. Thus, the processing operation proceeds to step S60.

At the step S60, the system controller 6 detects the operation state of the operation unit 10 to thereby discriminate whether or not designation of directory for recording corresponding data is made from the user. In the case of NO, the processing operation proceeds to step S62. In the case of YES, the processing operation proceeds to step S71 shown in FIG. 36.

At the step S62, since designation of directory is not made from the user, the system controller 6 detects the operation state of the operation unit 10 to thereby discriminate whether or not formation of new directory except for the existing directories is designated. In the case of NO, the step S60 and the step S62 are repeated until formation of the new directory is designated. In the case of YES, the processing operation proceeds to step S63.

At the step S63, since formation of the new directory is designated, the system controller 6 judges the number of the existing directories by the overall information management file to attach directory No. of the new directory, and to form picture data management file and picture index file in the directory. Thus, the processing operation proceeds to the step S71 shown in FIG. 36.

Figure 36:
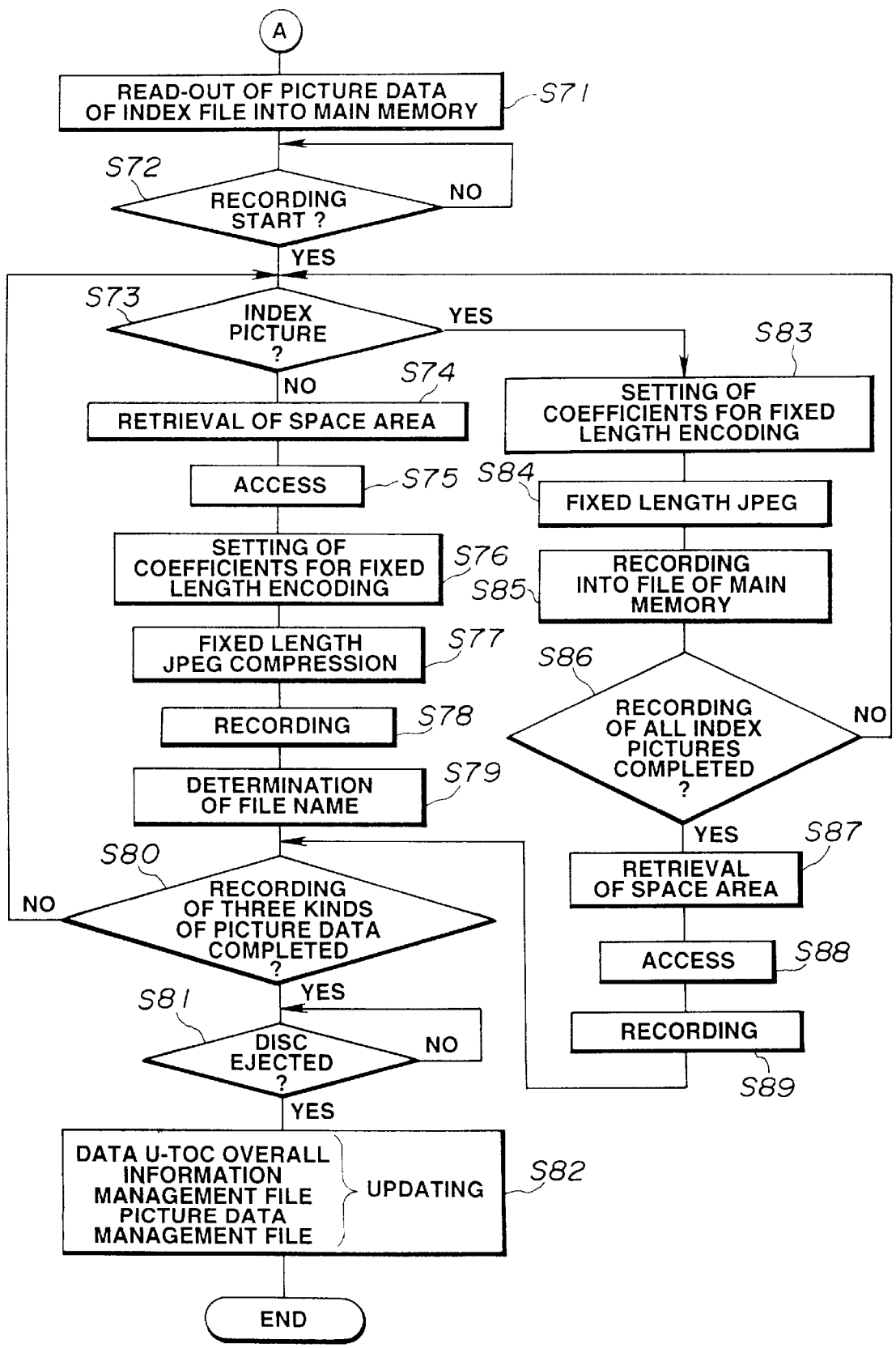
FIG. 36 is a flowchart for explaining recording operation of the latter half in the still picture recording/reproducing system.

At the step S71 shown in FIG. 36, the system controller 6 controls the disc recording/reproducing section 5c through the storage unit controller 5d so as to read out all the picture data recorded in the index file of the designated directory, and to conduct a control to transfer the picture data of the index file to the main memory 11a shown in FIG. 4. Thus, the processing operation proceeds to step S72. It is to be noted that the picture data recorded after having undergone fixed length encoding along with the header is read out as it is without allowing it to undergo expansion decoding processing to transfer it to the main memory 11a. In addition, when no picture data is recorded in the index file, there is no possibility that picture data is read out into the main memory.

At the step S72, the system controller 6 detects operation state of the operation unit 10 to thereby discriminate whether or designation of recording start is made from the user. In the case of NO, the step S72 is repeated until designation of the recording start is made. In the case of YES, the processing operation proceeds to step S73.

At the step S73, the system controller 6 discriminates whether or not picture to be recorded from now on is index picture. In the case of NO, the processing operation proceeds to step S74. In the case of YES, the processing operation proceeds to step S83.

At the step S83, data indicating that picture to be recorded from now on is index picture is delivered to the thinning and contraction/expansion controller 4i. The thinning and contraction/expansion circuit 4i is operative so that when the data is delivered thereto, it sets fixed length encoding coefficients for index picture at the contraction/expansion circuit 4h. Thus, the processing operation proceeds to step S84.

At the step S84, the thinning and compression/expansion controller 4i controls the compression/expansion circuit 4h so as to implement compression encoding processing to the picture data which has been caused to undergo thinning processing into ¼ on the basis of the set fixed length encoding coefficients to thereby form index picture which has been caused to undergo fixed length encoding so that the fixed data length has ¹⁄₁₅ clusters. The processing operation proceeds to step S85.

At the step S85, the system controller 6 controls the memory controller 13 so as to record index picture of 4096 bytes in total in which header is added to index file stored in the main memory 11a shown in FIG. 4. Thus, the processing operation proceeds to step S86.

At the step S86, the system controller 6 discriminates whether or not all index pictures are recorded into the main memory 11a. In the case of NO, the processing operation returns to the step S73. In the case of YES, the processing operation proceeds to step S87.

At the step S87, the system controller 6 retrieves the portion where entry of 2 bits (code indicating available allocation block) of the allocation block No. of volume space bitmap VSB in the data U_TOC stored in the RAM 6a is "00" to detect space area. Thus, the processing operation proceeds to step S88.

At the step S88, the system controller 6 controls the disc recording/reproducing section 5c so as provide access to the space area detected on the optical disc 20 through the storage unit controller 5d. Thus, the processing operation proceeds to step S89.

At the step S89, the system controller 6 controls the disc recording/reproducing section 5c so as to record index file having the index picture into the space area on the optical disc 20 through the storage unit controller 5d. Thus, the processing operation proceeds to the step S80.

In the case where the index picture is caused to undergo fixed length encoding to record it onto the optical disc 20, an approach is employed to temporarily record, before the index picture which has been caused to undergo fixed length encoding is recorded onto the optical disc 20, such picture in the order into the main memory 11a to thereby form a single index file from all index pictures in the main memory 11a thereafter to record it into physically continuous areas on the optical disc 20.

Namely, one index picture is caused to undergo fixed length encoding so that data length is 1/15 clusters as described above. For this reason, in order to record the picture data having data length of 1/15 clusters onto the optical disc 20, it is necessary to add dummy data corresponding to 14/15 clusters with respect to the picture data of 1/15 clusters so that data length of one cluster is provided. Accordingly, if picture data are recorded onto the disc every time the picture data of 1/15 clusters are formed, the recording area for the dummy data is greater than the recording area for picture data for index, thus failing to effectively utilize the recording area on the disc.

However, in the still picture recording/reproducing system in this embodiment, such an approach is employed to temporarily synthesize the picture data for index in the main memory 11a as index file to record the synthesized index file onto the disc after taking-in operations of all index pictures are completed. Namely, in the case where, e.g., index file having 25 index pictures are recorded, 15 index pictures (15×1/15 clusters) are recorded in the area of 1 cluster and the remaining 10 index pictures (10×1/15 clusters) and dummy data of 5/15 clusters are recorded in the area of the next 1 cluster. Thus, data quantity of dummy data recorded onto the disc can be lessened. As a result, the recording area on the disc can be effectively used.

Moreover, in the still picture recording/reproducing system in this embodiment, picture file of high resolution or picture file of intermediate resolution is formed by a series of flow to take in picture data from the scanner section 1, etc. to allow picture data to undergo fixed length encoding to record it onto the disc, and the next picture file is formed by the next series of flow. In the recording of index file, in the case where such a series of flow is employed, picture files of respective resolutions such as high resolution and intermediate resolution, etc. are recorded in succession. For this reason, there is the possibility that area of index picture to be recorded in the area at the succeeding stage of index picture recorded earlier cannot be ensured. In such a case, index files must be recorded in distributed manner on the disc. As a result, the read-out operation of the index file is inconveniently delayed.

However, in the still picture recording/reproducing system of this embodiment, since such an approach is employed to temporarily record plural index pictures which have been caused to undergo fixed length encoding into the main memory 11a to thereby form one file including all index pictures in the main memory 11a to record this index file into the physically continuous areas on the disc, index files recorded onto the disc can be necessarily continuous files. For this reason, in the case of reading out the index files from the optical disc 20, those files can be continuously reproduced (playback) because they are continuously recorded. Thus, high speed read-out operation can be achieved.

Explanation will be given in connection with the case where new index picture is supplemented to the index file. In this case, as described above, prior to recording, data of the index file is read out into the main memory 11a. In recording, new index picture is recorded in the area immediately after the index picture recorded last after dummy data added after the index picture recorded last is deleted (erased) (There is no necessity of deletion in the case where there is no dummy data).

On the other hand, when discrimination result is NO at the step S73, the processing operation proceeds to step S74. At the step S74, the system controller 6 detects space area on the optical disc for recording picture of intermediate resolution or picture of high resolution. Thus, the processing operation proceeds to step S75.

In a more practical sense, the system controller 6 retrieves the portion where entry of 2 bits (code indicating available allocation block) of the allocation block No. of the volume space bitmap VSB in the data U_TOC stored in the RAM 6a is "00" to thereby to carry out detection of the space area.

At the step S75, the system controller 6 detects optimum space area of space areas retrieved at the step S74 to control the disc recording/reproducing section 5c through the storage section controller 5d so that access thereto is provided.

In this case, it is most suitable that the optimum recording position is an area after the recorded file (file recorded last) recorded in order under the same directory and an area where areas of pictures (corresponding to several clusters) to be recorded are physically continuous.

However, in the case where large capacity data such as high resolution picture data (8 clusters) or super high resolution picture data (18 clusters) are recorded, and in the case where unrecorded area of the optical disc 20 is small, there are instances where it is impossible to ensure areas physically continuous in the area after the file recorded last of the same directory. In such a case, excellent record block ERB is formed to link, by this ERB, distributed areas which are not continuous to record one file.

At step S76, the system controller 6 sets fixed length encoding coefficients corresponding to the high resolution picture data or the super high resolution picture data at the thinning and compression/expansion controller 4i. Thus, the processing operation proceeds to step S77.

At the step S77, the thinning and compression/expansion controller 4i controls the compression/expansion circuit 4h so as to form high resolution picture data of 8 clusters or super high resolution picture data of 18 clusters on the basis of the set fixed length encoding coefficients. Thus, the processing operation proceeds to step S78.

At the step S78, the storage unit controller 5d controls the disc recording/reproducing section 5c so as to record the picture data which has been caused to undergo fixed length encoding into the detected optimum area on the optical disc 20. Thus, the processing operation proceeds to step S79.

At the step S79, the system controller 6 carries out recording control of the picture data, and determines, in succession, data of picture data management file of the designated directory and file names corresponding to resolutions of respective picture data. Thus, the processing operation proceeds to step S80.

In a more practical sense, e.g., recording in the HD recording mode of first to sixth pictures which have been read from the negative film into the picture directory PIC00001 is as follows.

Namely, since the number of pictures recorded in the HD recording mode is judged to be zero from data of the management file of picture data in the RAM 6a, high resolution(HD) of the first picture is caused to be PHP00000. PMP, and the intermediate (SD) thereof is caused to be PSN00000. PMP. Accordingly, when the six pictures have all been recorded, films of PHP00000. PMP to PHP00005. PMP as high resolution and PSN00000. PMP to PSN0005. PMP are formed.

Explanation will be given below in connection with the case where index pictures of these six pictures are recorded. These six index pictures have been already formed at the time of format, and all pictures are recorded in order into the PIDX000. PMX read into the main memory 11a. For this reason, new index file is not formed. It is to be noted that in the case the number of index pictures recorded in one index file is above the number of index pictures set in advance (e.g., 25 in this example), second index file such as PIDX001. PMX, etc. is newly formed.

At step S80, the system controller 6 discriminates whether or not picture data of three kinds of resolutions of low resolution picture data (index picture), intermediate resolution picture data and high resolution picture data (or super high resolution picture data) have been all recorded. In the case of NO, the processing operation returns to the step S73 to record picture data of resolutions which have not yet recorded. In the case of YES, the processing operation proceeds to step S81.

At the step S81, the system controller 6 detects whether or not eject key 32 of the operation unit 10 is turned ON. In the case of NO, the step S81 is repeated. In the case of YES, the processing operation proceeds to step S82.

Figure 35:
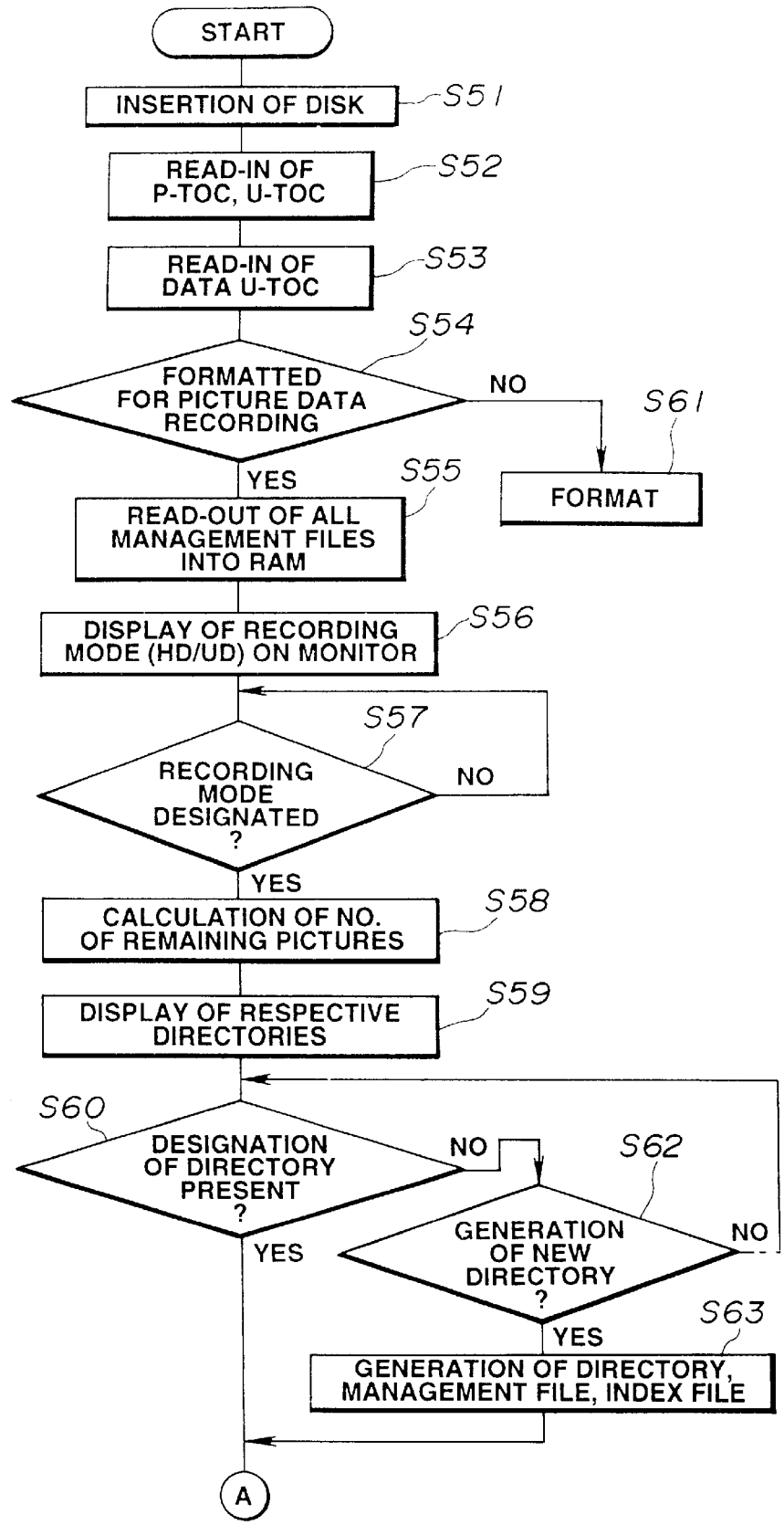
FIG. 35 is a flowchart for explaining recording operation of the first half in the still picture recording/reproducing system.

At the step S82, the system controller 6 updates related data of the data U_TOC, the overall management information file and the picture data management file recorded on the disc into respective data of data U_TOC, overall management information file and picture data management file recorded in the RAM 6a to complete the entire routine according to the recording operation shown in FIGS. 35 and 36.

In a more practical sense, in the data U_TOC, respective data such as Volume Descriptor (VD), Volume Space Bitmap (VSB), Management Table (MT), Directory Record Block (DRB) and Extents Record Block (ERB), etc. are mainly rewritten.

Namely, in the VD, data relating to allocation block (recordable allocation block, etc.), No. of directories (in the case where formation of new directory is designated), No. of files, data relating to DRB (in the case where directory or file is newly formed), and data relating to ERB (in the case where newly formed file is recorded at physically discontinuous position and is linked by ERB), etc. are rewritten.

Moreover, in the VSB, codes of 2 bits indicating attribute of respective allocation blocks, etc. are rewritten.

Further, in the MT, when DRB and ERB are newly formed, MT is entered. It is to be noted that in the case where one directory record unit in the existing DRB is supplemented, MT is not updated.

Further, in the DRB, in the case where directory is newly formed, directory record unit (for directory) is supplemented by one. Similarly, in the case where a file is formed, directory record unit (for file) is supplemented by one per each file.

In addition, in the ERB, in the case where files are formed by the DRB and those files are not physically continuous, that ERB is formed. It is to be noted that the ERB is not formed at the time of format.

In the overall management information file, data such as total number of pictures, next picture directory No., total number of picture directories, and picture directory information unit, etc. are mainly rewritten. With respect to the picture directory information unit, when directory is formed, data of one picture directory information unit is formed, and when a file within the existing directory is formed or updated, index picture No., the number of pictures within directory, and index picture individual ID information, etc. are updated.

Moreover, with respect to the picture data management file, when directory is formed, this picture data management file is newly formed. Further, data such as No. of pictures, No. of picture index files, next picture index file No., index file information, and picture information unit, etc. are mainly updated.

With respect to the index file information, when index file is newly formed, that information is updated. Moreover, with respect to indices, when No. of indices in the index file is supplemented, that No. of indices is updated. Further, since picture information are recorded in correspondence with respective index pictures, the number of picture information units is increased by the increased number of pictures. In the ordinary recording, data in the picture information unit is not updated. However, when switching of order of index pictures is carried out, switching of picture No. is carried out so that the data subjected to switching is updated.

10. [Description of another recording operation]

Another recording operation for picture data of respective resolutions as described above will now be described with reference to the flowchart of FIG. 37. When the routine of the step S35 to the step S63 of the flowchart which has been described with reference to FIG. 35 is completed, the processing operation by the flowchart of FIG. 37 starts to proceed to step S91. At the step S91, the system controller 6 reads out all picture data which have been recorded in the index file of the designated directory. At step S92, the system controller 6 detects designation of recording start from the user. Thus, the processing operation proceeds to step S93.

Figure 37:
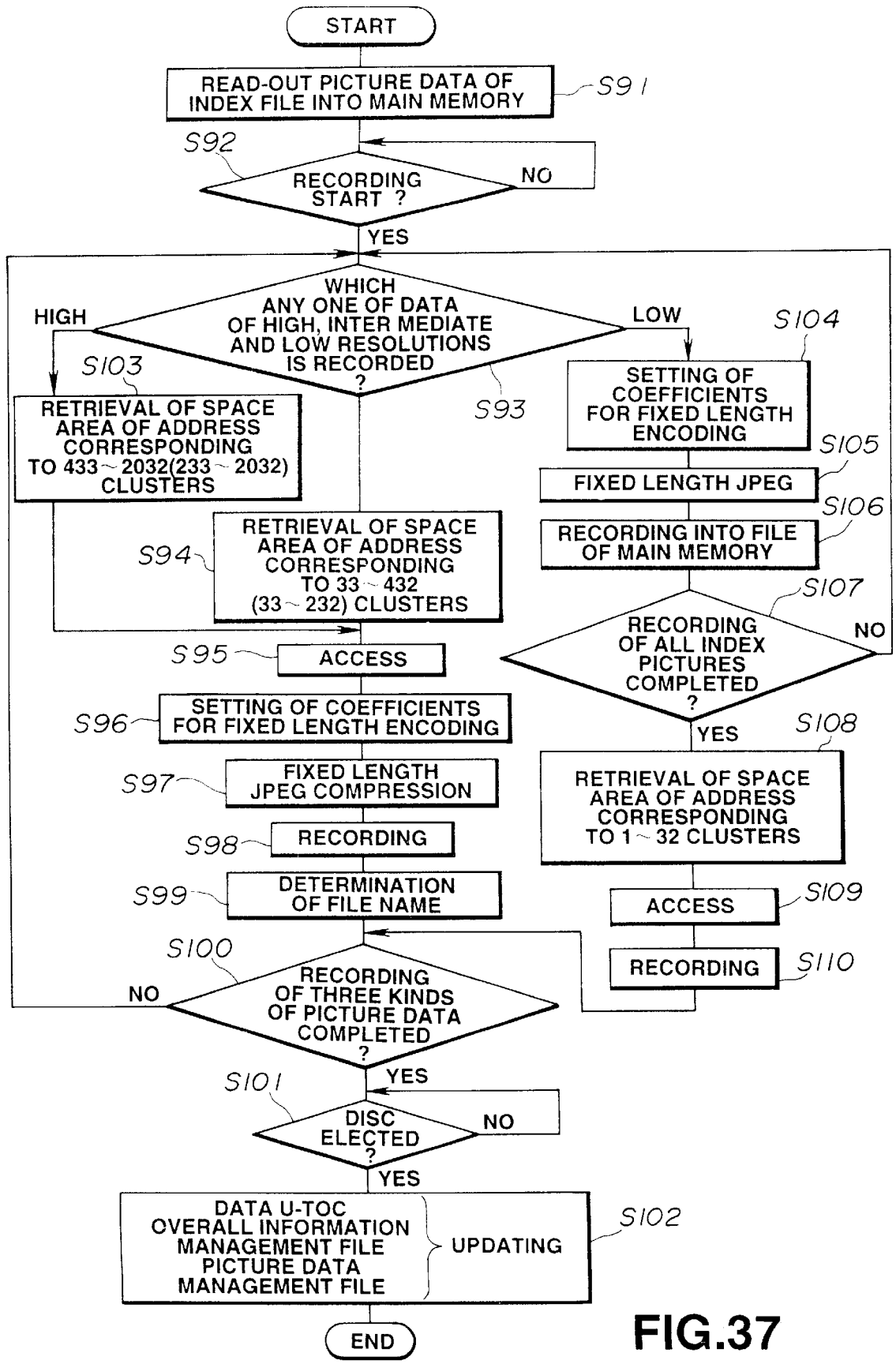
FIG. 37 is a flowchart for explaining recording operation of picture data every respective resolutions in the still picture recording/reproducing system.

It is to be noted that steps S91 and S92 shown in FIG. 37 are steps respectively corresponding to steps S71 and S72 which have been described with reference to FIG. 36.

At the step S93, the system controller 6 discriminates whether picture data to be recorded is high resolution picture data (HD or UD), intermediate resolution picture data (SD) or low resolution picture data (index picture data). When current recording operation is discriminated as recording of low resolution picture data, the processing operation proceeds to step S104. When the current recording operation is discriminated as recording for intermediate resolution picture data, the processing operation proceeds to step S94. When the current recording operation is discriminated as recording for high resolution picture data, the processing operation proceeds to step S103.

Steps 104 to 110 to which the processing operation proceeds after the current recording operation is discriminated as recording for low resolution picture data at the step S93 respectively correspond to the steps S83 to S89 shown in FIG. 36.

Namely, at the step S104, data indicating that picture to be recorded from now on is index picture is delivered to the thinning and compression/expansion controller 4i shown in FIG. 5. The thinning and compression/expansion controller 4i is operative so that when the data is delivered thereto, it sets fixed length encoding coefficients for index picture at the compression/expansion circuit 4h. Thus, the processing operation proceeds to step S105.

At the step S105, the thinning and compression/expansion controller 4i controls the compression/expansion circuit 4h on the basis of the set fixed length encoding coefficients so as to implement compression encoding processing to the picture data which has been caused to undergo thinning processing into ¼ to thereby form index picture which has been subjected to fixed length encoding so as to have fixed data length of 1/15 clusters. Thus, the processing operation proceeds to step S106.

At the step S106, the system controller 6 controls memory controller 13 so as to record index picture of 4096 bytes in total in which header is added to the file stored in the main memory 11a shown in FIG. 4. Thus, the processing operation proceeds to step S107. At the step S107, the system controller 6 discriminates whether or not all of index pictures have been recorded into the main memory 11a. In the case of NO, the processing operation returns to the step S93. In the case of YES, the processing operation proceeds to step S108.

At the step S108, the system controller 6 retrieves the portion where entry of 2 bits (code indicating available allocation block) of allocation block No. of volume space bitmap VSB in data U_TOC stored in the RAM 6a is "00" to thereby detect space area. Thus, the processing operation proceeds to step S109.

At the step S109, the system controller 6 controls the disc recording/reproducing section 5c so as to provide access to the detected space area on the optical disc 20 through the storage section controller 5d. Thus, the processing operation proceeds to step S110.

At the step S110, the system controller 6 controls the disc recording/reproducing section 5c so as to record the index picture into the space area on the optical disc 20 through the storage section controller 5d. Thus, the processing operation proceeds to step S100.

At the step S108, space area for low resolution picture data is detected. At step S94, space area for intermediate resolution picture data is detected. At step S103, space area for high resolution picture data (or for ultra high resolution picture data) is detected. This space area detection is carried out by retrieving the position where entry of 2 bits (code indicating available allocation block) of allocation block No. of volume space bitmap VSB in the data U_TOC stored in the RAM 6a as described above is "00". In this instance, designations of addresses to be retrieved are carried out in correspondence with recording of respective resolutions.

Namely, the case of recording of low resolution picture data (step S108) will be described below. In the ordinary use, as many as 200 index images at maximum can be recorded in the HD recording mode. In both the case where HD recording mode is selected and the case the UD recording mode is selected, since the index picture has fixed data length of 1/15 clusters, the area necessary as the area for index picture consists of 200×1/15 clusters=13.33 clusters. However, when the number of directories is increased, there may also exist directories where only one or two index pictures are recorded. Since the maximum number of directories is set to 20, capacity necessary for recording as index picture is required to the maximum degree in such a case. As a result, at least 32 clusters are required. For this reason, the system controller 6 carries out, in detecting space area at the time of recording index picture, retrieval of code of allocation blocks designated by addresses corresponding to 1 to 32 clusters from the disc inner circumference to detect space area. It is to be noted that detection of other space areas is not carried out in this case.

The case of recording of the intermediate resolution picture data (step S94) will be described below. In the HD recording mode, 200 pictures can be recorded at maximum. Since the picture of intermediate resolution (SD) is recorded by fixed data length of 2 clusters, 2 clusters×200=400 clusters are required as the picture area of the intermediate resolution. For this reason, the system controller 6 carries out, in detecting space area at the of recording picture of intermediate resolution, retrieval of code of allocation blocks of areas of 400 clusters succeeding to the area (1 to 32 clusters) of index picture from the disc inner circumference, i.e., areas designated by addresses corresponding to 33 to 432 clusters to detect space area. Thus, the processing operation proceeds to step S95.

Similarly, in the UD recording mode, as many as 100 pictures at maximum can be recorded. Since picture of intermediate resolution (SD) is recorded by fixed data length of 2 clusters, 2 clusters×100=200 clusters are required as the picture area of the intermediate resolution. For this reason, the system controller 6 carries out, in detecting space area at the time of recording picture of the intermediate resolution, retrieval of code of allocation block of area of 200 clusters succeeding to the area (1 to 32 clusters) of the index picture from the disc inner circumference, i.e., area designated by addresses corresponding to 33 to 232 clusters to detect space area. Thus, the processing operation proceeds to step S95.

The case of recording of high resolution picture data and ultra high resolution picture data (step S103) will now be described. Initially, in the HD recording mode, 200 pictures at maximum can be recorded, and high resolution picture data is caused to have fixed data length of 8 clusters. For this reason, 8 clusters×200 (pictures)=1600 clusters are required in the picture area for the high resolution picture data. As can be seen from the above, the system controller 6 carries out, at the step S103, retrieval of code of allocation block of area of 1600 clusters succeeding to the area of index picture (1 to 32 clusters) and the area of picture of intermediate resolution (33 to 432 clusters) from the disc inner circumference, i.e., area designated by address corresponding to 433 to 2032 clusters to detect space area. Thus, the processing operation proceeds to step S95.

Similarly, in the UD recording mode, 100 pictures at the maximum can be recorded, and the ultra high resolution picture data is caused to have fixed data length of 18 clusters. Accordingly, space area of 18 clusters×100=1800 clusters is required as the picture area for the ultra high resolution. For this reason, the system controller 6 carries out, in detection of space area at the time of recording picture of the ultra high resolution, retrieval of code of allocation block of area of 1800 clusters succeeding to the index picture area (1 to 32 clusters) and the intermediate resolution picture area (33 to 232 clusters), i.e., areas designated by addresses corresponding to 233 to 2032 clusters to detect space area. Thus, the processing operation proceeds to step S95.

When such retrieval of space is completed, the system controller 6 controls, at the step S95, the disc recording/ reproducing section 5c through the storage unit controller 5d so as to provide access to an optimum area of the retrieved space areas. Thus, the processing operation proceeds to step S96. As a retrieval method for optimum recording position in this case, there may be employed a method of respectively carrying out space area retrievals irrespective of the directory to record, in order, respective data at the positions where space area first exists. Accordingly, recorded data are recorded in the order from the leading portions of respective areas.

At the step S96, the system controller 6 sets fixed length encoding coefficient corresponding to high resolution picture data or ultra high resolution picture data at the thinning and compression/expansion controller 4i. Thus, the processing operation proceeds to step S97.

At the step S97, the thinning and compression/expansion controller 4i controls the compression/expansion circuit 4h so as to form high resolution picture data of 8 clusters or ultra high resolution picture data of 18 clusters on the basis of the set fixed length encoding coefficients. Thus, the processing operation proceeds to step S98.

At the step S98, the storage section controller 5d controls the disc recording/reproducing section 5c so as to record the picture data which has been caused to undergo fixed length encoding into the detected optimum area on the optical disc 20. Thus, the processing operation proceeds to step S99.

At the step S99, the system controller 6 carries out recording control of the picture data, and successively determines file names corresponding to data of picture data management file of the designated directory and resolutions of respective picture data. Thus, the processing operation proceeds to step S100.

At the step S100, the system controller 6 discriminates whether or not picture data of three kinds of resolutions of low resolution picture data (index picture), intermediate resolution picture data and high resolution picture data (or ultra high resolution picture data) have been all recorded. In the case of NO, the processing operation returns to step S93 to record picture data of resolution which has not been yet recorded. In the case of YES, the processing operation proceeds to step S101. At the step S101, the system controller 6 detects whether or not the eject key 32 of the operation unit 10 is turned ON. In the case of NO, this step S101 is repeated. In the case of YES, the processing operation proceeds to step S102. At the step S102, the system controller 6 updates related data of the data U_TOC, the overall management information file and the picture data management file recorded on the disc into respective data of the data U_TOC, the overall management information file and the picture data management file recorded in the RAM 6a. Thus, the entire routine according to another recording operation shown in FIG. 37 is completed.

It is to be noted that these steps S95 to S102 respectively correspond to the above-described steps S75 to S82 sown in FIG. 36.

In such another recording operation, retrieval areas of low resolution, intermediate resolution and high resolution (or ultra high resolution) are respectively designated by addressing of allocation block in the VSB stored in the RAM 6a. Namely, by only reading out data into the VSB of the RAM 6a, the recording area on the disc is divided by addressing. For this reason, detection of space area can be made at high speed. For example, it is conceivable to physically determine recording positions of respective areas on the disc to carry out recording. However, since area quantities used in the HD recording mode and the UD recording mode (area of intermediate resolution and area of high resolution) are different from each other in this case, it is necessary to ensure the area in advance on the assumption that the area quantity is required to the maximum degree. Namely, it is necessary to ensure respective areas of 400 clusters at the time of HD recording mode in the intermediate resolution area and 1800 clusters at the time of UD mode in the high resolution area. For this reason, it is impossible to effectively utilize the recording area.

In addition, while it has been described that addresses for retrieval of space area are designated as addresses for index, intermediate resolution and high resolution from the disc inner circumferential side, addresses for retrieval of space area may be designated as addresses for index, intermediate resolution and high resolution from the disc outer circumferential side in a manner opposite to the above. Such addressing method may be suitably changed in accordance with design.

11. [Recording of album name, etc.]

An album is defined so that one picture directory formed at the lower level (layer) of directory is caused to be one album. In this still picture recording/reproducing system, when recording operations of picture data of respective resolutions are completed as stated above, album names for every respective album, picture names for every pictures of respective albums, key word for retrieving desired picture, and disc name can be inputted.

In this case, the user allows write key 53 provided on the operation unit 10 to be turned ON. When the write key 53 is turned ON, the system controller 6 detects such ON operation, resulting in the write mode for carrying out input of character information.

Then, the user operates vertical/horizontal movement key 54. The system controller 6 allows the display section 26 to undergo display control so as to display, in order, e.g., characters of album name, picture name, key word and disc name every time the vertical/horizontal movement key 54 is operated once. The user looks at characters displayed on the display section 26 to determine what information is carried out from now on to allow EXEC key 55 provided on the operation unit 10 to be turned ON. Thus, the system controller 6 recognizes information to be inputted from now on.

Then, the user operates the ten key provided on the operation unit 10. Thus, the system controller 6 allows the display section 26 to undergo display control so as to display characters corresponding to the operation of the ten key. Then, the user allows the EXEC key to be turned ON for a second time when an album name, etc. displayed on the display section 26 is in correspondence with desired album name, etc.

When the EXEC key 55 is turned ON for a second time, the system controller 6 detects such ON operation to complete the write mode, and to control the disc recording/reproducing section 5c so as to record inputted character information such as album name, etc. onto the optical disc 20 as the so-called ASCII code.

In a more practical sense, in the case where recording of a desired picture name is carried out, the user allows the write key to be turned ON to cause the system controller 6 to be in write mode, and to allow the vertical/horizontal movement key 54 to be turned ON to select "Picture Name" which is information to be inputted from now on. Then, the user operates the ten key 50 to input picture name of that picture. Thus, the system controller 6 forms ASCII codes corresponding to the inputted characters to deliver them to the disc recording/reproducing section 5c. Thus, the disc recording/reproducing section 5c records the ASCII codes corresponding to the picture name onto the optical disc 20.

In this example, the number of characters which can be inputted as the picture name is set to, e.g., 16 (characters), and the number of characters which can be inputted as the album name is set to 32 (characters), wherein they can be inputted with alphabet, katakana and/or kanji, etc. Namely, input of 432 characters (16 characters×25 pictures+32 characters for album name) can be inputted with respect to one picture on screen.

12. [Description of reproducing (playback) operation]

The operation of the still picture recording/reproducing (playback) system in the case where picture data and character data (ASCII code) recorded on the optical disc 20 in this way are reproduced (played back) to display them on the monitor unit 9 will now be described.

In this case, the user initially operates album key 33 provided on the operation unit 10. The system controller 6 detects, every time the album key 33 is turned ON once, this ON operation to control the recording/reproducing section 5c and the display section 26 so as to reproduce album name of that album to display it. Four albums are recorded onto the optical disc 20. Every time the album key 33 is turned ON, four album names are displayed in order on the display section 26.

Then, the user selects desired album from the four albums thereafter to allow first index key 38a to be turned ON. The system controller 6 detects, when the first index key 38a is turned ON, such ON operation to control the disc recording/reproducing section 5c so as to reproduce picture data of low resolution for index of the selected album and ASCII code (album name, picture name, etc.).

One album consists of, e.g., 50 picture data. While such 50 pictures may be displayed on display screen at a time, display area of one picture necessarily becomes narrow, resulting in the possibility that selection of desired picture by the user may become difficult. For this reason, the system controller 6 allows the disc recording/reproducing section 5c to undergo read-out control so as to read out picture data for low resolution corresponding to 25 pictures by single designation. Thus, the disc recording/reproducing section 5c initially reads out, from the inner circumferential side of the optical disc 20, picture data for low resolution corresponding to 25 pictures, ASCII codes of album names, and ASCII codes of respective pictures to deliver the picture data to the compression/expansion circuit 4h shown in FIG. 5 through EFM circuit 21, and to deliver the ASCII codes directly to the buffer circuit 4b.

The compression/expansion circuit 4h implements expansion processing for low resolution to the picture data to deliver it to the buffer circuit 4b through raster/block converting circuit 4g and selector 4f. The buffer circuit 4b temporarily stores thereinto the picture data and the ASCII codes.

When the picture data of low resolution and the ASCII codes are stored into the buffer circuit 4b in this way, the thinning and contraction/expansion controller 4i allows the buffer circuit 4b to undergo read-out control so that the ASCII codes stored in the buffer circuit 4b are transferred at a high speed along with the picture data. Thus, the ASCII codes are transferred at high speed to the video memory 11b shown in FIG. 4 without intervention of the system controller 6 through the interface 4a along with the picture data.

The memory area of the video memory 11b has longitudinal and lateral sizes of 2048 pixels×2048 pixels as a whole. The memory area of 1024 pixels×1536 pixels (length×breadth) thereof is the memory area for picture data (picture data area), and the memory area of 16 pixels×32 pixels (corresponding to 512 bytes) of the remainder area except for the area for picture data is command area which is the memory area for ASCII code.

When picture data and ASCII codes are transferred at a high speed from the buffer circuit 4b, the memory controller 13 conducts a control to write the picture data into the picture data area of the video memory 11b, and to conducts a control to write the ASCII codes into the command area.

When picture data and the ASCII codes are written into respective memory areas of the video memory 11b in this way, the memory controller 13 reads out the ASCII code written in the command area to interpret the ASCII codes. Then, the memory controller 13 allows the video memory 11b to undergo write control so as to write thereinto characters of the interpreted ASCII code as picture data.

In a more practical sense, in the case where ASCII code which has been read out from the command area is "41H", this ASCII code indicates character of "A" of alphabet. For this reason, the memory controller 13 forms, e.g., picture data of character of "A" of 24 pixels×24 pixels to allow the video memory 11b to undergo write control so that the character of "A" is displayed below that picture.

When write operation of picture data and picture data indicating character of the ASCII code (these two picture data will be simply collectively referred to as picture data hereinafter) into the video memory 11b is completed, the memory controller 13 carries out read-out control of the picture data written in the video memory 11b. This picture data is converted into an analog picture signal through D/A converter, and is delivered to the monitor unit 9. Thus, as shown in FIG. 41, 25 pictures for index and picture names of respective pictures are displayed along with the album name of the selected album on the display screen of the monitor unit 9.

Moreover, in the case where the user desires to display the remaining 25 pictures of the selected album, he operates the operation unit 10 to designate display of the remaining 25 pictures. Thus, the system controller 6 controls the disc recording/reproducing section 5c so as to reproduce picture data for low resolution of the remaining 25 pictures and ASCII codes of the respective picture data. Thus, the picture data for low resolution of the remaining 25 pictures and the ASCII codes are transferred at high speed as described above, and the remaining 25 pictures are displayed on the monitor unit 9.

When 25 pictures are displayed as pictures for index on the monitor unit 9, the user operates the operation unit 10 so as to select desired picture from these pictures.

The system controller 6 detects, when the operation unit 10 is operated so that desired picture is designated, such designation of the desired picture to control the disc recording/reproducing section 5c so as to read out, from the optical disc 20, picture data of intermediate resolution corresponding to the selected picture. Thus, the disc recording/reproducing section 5c reads out picture data having intermediate resolution for display record on the optical disc 20. The picture data of intermediate resolution is delivered to the video memory 11b as described above.

The memory controller 13 temporarily stores, when the picture data of intermediate resolution is delivered to the video memory 11b, this picture data of intermediate resolution to read out such picture data to deliver it to the monitor unit 9 through the D/A converter. Thus, the picture image selected by the user is on the display screen of the monitor unit 9 in a full screen size.

In this case, the still picture recording/reproducing (playback) system can select the desired picture without displaying the picture for index to display it on the monitor unit 9.

Namely, in the case where the album in which the desired picture is recorded and the picture No. are known, the user operates the ten key 50 provided on the operation unit 10 to designate that album, and to designate that picture No.

Since 50 pictures can be recorded in one album as described above, the user inputs a desired picture No. by the ten key 50 to thereby select the desired picture. Then, the user selects the desired picture No. thereafter to allow reproduction (playback) key 41 to be turned ON.

When the system controller 6 detects that the reproduction key 41 is turned ON, it controls the disc recording/reproducing section 5c so as to read out picture data of intermediate resolution of picture No. of the designated album. Thus, picture data of intermediate resolution of the designated picture No. is read out from the optical disc 20, and picture image corresponding to the picture data of intermediate resolution is displayed on the monitor unit 9.

Moreover, such selection of desired picture can be carried out also by using retrieval key 52 provided on the operation unit 10. Namely, when the retrieval key 52 is turned ON, the system controller 6 is brought into the retrieval mode. When the system controller 6 is placed in the retrieval mode, it allows the display section 26 to undergo display control so as to display, in order, characters of picture name, key word, recording data and recording time every time the vertical/horizontal movement key 54 is operated once. When the user selects information to be inputted from the picture name, the key word, the recording date and recording time, he inputs picture name, key word, recording data or recording time of a picture to be retrieved by using the ten key 50 to allow the EXEC key 55 to be turned ON.

Thus, the system controller 6 detects that the EXEC key 55 has been turned ON to start retrieval. Then, the system controller 6 retrieves picture corresponding to the picture name and key word, etc. to allow the display section 26 to undergo display control so as to display album No., album name, picture name and picture No., etc. of the picture thus retrieved. It is to be noted that in the case where there are plural corresponding pictures, the display section 26 is caused to undergo display control so as to display, plural times, album Nos. and album names, etc.

Then, the user selects desired picture from the picture names, etc. displayed on the display section 26 by using the vertical/horizontal movement key 54 to allow the reproduction key 41 to be turned ON.

The system controller 6 detects, when the reproduction key 41 is turned ON, such ON operation to control the disc recording/reproducing section 5c so as to reproduce picture data of the selected picture.

Thus, the designated picture data is read out from the optical disc 20, and is delivered to the monitor unit 9, on which it is displayed.

In such cases where the user cannot recognize what album is formed within the disc to have an intention to carry out reproduction of desired picture therefrom, he allows second index key 38b of the operation unit 10 to be turned ON.

In recording picture data of low resolution onto the optical disc 20, picture data of low resolution recorded at the beginning of respective albums are recorded in advance on the optical disc as respective one index files.

The system controller 6 detects, when the second index key 38b is turned ON, such ON operation to control the disc recording/reproducing section 5c so as to reproduce the index file. Thus, index file including picture data of low resolution of the picture recorded at the beginning of each album is reproduced from the optical disc 20, and is delivered to the monitor unit 9 through the video memory 11b as described above.

Thus, only the leading pictures (A1 to Y1) of respective albums (album A to album Y) can be displayed on the monitor unit 9. Accordingly, the user can retrieve album in which the desired picture is recorded.

The method of simultaneously displaying several pictures including the leading picture becomes more easy to select desired album rather than the method of displaying only the leading pictures of respective albums as stated above. For this reason, third index key 38c is provided at the operation unit 10.

Similarly, in recording picture data of low resolution onto the optical disc 20, picture data of low resolution recorded at the beginning of respective albums and picture data of low resolution from the leading picture up to the fifth picture are recorded in advance on the optical disc as one index file.

When the third index key 38c is turned ON, the system controller 6 detects this ON operation to control the disc recording/reproducing section 5c so as to reproduce such index picture data.

Thus, picture data of low resolution of pictures recorded at the beginning of the respective albums and picture data of low resolution from the leading picture up to the fifth picture are reproduced, and are delivered to the monitor unit 9 through the video memory 11b as described above.

Thus, pictures from the leading picture up to the fifth picture (A1 to A5, B1 to B5, C1 to C5, D1 to D5, E1 to E5) of respective albums (album A to album E) can be displayed on the monitor unit 9 as shown in FIG. 42. Accordingly, the user can easily retrieve album in which desired picture is recorded.

There are instances where the method of displaying pictures of respective albums every predetermined number of picture allows the contents of respective albums to be more easily understood rather than the method of successively displaying pictures of respective albums. In order to cope with such case, fourth index key 38d is provided at the operation unit 10.

Similarly, at the time of recording picture data of low resolution onto the optical disc 20, picture data of low resolution recorded at the beginning of respective albums, picture data of low resolution recorded succeedingly by ten pictures from the leading picture, and picture data of low resolution recorded succeedingly by twenty pictures from the leading picture are recorded in advance on the optical disc as one index file.

Namely, when the fourth index key 38d is turned ON, the system controller 6 detects this ON operation to control the disc recording/reproducing section 5c so as to reproduce the index file.

Thus, picture data of low resolution of respective albums reproduced for every 10 pictures from the optical disc 20 are reproduced, and are delivered to the monitor unit 9 through the video memory 11b as described above.

Thus, pictures (A1, A11, A21, A31, A41, B1, B11, B21, B31, B41, C1, C11, C21, C31, C41, D1, D11, D21, D31, D41, E1, E11, E21, E31, E41) reproduced (played back) for every 10 pictures of respective albums (album A to album E) can be displayed on the monitor unit 9. Accordingly, the user can more easily retrieve album in which desired picture is recorded.

There are instances where when there is employed the method of displaying plural pictures of respective albums within a picture on screen, respective pictures are difficult to see, and are difficult to be retrieved. In order to cope with such case, first album search key 56 is provided at the operation section 10.

Namely, when the first album search key 56 is turned ON, the system controller 6 detects this ON operation to control the disc recording/reproducing section 5c so as to continuously reproduce picture data of intermediate resolution of the pictures recorded at the leading portions of respective albums.

Thus, picture data of intermediate resolution of respective pictures recorded at the leading portions of the respective albums are reproduced from the optical disc 20 by the disc recording/reproducing section 5c, and are transferred into the video memory 11b as described above. The memory controller 13 immediately reads out, when the respective picture data of intermediate resolution are stored into the video memory 11b, such picture data to deliver them to the monitor unit 9.

Figure 43:
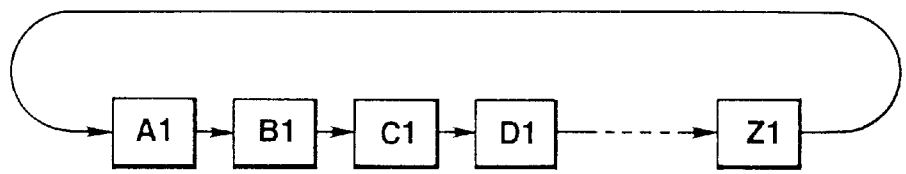
FIG. 43 is a view for explaining first album search operation in the still picture recording/reproducing system.

Thus, as shown in FIG. 43, pictures (A1 to Z1) recorded at the leading portions of respective albums (album A to album Z) can be successively displayed on the monitor unit 9. Accordingly, the user can retrieve desired album at a high speed.

In the case where the user selects desired album from albums (pictures) successively displayed in this way, he allows the stop key 42 to be turned ON when a desired picture is displayed. The system controller 6 is operative so that when the stop key 42 is turned ON in such state, it recognizes that album to which picture displayed at the time point when the stop key 42 is turned ON belongs is designated to carry out reproduction and/or editing, etc. on the basis of the album at times subsequent thereto.

There are instances where if only leading pictures of the respective albums are successively displayed, the user cannot recognize the content of corresponding album, and it is thus difficult to retrieve desired album. In order to cope with such a case, second album search key 57 is provided at the operation section 10.

Namely, when the second album search key 57 is turned ON, the system controller detects this ON operation to control the disc recording/reproducing section 5c so as to successively reproduce picture data of intermediate resolution of pictures recorded at the leading portions of respective albums and picture data of intermediate resolution, e.g., up to third picture.

Thus, the picture data of intermediate resolution of respective pictures recorded at the leading portions of the respective albums and the picture data of intermediate resolution up to the third picture are reproduced from the optical disc 20 by the disc recording/reproducing section 5c, and are transferred to the video memory 11b as described above. The memory controller 13 immediately reads out, when the respective picture data of intermediate resolution are stored into the video memory 11b, such picture data to deliver them to the monitor unit 9.

Figure 44:
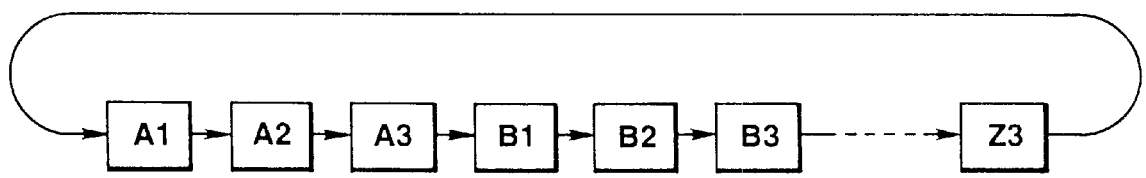
FIG. 44 is a view for explaining second album search operation in the still picture recording/reproducing system.

Thus, as shown in FIG. 44, pictures (A1 to A3, B1 to B3, C1 to C3 . . .) recorded as pictures from the leading picture of respective albums (album A to album Z) up to the third picture can be successively displayed. As a result, the user can retrieve desired album at a higher speed.

In the case where the user selects desired album from albums (pictures) successively displayed in this way, he allows the stop key 42 to be turned ON when the desired picture is displayed. The system controller 6 is operative so that when the stop key 42 is turned ON in such state, he recognizes that album to which picture displayed at the time point when the stop key 42 is turned ON belongs is designated to carry out playback or reproduction and/or editing, etc. on the basis of the album at times subsequent thereto.

As stated above, picture data of low resolution for index are recorded onto the optical disc 20 in advance to read out the picture data of low resolution when the respective index keys 38a to 38d are turned ON to display plural pictures indicating the contents of respective albums within one picture on screen, or picture data of intermediate resolution for monitor display are recorded on the optical disc 20 in advance to successively read out the picture data of intermediate resolution when the respective album search keys 56, 57 are turned ON to display them, thereby making it possible to retrieve a desired picture or a desired album at a higher speed.

Moreover, since picture data of low resolution are independently recorded as index only picture on the optical disc 20, it is possible to directly read out the picture data of low resolution to display them. Accordingly, picture data can be displayed at a higher speed as compared to the method of allowing picture data of high resolution to undergo thinning processing to newly form picture data for index to display them, and the display time of the index display can be shortened. In addition, since the display time of the index display can be shortened, this can contribute to realization of higher speed retrieval of desired picture or desired album.

Moreover, this still picture recording/reproducing system can directly designate desired picture without displaying the picture for index to display it on the monitor unit 9.

Namely, in the case where an album in which desired picture is recorded and picture No. are known, user operates album key 33, ten key 50, return key 39 and feed key 40 provided at the operation unit 10 as described above to input desired album and desired picture No. Then, the user selects the desired picture No. thereafter to allow the reproduction key 41 to be turned ON.

The system controller 6 is operative so that when it detects that the reproduction key 41 is turned ON, it controls the disc recording/reproducing section 5c so as to read out picture data of intermediate resolution of picture No. of the designated album. Thus, picture data of intermediate resolution of the designated picture No. is read out from the optical disc 20, and picture corresponding to the picture data of intermediate resolution is displayed on the monitor unit 9.

Further, this still picture recording/reproducing (playback) system can also retrieve desired picture by using retrieval key 52 provided at the operation unit 10.

Namely, when the retrieval key 52 is turned ON, the system controller 6 is brought into retrieval mode. When the system controller 6 is placed in the retrieval mode, it allows the display section 26 to undergo display control so as to display, in order, characters of picture name, key word, recording date and recording time every time the vertical/horizontal movement key 54 is operated once. When the user selects information to be inputted from the picture name, the key word, the recording date and recording time, he inputs picture name, key word, recording date or recording time of picture to be retrieved by using the ten key 50 to allow the EXEC key 55 to be turned ON.

Thus, the system controller 6 detects that the EXEC key 55 has been turned ON to start retrieval to control the disc recording/reproducing section 5c so as to read out picture data of low resolution of the retrieved picture. It is to be noted that a plurality of pictures are retrieved by such retrieval, the system controller 6 controls the disc recording/reproducing section 5c so as to read out picture data of low resolution of the plural pictures.

Thus, the picture data of low resolution of the retrieved picture is delivered to the video memory 11b. The memory controller 13 reads out, when the picture data of low resolution is stored into the video memory 11b, such data to deliver it to the monitor unit 9.

Then, the user looks at the picture image displayed on the monitor unit 9 to recognize desired picture to input album No. and picture No. of this picture to allow the reproduction key 41 to be turned ON. The system controller 6 allows the disc recording/reproducing section 5c to undergo read-out control so as to reproduce picture data of intermediate resolution of the designated picture No. from the designated album.

Thus, the picture data of intermediate resolution of the desired picture is delivered to the monitor unit 9 through the video memory 11b, and the retrieved desired picture (image) is displayed on the monitor unit 9.

13. [Playback (reproduction) and display of Index picture]

Figure 38:
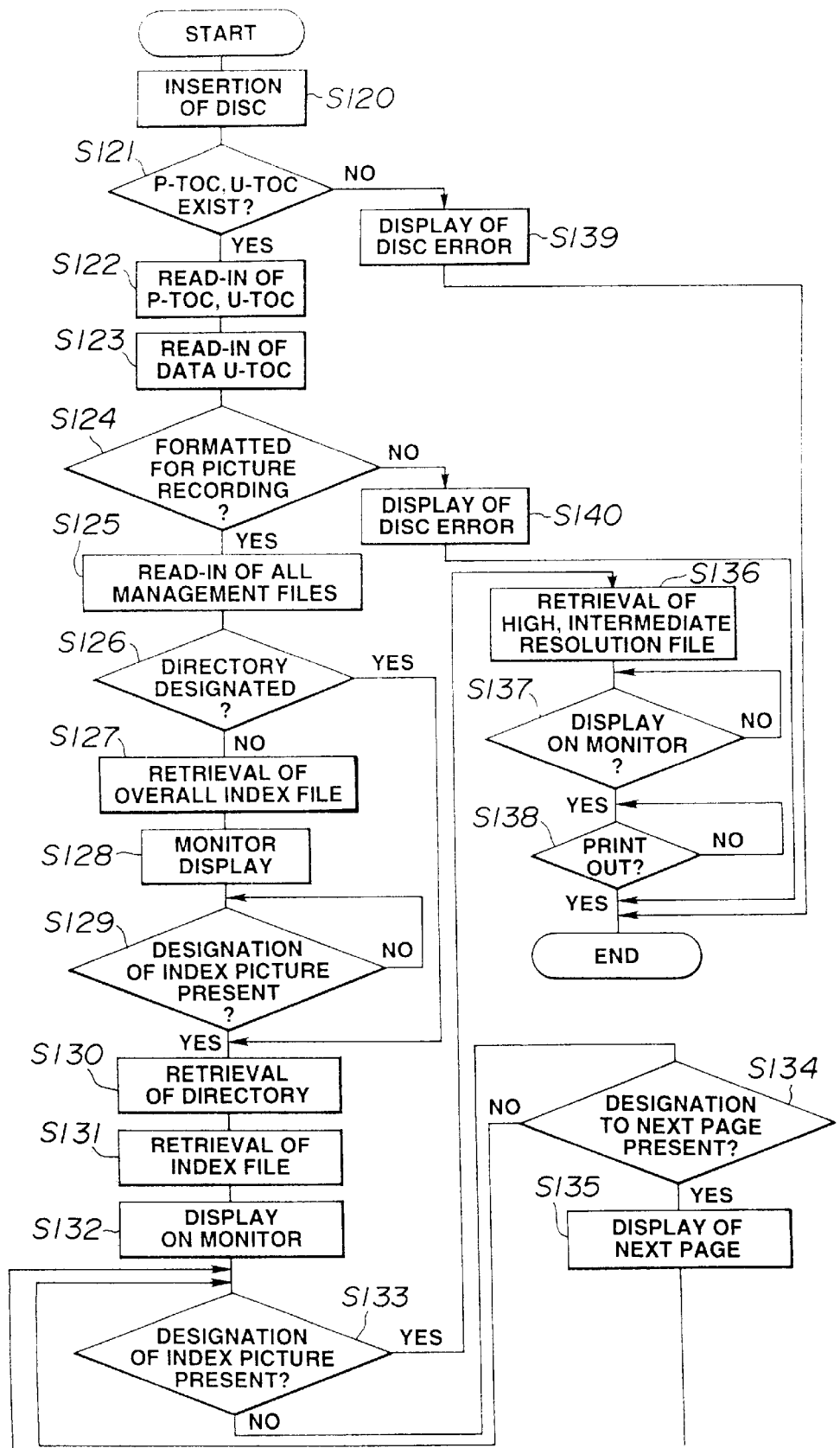
FIG. 38 is a flowchart for explaining reproducing (playback) operation in the still picture recording/reproducing system.

The playback (reproduction) and display operations of pictures of the low resolution picture data for index will now be described in more detail with reference to the flowchart of FIG. 38. When the user allows the power key 31 shown in FIG. 8 to be turned ON, the storage unit 5 is brought into stand-by state. Thus, the processing operation by the flowchart shown in FIG. 38 starts to proceed to step S120.

At the step S120, the user inserts optical disc 20 into disc insertion hole 30 shown in FIG. 8. Then, the processing operation proceeds to step S121. Thus, the optical disc 20 inserted through the disc insertion hole 30 is loaded into the storage section 5, resulting in the state where picture data can be reproduced.

At the step S121, the system controller 6 controls the disc recording/reproducing section 5c so as to read thereinto P_TOC and U_TOC recorded on the optical disc 20 to discriminate whether or not P_TOC and U_TOC exist on the optical disc 20. In the case where the respective TOC do not exist, the processing operation proceeds to step S139 to allow the display section 26 to undergo display control so as to display "disc error". In the case where the respective TOC exist, the processing operation proceeds to step S122.

At the step S122, the system controller 6 controls the disc recording/reproducing section 5c so as to read thereinto the P_TOC and the U_TOC to confirm position of data U_TOC. Thus, the processing operation proceeds to step S123. Since management of the area where data file is formed cannot be carried out by the U_TOC, in the case where data file exists, it is judged that data U_TOC exists at the leading portion thereof.

At the step S123, the system controller 6 stores data of data U_TOC into the RAM 6a to determine positions of respective directories and files. Thus, the processing operation proceeds to step S124.

At the step S124, the system controller 6 discriminates whether or not the optical disc 20 is formatted for picture recording. In a more practical sense, the system controller 6 discriminates, on the basis of data of the data U_TOC stored in the RAM 6a, whether or not subdirectory of PIC_MD, overall information management file, (at least one) picture directory, picture data management file, and picture index file exist to thereby discriminate whether or not the optical disc 20 is formatted for picture recording. In the case of NO, the processing operation proceeds to step S140 at which the display section 26 is caused to undergo display control so as to display "disc error". Then, the processing operation is completed as it is. In the case of YES, the processing operation proceeds to step S125.

At the step S125, the system controller 6 controls the disc recording/reproducing section 5c so as to read out all management files (overall information management file, picture data management files of respective directories, print control data management file, reproduction control management file) through the storage section controller 5d, and temporarily stores, into the RAM 6a, the all management files which have been read out. Thus, the processing operation proceeds to step S126.

At the step S126, the system controller 6 discriminates whether or not designation of picture to be displayed is made. In the case of YES, the processing operation proceeds to step S130. In the case of NO, the processing operation proceeds to step S127.

At the step S127, the system controller 6 retrieves overall index file recorded on the optical disc 20. Thus, the processing operation proceeds to step S128.

Particularly, in the case where no designation of directory is made, it is necessary to display what picture data are recorded in respective directories to cause the user to designate desired picture. For this reason, at the step S128, the system controller 6 controls the disc recording/reproducing section 5c so as to display overall index file recorded on the optical disc 20. Thus, the processing operation proceeds to step S129. The overall index file is a file in which index picture data which are the same as an arbitrary one index picture of index picture data stored in the picture index files below (at the lower level of) respective picture directories are registered in display order of monitor. By monitor-displaying the overall index file, the user can carry out designation of desired index picture.

At the step S129, the system controller 6 detects operation state of the operation unit 10 to thereby discriminate, whether or not index picture that the user desires is designated, from the monitor-displayed index picture. In the case of NO, the step S129 is repeated until that designation is made. In the case of YES, the processing operation proceeds to step S130.

At the step S130, the system controller 6 retrieves picture directory in which designated index picture is recorded. Thus, the processing operation proceeds to step S131.

Namely, picture directory information unit (data of 48 bytes) in the overall information management file stored in the RAM 6a are registered by the same number as the number of index pictures (=the number of directories) displayed by the overall information management file, and are recorded in order so as to correspond to the display order of index pictures. For example, explanation will be given by taking the example where the second index picture displayed by the overall information management file is designated. Initially, picture directory information of 48 bytes corresponding to the designated second index picture is recorded at the second portion from the leading portion. In the directory No. of the second picture directory information unit, data of "00001" is recorded. By this data, it is understood (recognized) that the directory in which this index picture is recorded is directory of the second PIC0001.

At the step S131, the system controller 6 retrieves picture index file within the directory retrieved at the step S130. Thus, the processing operation proceeds to step S132.

At the step S132, the system controller 6 allows the monitor unit 9 to undergo display control so as to display the first picture index files (corresponding to 25 pictures) within the retrieved directory. Thus, the processing operation proceeds to step S133.

At the step S133, the system controller 6 detects operation state of the operation unit 10 to thereby discriminate whether or not designation of picture that the user desires is made from index pictures displayed on the monitor unit 9. In the case of NO, the processing operation proceeds to step S134. In the case of YES, the processing operation proceeds to step S136. At the step S134, the system controller 6 detects the operation state of the operation unit 10 to thereby discriminate whether or not designation of display of the next picture index file (corresponding to the remaining 25 pictures) is made. In the case of NO, the processing operation returns to the above-described step S133. In the case of YES, the processing operation proceeds to step S135. At the step S135, the system controller 6 allows the monitor unit 9 to undergo display control so as to display picture index files corresponding to the remaining 25 pictures thereon. Thus, the processing operation returns to the above-described step S133.

On the other hand, at the step S133, in the case where it is discriminated that designation of index picture is made, the processing operation proceeds to step S136. At this step, the system controller 6 retrieves high resolution picture file and intermediate resolution picture file corresponding to the designated index picture. Thus, the processing operation proceeds to step S137.

In a more practical sense, the system controller 6 selects picture data management file corresponding to the directory in which displayed index file exists from respective picture data management files of respective directories stored in the RAM 6a. In the picture information units (16 bytes×N) of the selected picture data management file, there are registered picture information units of 16 bytes having the same number as the number (N) of indices registered in the picture index file. In addition, these picture information units are recorded in order so as to correspond to the order of displayed indices.

For example, in the case where index picture displayed by the picture index file is the index file of the first directory and the fourth index picture is designated from the index file, since the displayed index file is the index file of the first directory, the system controller 6 first makes reference to data of the first picture data management file in the RAM 6a. When the fourth index picture is designated by the user, the system controller 6 carries out retrieval of the fourth picture information unit of the picture data file to which reference has been made. In data of the retrieved picture information unit, data of "00000" is recorded as the directory No. and data of "00003" is recorded as picture information. Accordingly, with respect to the picture file of high resolution corresponding to designated index picture, file name in the directory "PIC00000" is judged to be "PHP000003". With respect to the picture file of intermediate resolution, file name in the directory "PIC00000" is judged to be "PSN00003".

It is to be noted that when index picture is selected as described above to retrieve picture files of high resolutionand intermediate resolution corresponding thereto, an approach is employed such that, on the basis of data in the picture information unit of the picture management file, picture file corresponding thereto is necessarily retrieved.

Namely, ordinarily (in the case of the above-described example), display order of index pictures and picture No. of picture files are in correspondence with each other. However, when position of the index picture is changed by editing, etc. which will be described later, any difference takes place between the display order of index pictures and the picture No. of picture files. It is to be noted that, in the still picture recording/reproducing system, even in the case where display order of index pictures is changed, correspondence relationship between index pictures and picture files of high resolutionand intermediate resolution is attained by the picture information unit of the picture data management file. The detail thereof will be described in the chapter of "Edit of picture" which will be referred to later.

At the step S137, the system controller 6 detects operation state of the operation unit 10 to thereby discriminate whether or not monitor display of the retrieved picture file of the intermediate resolution is designated. In the case of YES, the processing operation proceeds to step S138. In the case of NO, this step S137 is repeated.

At the step S138, the system controller 6 controls the disc recording/reproducing section 5c so as to read out data of the retrieved picture file of intermediate resolution to allow the monitor unit 9 to undergo display control so as to display the picture file of intermediate resolution reproduced by such a control, and to discriminate whether or not designation of print out of the retrieved picture file of intermediate resolution. As a result, in the case of NO, the step S138 is repeated. On the other hand, in the case of, YES, the system controller 6 controls the disc recording/reproducing section 5c so as to read out the retrieved picture file of high resolution to deliver it to the printer unit 2 through the main memory 11a. Thus, the entire routine of reproduction and display of the index picture shown in FIG. 38.

In this example, at the printer unit 2 to which the picture file of high resolution has been delivered, the high resolution picture data delivered as respective data of R, G, B are converted into yellow (Y), magenta (M) and cyan (C) to print these data onto the printer paper by the thermal head. in order from the Y data.

14. [Retrieval of file and directory]

Figure 45:
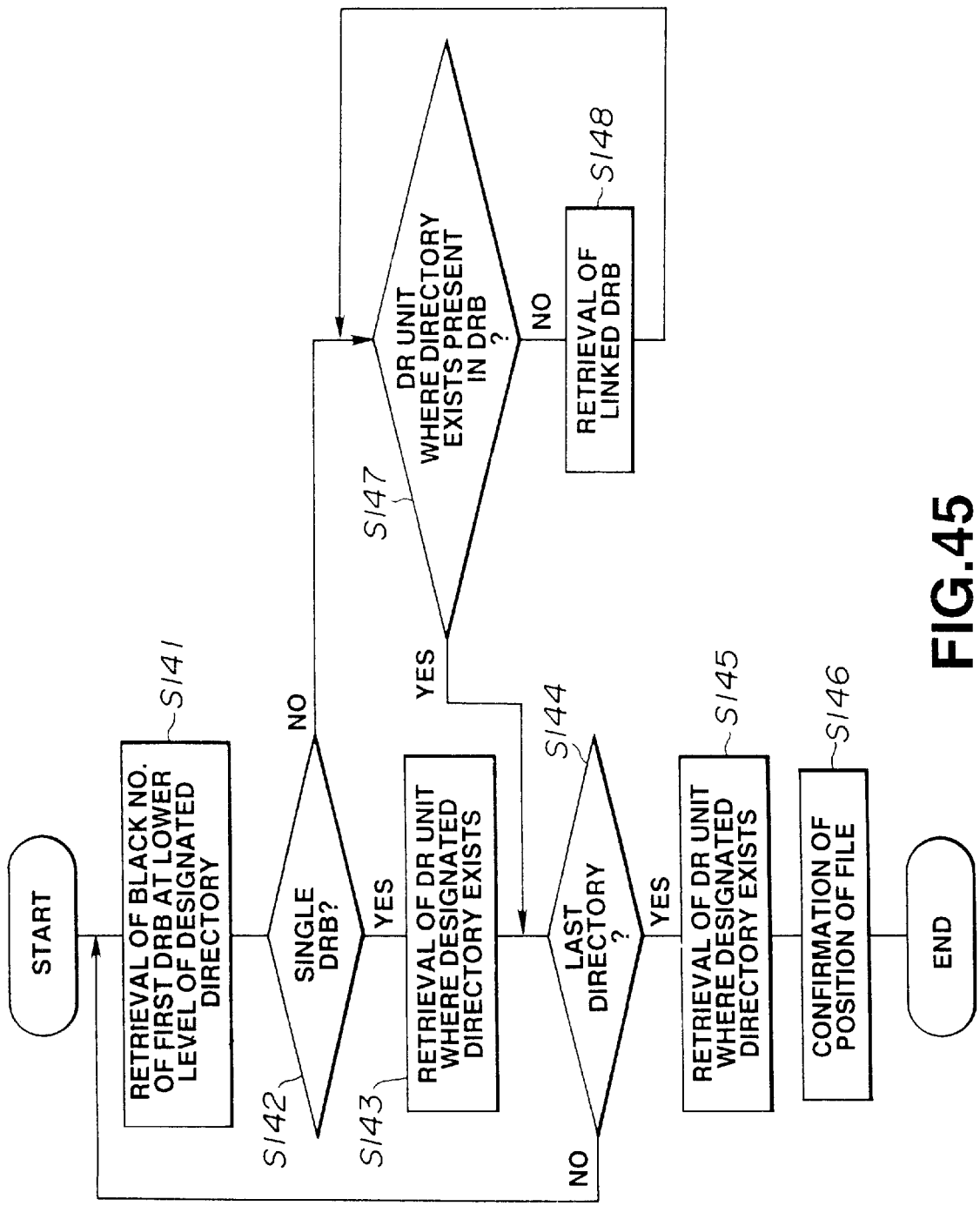
FIG. 45 is a view for explaining retrieval operation of designated picture data in the still picture recording/reproducing system.

Explanation will be given in the case where, e.g., picture file f5 (PSN00000. PMP) is retrieved with reference to the hierarchical structure of file which has been described with reference to the FIG. 23 mentioned above. This retrieval operation is as indicated by the flow chart of FIG. 45. The processing operation by the flowchart shown in FIG. 45 starts when data of the data U_TOC is stored into the RAM 6a and desired directory and file name are designated by the user to proceed to step S141.

At the step S141, the system controller 6 retrieves, on the basis of Volume Descriptor (VD) of the volume management area, block No. of the first Directory Record Block (DRB) of the lower order of the designated directory. Thus, the processing operation proceeds to step S142.

In a more practical sense, position of. DRB within the management block is recorded in terms of block No. by data indicating position of the first directory record block of the VD. In this still picture recording/reproducing system, block No. of the first DRB is set to "4" as described above.

At step S142, the system controller 6 discriminates, by making reference to entry of the management block in MT, whether or not the designated DRB is single DRB or successive DRBs. In the case of single DRB, the processing operation proceeds to step S143. In the case where DRB is not single, the processing operation proceeds to step S143.

At the step S147, the system controller 6 discriminates whether or not DR unit for directory having directory in the DRB exists. In the case of NO, the processing operation proceeds to step S148. In the case of YES, the processing operation proceeds to step S144.

At step S148, the system controller 6 detects linked DRB. The processing operation returns to the step S147.

On the other hand, at the step S143, the system controller 6 retrieves DR unit for directory in which designated directory exists. The processing operation proceeds to the step S143.

At the step S144, the system controller 6 discriminates whether or not the designated directory is the last directory. In the case of YES, the processing operation proceeds to step S145. In the case of NO, the processing operation returns to step S141.

At the step S145, the system controller 6 retrieves DR unit for directory in which designated file exists. Thus, the processing operation proceeds to step S146.

At the step S146, the system controller 6 confirms position of file. Thus, the entire routine is completed.

15. [Edit of picture]

When recording of picture is completed as described above, it becomes possible to carry out editing of index picture by the selection of the user. The editing of picture refers to, e.g., work for moving picture data of a certain picture directory to another picture directory and work for carrying out switching of index picture within the same directory to change display order of index pictures.

The example where the fifth index picture displayed within the first directory and picture data of high resolution and intermediate resolution corresponding thereto are moved to the tenth display position of the second directory will be described below with reference to the flowchart of FIG. 46.

Figure 46:
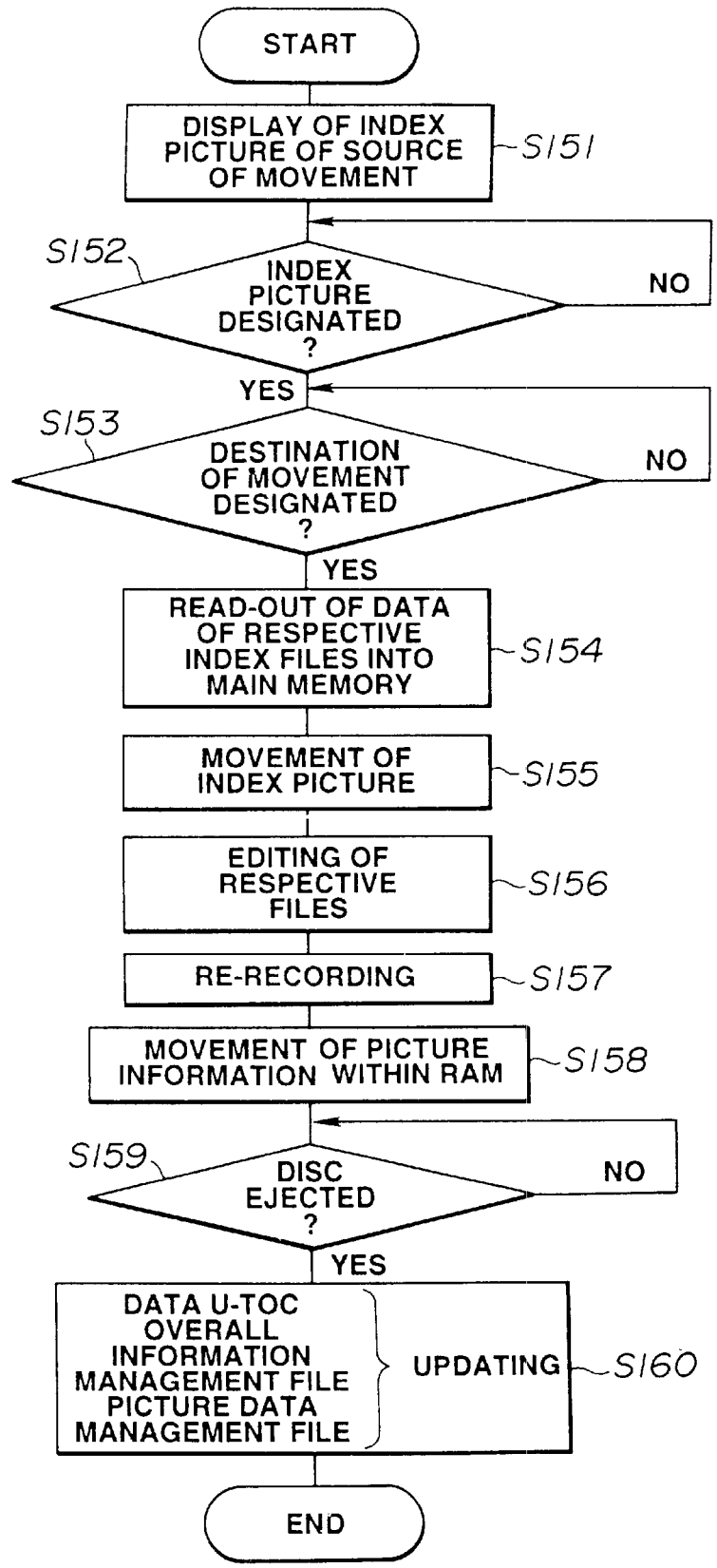
FIG. 46 is a view for explaining edit operation of picture data in the still picture recording/reproducing system.

The processing operation by the flowchart shown in FIG. 46 starts when recording of a desired picture is completed and the user allows the edit designation key to be turned ON the proceed to step S151.

At the step S151, the system controller 6 reads out index file of (the first) directory of movement source to control the disc recording/reproducing section 5c so as to display 25 index pictures. Thus, the processing operation proceeds to step S152 (see the chapter of reproducing operation).

At the step S152, the system controller 6 discriminates whether or not index picture to be moved within the directory of movement source is designated (whether or not index picture displayed at the fifth position (location) of the first directory is designated). In the case of NO, this step S152 is repeated. In the case of YES, the processing operation proceeds to step S153.

At the step S153, the system controller 6 detects operation state of the operation unit 10 to thereby discriminate whether or not directory of movement destination and movement position are designated (the original picture is moved to the tenth index picture of the second directory in the case of this example) In the case of NO, this step S153 is repeated. In the case of YES, the processing operation proceeds to step S154.

At the step S154, the system controller 6 controls the disc recording/reproducing section 5c, etc. so as to read out all index pictures of index file of directory of movement source and all index pictures of index file of directory of movement destination into the main memory 11a. Thus, the processing operation proceeds to step S155.

At the step S155, the system controller 6 moves only the designated index picture (including header as well) from the index file of source of movement (first directory) to index file of destination of movement (second directory). Thus, the processing operation proceeds to step S156.

Namely, in the picture index file, respective index pictures have fixed capacity of 4096 bytes in all including the header and the data body. Accordingly, since, in this example, 4096 bytes subsequent to 4096×3 bytes from the leading portion of the file is determined to be data of the fourth index picture (including header as well), position of index picture within the picture index file can be easily, determined. Similarly, the destination of movement of data of the index picture (4096 bytes) to be moved is designated to be area subsequent to 4096×9 bytes of index file of (the second) directory of destination of movement, and is inserted into the area (this operation is not overwrite operation).

At step S156, the system controller 6 carries out editing control to delete (erase) the moved index picture on the index file of source of movement to update file to supplement the moved index picture of the index file of destination of movement. Then, the system controller 6 updates the file of destination of movement. Thus, the processing operation proceeds to step S157.

At the step S157, the system controller 6 re-records, at the same portion on the disc, the index file of the source of movement and the index file of the destination of movement which have been respectively edited. Thus, the processing operation proceeds to step S158. It is to be noted that if there is any other portion where the area can be ensured in place of the same portion, that portion may be employed (utilized).

At the step S158, the system controller 6 moves, in the RAM 6a, picture information unit recorded at the fifth recording position of plural picture information units (16 bytes) which have been recorded within the picture data management file of source of movement (first directory) to the tenth unit within the picture data management file of destination of movement (second directory) without changing data. Thus, the processing operation proceeds to step S159. It is to be noted that any updating is not implemented to files of picture data of high resolutionand intermediate resolution.

At the step S159, the system controller 6 discriminates whether or not the eject key 32 of the operation unit 10 is turned ON to thereby discriminate whether or not the disc eject is designated. In the case of NO, this step S159 is repeated. In the case of YES, the processing operation proceeds to step S160.

At the step S160, the system controller 6 controls the disc recording/reproducing section 5C so as to read out data U_TOC, overall information management file and picture data management file in the RAM 6a to write them onto the disc to thereby update the respective data. Thus, the entire routine according to the editing operation of picture is completed.

In the case where there is provided a header in which data for carrying out correspondence with display order of index picture is recorded at the leading portion of the file of picture data of high resolution or intermediate resolution, there is no necessity of changing position of actual picture data by rewriting data of the header, but it is necessary for rewriting data of the header to temporarily read out all data of picture file (including picture data as well), with the result that it takes a long time.

In this editing operation, however, an approach is employed such that, with respect to the index file, switching of physical position on the disc is carried out in accordance with the order actually displaced, but, with respect to the picture data of high resolutionand intermediate resolution, switching of data of picture information unit within the picture data management file which has been read into the RAM 6a is carried out without carrying out any change of position on the disc. Further, correspondence with the display order of index pictures can be ensured by such switching (replacement) between respective data. For this reason, rewrite operation is required only for switching of index pictures within the index file and rewriting of picture data management file in the RAM 6a. Accordingly, rewrite data can be extremely reduced. Thus, rewrite work can be carried out at a high speed.

Moreover, since physical position on the disc of the index picture is changed so that the index files take the same order as the display order, it is possible to realize high speed read-out operation of index file.

Further, also when order of display of index pictures is changed within the same index file within the same directory, such a change can be carried out by similar control. For example, in the case of changing display order so as to display the seventh index picture within the same index file at the second position (location), all data of the index file are temporarily read out from the disc into the main memory lla to move the seventh index picture to the second recording position thereafter to edit the file thereafter to re-record them onto the disc. On the other hand, in the RAM 6a, within the picture data management file, the seventh picture information unit of 16 bytes is inserted into the second recording position without changing data. Namely, also in the case where order of display of index picture is changed within the same directory, only the index file and the picture information unit in the RAM are rewritten, but actual picture data are not rewritten.

16 [Operation for forming overall index file]

When recording onto the optical disc 20 is completed, the system controller 6 forms overall index file (OV INDX. PMX). This overall index file is caused to undergo management by overall information management file, and is file in which what index pictures are recorded in respective directories are edited as a single file.

For example, in this example, in the case where five directories including 25 index pictures are formed, respective one index picture of the leading portions of respective directories are taken out to edit respective pictures in order to form overall index file consisting of five index pictures. In addition, in the case where the number of directories is set to smaller value, leading five pictures of index pictures may be respectively taken out from respective directories to form overall index file.

This overall index file is formed at the time of format for picture data. For this reason, such overall index file is already formed in recording picture.

Figure 47:
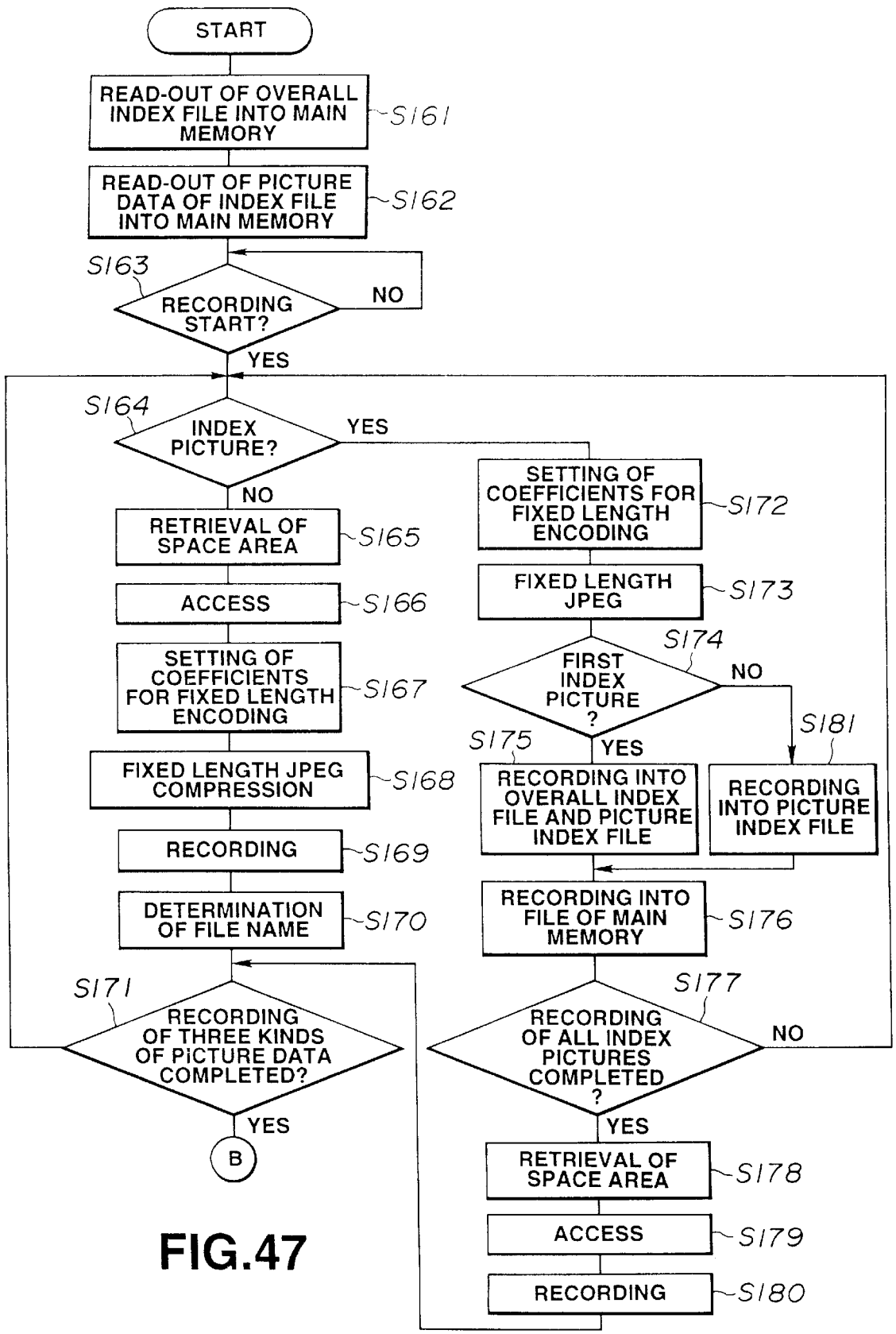
FIG. 47 is a flowchart for explaining forming operation of the first half of overall index file in the recording/reproducing system.

The operation for forming the overall index file is as indicated by the flowchart of FIG. 47.

In the flowchart shown in FIG. 47, at step S161, the system controller 6 reads out (processing routine by) the overall index flowchart into the main memory 11a. Thus, the processing operation proceeds to step S162.

At the step S162, the system controller 6 controls the disc recording/reproducing section 5c through the storage unit controller 5d so as to read out all picture data recorded in the index file of the designated directory, and carries out a control for transferring picture data of the index file into the main memory 11a shown in FIG. 4a. Thus, the processing operation proceeds to step S163. It is to be noted that picture data recorded after undergone fixed length encoding along with header is read out as it is from the index file without allowing it to undergo expansion decoding processing to transfer it into the main memory 11a. In addition, when no picture data is recorded within the index file, there is no possibility that picture data is read out into the main memory.

At step S163, the system controller 6 detects operation state of the operation section 10 to thereby detect whether or not designation of recording start is made from the user. In the case of NO, this step S163 is repeated until designation of the -recording start is made. In the case of YES, the processing operation proceeds to step S164.

At the step S164, the system controller 6 discriminates whether or not picture to be recorded from now on is index picture. In the case of NO, the processing operation proceeds to step S165. In the case of, YES, the processing operation proceeds to step S172.

At the step S172, data indicating that picture to be recorded from now on is index picture is delivered to the thinning and compression/expansion controller 4i shown in FIG. 5. When the data is delivered, the compression/expansion controller 4i sets fixed length encoding coefficients for index picture at the compression/expansion circuit 4h. Thus, the processing operation proceeds to step S173.

At the step S173, the thinning and compression/expansion controller 4i controls the compression/expansion circuit 4h so as to implement compression encoding processing to the picture data which has been caused to undergo thinning processing into ¼ on the basis of the set fixed length encoding coefficients to thereby form index picture which have been caused to undergo fixed length encoding so as to have fixed data length of 1/15 clusters. Thus, the processing operation proceeds to step S174.

At the step S174, the system controller 6 discriminates, with respect to the index picture which has been caused to undergone fixed length encoding, on the basis of data of the overall information management file stored in the RAM6a, whether or not the index picture is the first index picture. In the case of NO, the processing operation proceeds to step S181. In the case of the index picture, the processing operation proceeds to step S175.

At the step S181, the system controller 6 records the index picture which has been caused to undergo fixed length encoding into the picture index file. Thus, the processing operation proceeds to step S176.

At the step S175, the system controller 6 records the first index picture into the overall index file and the picture index. Thus, the processing operation proceeds to step 176.

A the step S176, the system controller 6 controls the memory controller 13 so as to record index picture of 4096 bytes in total in which header is added into the file stored in the main memory 11a shown in FIG. 4. Thus, the processing operation proceeds to step S177.

At the step S177, the system controller 6 discriminates as to whether or not all index pictures are recorded into the main memory 11a. In the case of NO, the processing step returns to the step S164. In the case of YES, the processing operation proceeds to step S178.

At the step S178, the system controller 6 retrieves the portion in which entry of 2 bits (code indicating available allocation block) of allocation block No. of Volume Space Bitmap VSB in the data U_TOC stored in the RAM 6a is "00" to thereby detect space area. Thus, the processing operation proceeds to step S179.

At the step S179, the system controller 6 controls the disc recording/reproducing section 5c so as to provide access to the detected space area on the optical disc 20 through the storage unit controller 5d. Thus, the processing operation proceeds to step S180.

At the step S180, the system controller 6 controls the disc recording/reproducing section 5c so as to recorded the index picture into the space area on the optical disc 20 through the storage unit controller 5d. Thus, the processing operation proceeds to step S171.

As described above, in the case where the index picture is caused to undergo fixed length encoding to record them onto the optical disc 20, before the index pictures which have been caused to undergo fixed length encoding are recorded onto the optical disc 20, they are temporarily recorded in order into the main memory 11a to thereby form one index file from all the index pictures in the main memory 11a thereafter to record it into physically continuous areas on the optical disc 20.

On the other hand, when the discrimination result is NO at the step S164, the processing operation proceeds to step S165. At the step S165, the system controller 6 detects space area on the optical disc for recording picture of intermediate resolution or picture of high resolution. Thus, the processing operation proceeds to step S166.

In a more practical sense, the system controller 6 retrieves the portion in which entry of 2 bits (code indicating available allocation block) of allocation block No. of Volume Space Bitmap VSB in the data U_TOC stored in the RAM 6a is "00" to thereby carries out detection of the space area.

At the step S166, the system controller 6 detects optimum space area of space areas retrieved at the step S165 as described above to control the disc recording/reproducing section 5c through the storage unit controller 5d so as to provide access thereto. Thus, the processing operation proceeds to step S167.

At the step S167, the system controller 6 sets fixed length encoding coefficients corresponding to high resolution picture data or ultra high resolution picture data at the compression/expansion circuit 4h. Thus, the processing operation proceeds to step 168. At the step S168, the thinning and contraction/expansion controller 4i controls the compression/expansion 4h so as to form high resolution picture data of 8 clusters or ultra high resolution picture data of 18 clusters on the basis of the set fixed length encoding coefficients. Thus, the processing operation proceeds to step S169.

At the step S169, the system controller 6 controls the disc recording/reproducing section 5c so as to record the picture data which has been caused to undergo fixed length encoding into the detected optimum area on the optical disc 20. Thus, the processing operation proceeds to step S170.

At the step S170, as described above, the system controller 6 carries out recording control of the picture data, and successively determines data of picture data management file of the designated directory and file names corresponding to resolutions of respective picture data. Thus, the processing operation proceeds to step S171.

At the step S171, the system controller 6 discriminates whether or not picture data of three kinds of low resolution picture data (index picture), intermediate resolution picture data and high resolution picture data (or ultra high resolution picture data) have been all recorded. In the case of NO, the processing operation returns to step S164 to record picture data of resolution which has not yet been recorded. In the case of YES, the processing operation proceeds to step S191 shown in FIG. 48.

When recording of picture to be record is completed in this way, it is possible to carry out switching of data of overall index picture by the user. Since setting is made such that first index pictures of respective directories are recorded in advance, e.g., in the overall index file formed simultaneously with formation of files of respective pictures of high resolution, intermediate resolution and index, only the first index pictures of respective directories are recorded. However, in the case where the user has a desire, it is possible to carry out switching between the first index picture and any other index picture registered in the overall management file.

Figure 48:
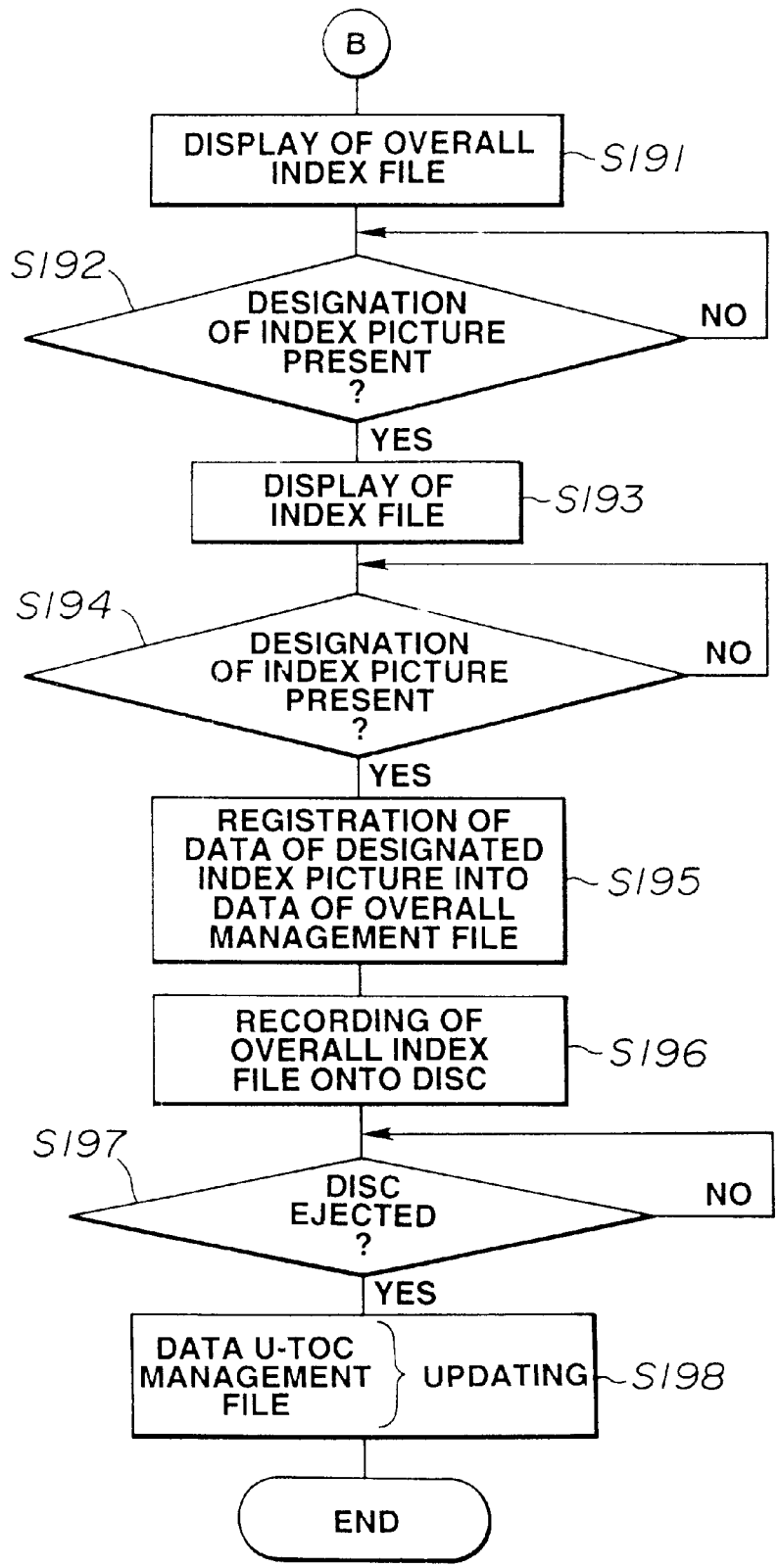
FIG. 48 is a flowchart for explaining forming operation of the latter half of the overall index file in the recording/reproducing system.

The switching operation of the desired index picture is as indicated by the routine of the step S191 and steps succeeding thereto of FIG. 48.

Namely, at the step S191 of FIG. 48, the system controller 6 carries out display control of the overall index picture. Thus, the processing operation proceeds to step S192.

At the step S192, the system controller 6 detects operation state (situation) of the operation unit 10 to thereby discriminate whether or not designation of index picture that the user desires is made. In the case of NO, this step S192 is repeated. In the case of the index picture, the processing operation proceeds to step S193.

At the step S193, the system controller 6 carries out display control of the index file thereof. Thus, the processing operation proceeds to step S194.

At the step S194, the system controller 6 detects operation state (situation) of the operation unit 10 to thereby discriminate whether or not the displayed index picture is designated. In the case of NO, this step S194 is repeated. In the case of YES, the processing operation proceeds to step S195.

At the step S195, the system controller 6 designates directory to thereby carry out designation of index picture to be switched. Namely, the system control 6 copies data of index picture designated in the overall management file, and switches, at the same time, directory No. and index picture No. of picture directory information unit of the overall information management file into the directory No. and the index picture No. which have been designated. Thus, the processing operation proceeds to step S196.

At the step S196, the system controller 6 controls the disc recording/reproducing section 5c so as to record overall information management file onto the optical disc 20. Thus, the processing operation proceeds to step S197.

At the step S197, the system controller 6 detects whether or not the eject key 32 of the operation unit 10 is turned ON. In the case of NO, this step S197 is repeated. In the case of YES, the processing operation proceeds to step S198.

At the step S198, the system controller 6 updates related data of the data U_TOC, the overall management information file and the picture data management file recorded on the disc into respective data of the data U_TOC, the overall management information file and the picture data management file recorded in the RAM 6a. Thus, the entire routine is completed.

It is to be noted that while the above-descried overall index file is adapted so that while first one index pictures of respective directories are recorded at the data recording time, an approach may be employed such that in the case where the number of directories is reduced, first five index pictures of respective directories are registered.

For example, an example in which four directories are formed to register five index pictures thereof will now be described. As described below, 20 units are formed so that units of picture directory information correspond to 5 (pictures)×4 directories=20 (pictures) of the number of index pictures within the overall index file.

|  | Directory No. | Index Picture No. |
|---|---|---|
| First picture directory information | 00 | 00 |
| Second picture directory information | 00 | 01 |
| Third picture directory information | 00 | 02 |
| Fourth picture directory information | 00 | 03 |
| Fifth picture directory information | 00 | 04 |
| Sixth picture directory information | 01 | 00 |
| Seventh picture directory information | 01 | 01 |
| Eighth picture directory information | 01 | 02 |
| Ninth picture directory information | 01 | 03 |
| Tenth picture directory information | 01 | 04 |
| Eleventh picture directory information | 02 | 00 |

In addition, while, in this example, overall index file is formed after all picture data are recorded, an approach may be employed to form directory to record picture at the same time also into the overall index file when recording picture index file below (at the lower level of) the directory.

17 [Print operation]

The operation of the still picture recording/reproducing system in the case where picture taken in through the scanner unit 1 or the video input unit 8, or picture recorded on the optical disc 20 is subjected to print (i.e., printed) will now be described.

Initially, in the case of allowing picture taken in through the scanner unit 1 or the video input unit 8, the user operates the operation unit 10 to display, on monitor unit 9, the picture taken in through the scanner unit 1 or the video input unit 8 similarly to the above. In the case where the picture displayed on the monitor unit 9 is desired picture, the user operates the operation unit 10 to designate print of that print.

The picture data taken in through the scanner unit 1 or the video input unit 8 is stored in the main memory 11a. For this reason, the system controller 6 is operative so that when the print is designated, it allows the main memory h1a to undergo read-out control through the memory controller 13 so that picture data stored in the main memory 11a is read out therefrom. The picture data which has been read out from the main memory 11a is delivered to data conversion circuit 2a of printer unit 2.

The data conversion circuit 2a implements data conversion processing suitable for print to the picture data which has been read out from the main memory 11a, i.e., when the picture data are delivered in a form of R, G, B or Y, Gr, Cb, the circuit 2a carries out color coordinate transform processing into form of Y (Yellow), M (Magenta) and, C (Cyan) from the above form to thereby form picture data for print to deliver it to thermal head 2c.

The thermal head 2c prints pictures corresponding to the picture data by about 300 DPI onto print paper 2d of, e.g., A6 size. Thus, the picture corresponding to the picture data which has been taken in through the scanner unit 1 or the video input unit 8 can be printed.

Moreover, in the case where picture processing such as expansion processing, contraction processing or rotation processing, etc. of picture is designated, the memory controller 13 carries out a control to transfer, to picture processing circuit 12, the picture data which has been read out from the main memory. When the picture data is transferred to the picture processing circuit 12, picture processing controller 14 controls the picture processing circuit 12 so as to implement the designated processing thereto. Thus, the picture data to which the designated picture processing has been implemented is delivered to the printer section 2 through picture processing circuit 12. As a result, it is possible to print the picture to which picture processing such as expansion processing or contraction processing, etc. has been implemented.

In the case of printing picture recorded on the optical disc 20, the user displays picture for index recorded on the optical disc 20 on the monitor unit 9 by the above-described operation. Then, the user selects a desired picture from the picture for index. Thus, the selected picture is displayed on the monitor unit 9.

In the case where the picture displayed on the monitor unit 9 is desired picture, user operates the operation section 10 to designate print of that picture. Thus, the system controller 6 controls the disc recording/reproducing section 5c so as to read out picture data (high resolution picture data or ultra high resolution picture data) for print of the picture displayed on the monitor unit 9 at present.

As described above, on the optical disc 20, respective three kinds of picture data of picture data of low resolution for index, picture data of intermediate resolution for monitor display and picture data of high resolution for print are recorded, and print information relating to print of those picture data is recorded in advance. For this reason, the system controller 6 takes thereinto the reproduced print information to carry out setting control of the number of prints, color designation, picture size and print position, etc. of the printer section 2, and delivers, to the printer unit 2, the high resolution picture data which has been read out from the optical disc 20.

Thus, pictures corresponding to the picture data which have been read out from the optical disc 20 are printed by number designated by the picture size, etc. corresponding to the print data.

The print operation in the printer unit 2 and recording of the printer information and picture data as described above are as indicated by the flowchart of FIGS. 49 and 50.

Figure 49:
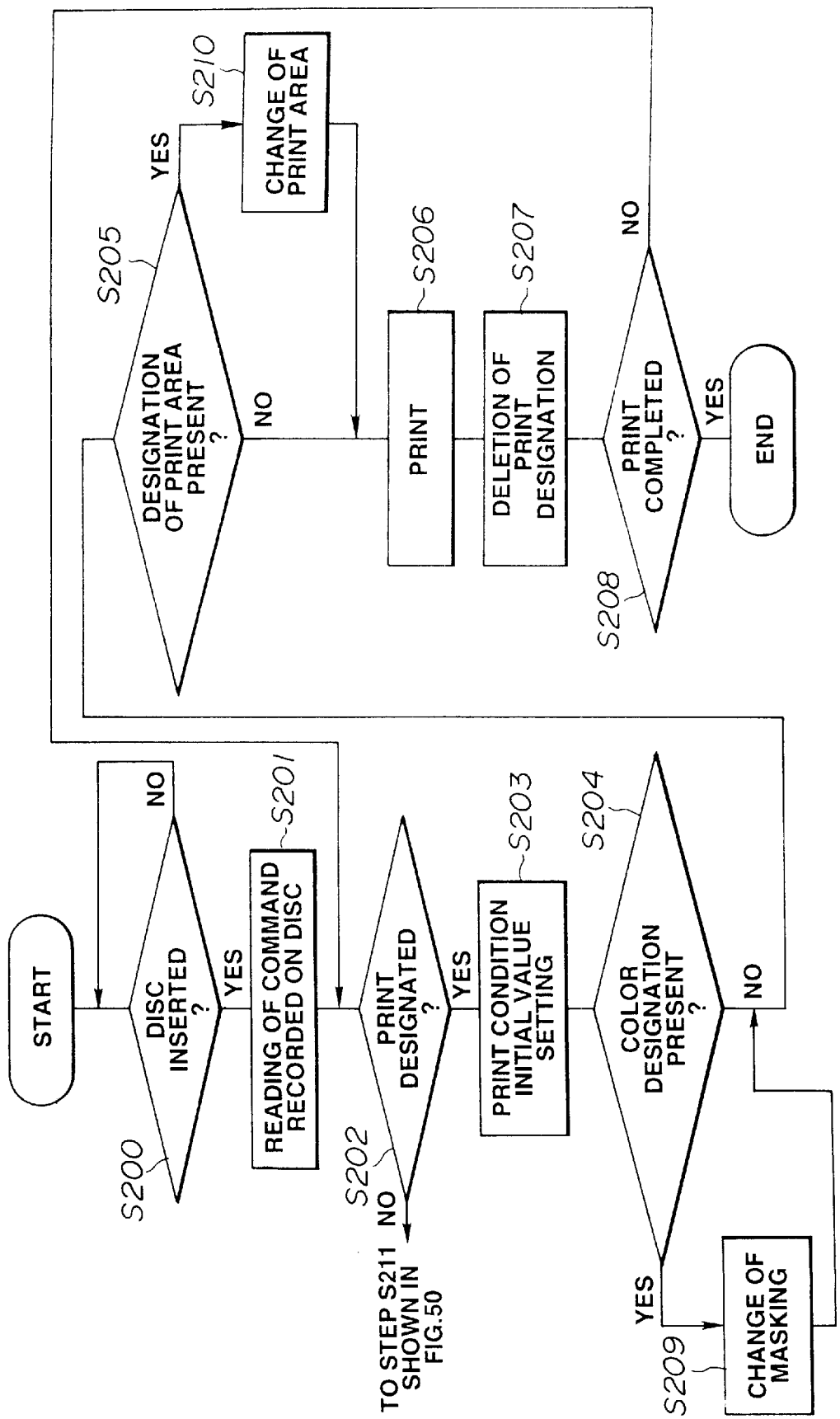
FIG. 49 is a flowchart for explaining print operation in the still picture recording/reproducing system.

Namely, initially, the processing operation by the flowchart shown in FIG. 49 starts when the main power supply of the still picture recording/reproducing system is turned ON to proceed to step S200.

At the step S200, the system controller 6 communicates with the storage unit controller 5d of the storage unit 5 to discriminate whether or not the optical disc 20 is loaded into the storage unit 5. In the case of NO, this step S200 is repeated until the optical disc 20 is located. In the case of YES, the processing operation proceeds to step S201.

At the step S201, the storage unit controller 5d controls the disc recording/reproducing section 5c so as to read the print information recorded on the optical disc 20 to transfer, to the system controller 6, the print information which has been read. Thus, the processing operation proceeds to step S202.

At the step S202, the system controller 6 discriminates, on the basis of print information which has been read at the storage unit 5, whether or not print of that picture is designated. In the case of NO, the processing operation proceeds to step S211 shown in FIG. 50. In the case of YES, the processing operation proceeds to step S203.

Figure 50:
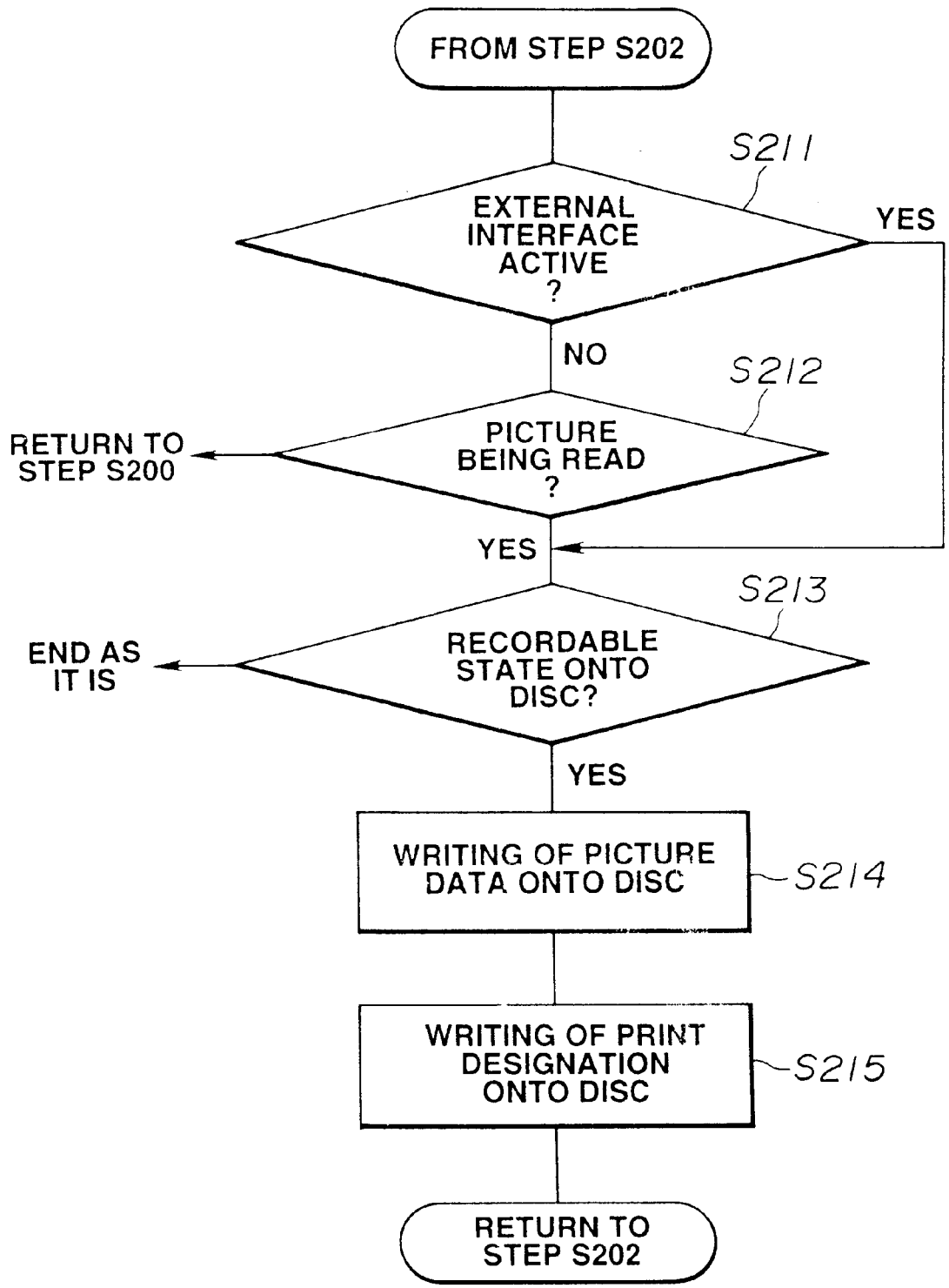
FIG. 50 is a flowchart for explaining subroutine in the print operation.

At the step S211 shown in FIG. 50, the system controller 6 discriminates whether or not input of picture data from the scanner unit 1 or the video input unit 8 is designated. In the case of No., the processing operation returns to the step S200 shown in FIG. 49 to repeat the routine of the above-described steps S200 to S202. In the case of YES, the processing operation proceeds to step S213.

At the step S213, the system controller 6 communicates with the storage unit controller 5d to discriminate whether or not recording onto the optical disc 20 can be made. As a result, in the case of NO, the routine shown in FIGS. 49 and 50 is completed. In the case of YES, the processing operation proceeds to step S214.

At the step S214, the storage unit controller 5d controls the disc recording/reproducing section 5c so as to record, onto the optical disc 20, picture data of the picture which has been read at the scanner unit 1 or picture data delivered from the video input unit 8. Thus, the processing operation proceeds to step S215.

At the step S215, the system controller 6 transfers print information designated by user to the storage controller 5d. The storage section controller 5d controls the disc recording/reproducing section 5c so as to record, onto the optical disc 20, the picture data along with the print information. Thus, the processing operation returns to the step S202 shown in FIG. 49. Then, the above-described routine is repeated.

At the step S203 shown in FIG. 49, the system controller 6 sets print condition (the number of prints, color setting, paper size, etc.) of the printer section 2. Thus, the processing operation proceeds to step S204.

At the step S204, the system controller 6 discriminates whether or not there is color designation for designating desired hue (tint) of the print designation designated by the print data. In the case of YES, the processing operation proceeds ot step S202. In the case of NO, the processing operation proceeds to step S205.

At the step S209, the system controller 6 carries out masking change of the printer unit 2 so that the designated hue (tint), etc. is provided. Thus, the processing operation proceeds to step S205.

At the step S205, the system controller 6 discriminates whether or not there is designation of print area of the print designation designated by the print data. In the case of YES, the processing operation proceeds to step S210. In the case of NO, the processing operation proceeds to step S206.

At the step S210, the system controller 6 changes setting of the printer section 2 so that the designated print area is provided. Thus, the processing operation proceeds to step S206.

At the step S206, the system controller 6 controls the printer section 2 so as to execute print under the set condition. Thus, the processing operation proceeds to step S207.

At the step S207, the system controller 6 erases the set print data. Thus, the processing operation proceeds to step S208.

At the step S208, the system controller 6 discriminates whether or not print is completed. In the case of NO, the processing operation returns to the step S202 to repeat the above-described routine. In the case of YES, the processing operation is completed as it is.

As stated above, picture data are recorded on the optical disc along with print information of corresponding picture data to thereby automatically set respective portions on the basis of the print data which has been read out from the optical disc 20 at the printer unit 2 in print operation, thus making it possible to carry out print operation. For this reason, troublesome print designation can be omitted, and desired hue (tint), etc. can be securely designated in, e.g., hue (tint), etc. Thus, print miss can be prevented.

Moreover, in print operation, it is sufficient to read out picture data from the optical disc 20 in accordance with print state of the printer unit 2 to deliver it to the printer section 2. Further, since the optical disc 20 can substitute for the frame memory 11, omission of the frame memory 11 or reduction of memory capacity of the frame memory 11 can be realized.

In addition, since print data such as the number of prints, etc. is recorded on the optical disc 20, if the user only takes the optical disc 20 to the place where a printer device having the same structure as the printer unit 2 is provided, it is possible to carry out print operation by, e.g., desired hue (tint) and/or number of prints. For this reason, novel system can be provided as a system which can obtain print of still picture.

18 [Another configuration of the thinning and compression/expansion processing]

Figure 51:
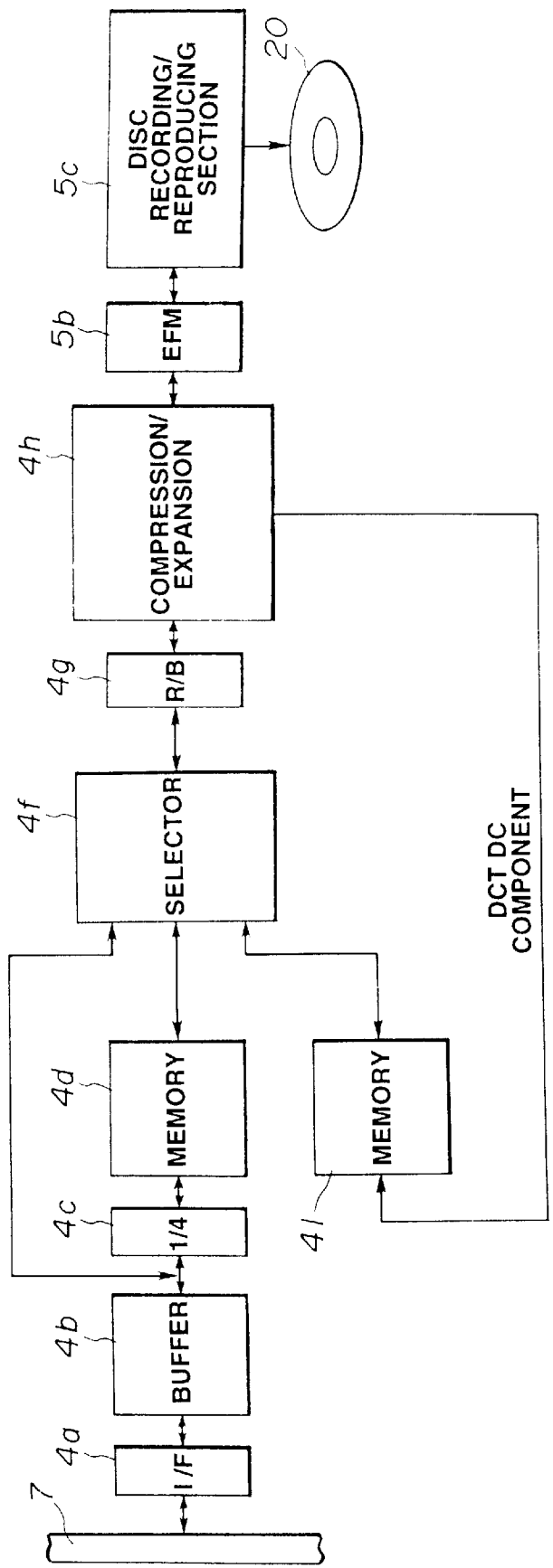
FIG. 51 is a block diagram for explaining a second form of thinning and compression/expansion processing block provided in the still picture recording/reproducing system.

While the thinning compression/expansion processing block 4 allows the picture data of high resolution to undergo thinning processing at ¼ thinning circuit 4c to thereby form picture data of intermediate resolution to further allow such picture data to undergo thinning processing at 1/60 thinning circuit 4e to form picture data of low resolution, the compression/expansion processing block 4 may be of a structure as shown in FIG. 51 to form picture data of low resolution as described above.

It is to be noted that the same reference numerals are respectively attached to the portions which perform the same operations as those of the compression/expansion processing block 4, and their detailed explanation will be omitted.

Namely, in this case, the thinning and compression/expansion processing block includes a second memory 4j for storing, as picture data of low resolution, d.c. component formed by DCT-processing the picture data of intermediate resolution in place of the 1/60 thinning circuit 4e.

Such thinning and compression/expansion processing block 4 allows the picture data of high resolution to undergo thinning processing at ¼ thinning circuit 4c at the time of recording to form picture data of intermediate resolution. Then, this block 4 delivers the picture data of intermediate resolution to the first memory 4d.

Selector 4f is subject to selection control by the thinning and compression/expansion controller 4i, and is operative to select respective picture data in order of picture data of high resolution, picture data of intermediate resolution and picture data of low resolution to output selected picture data. For this reason, picture data of respective resolutions are delivered in the above-mentioned order to the compression/expansion circuit 4h, at which they are caused to undergo fixed length encoding processing. The picture data thus processed are recorded onto the optical disc 20.

In this example, since picture data are caused to undergo DCT processing for every processing block of 8 pixels×8 pixels, d.c. component formed by such DCT processing indicates the same data as the picture data obtained by allowing the picture data of intermediate resolution to undergo thinning processing into 1/60, i.e., picture data of low resolution. For this reason, the compression/expansion circuit 4h (the above-mentioned DCT circuit) delivers, as picture data of low resolution, d.c. component formed in DCT-processing the picture data of intermediate resolution to the second memory 4j. The picture data of low resolution stored in the second memory 4j is selected at the selector 4f as described above and is caused to undergo fixed length encoding processing at the compression/expansion circuit 4h. The picture data thus encoded is recorded onto the optical disc 20.

As stated above, the d.c. component obtained in DCT-processing picture data of intermediate resolution at the DCT circuit of the compression/expansion circuit 4h is stored into the second memory 4j as picture data of low resolution, thereby making it possible to omit the 1/60 thinning circuit 4e. Thus, the cost of the still picture recording/reproducing system can be reduced through reduction of the number of parts and simplification of the configuration.

It is to be noted that data quantity of picture data of low resolution which is the d.c. component of the DCT processing is not so great. For this reason, the space area of the frame memory 11 can be substituted therefor. Thus, the second memory 4j can be omitted as well. The cost can be further reduced.

Figure 52:
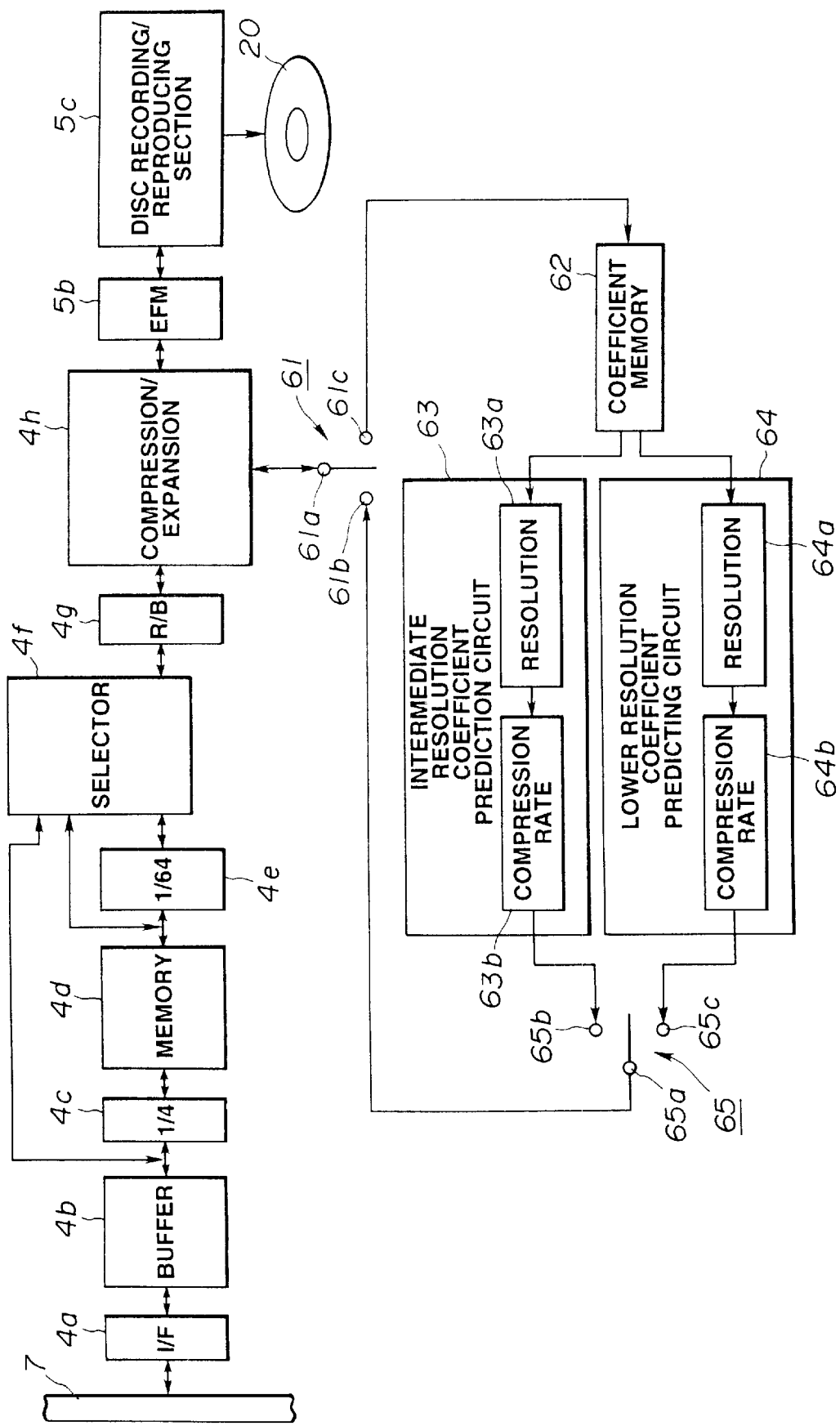
FIG. 52 is a block diagram for explaining a third form of thinning and compression/expansion processing block provided in the still picture recording/reproducing system.

While the compression/expansion circuit 4h employs the two-pass system, in order to allow picture data of respective resolutions to undergo fixed length encoding, to first carry out quantization processing by using suitable quantization coefficients to carry out fixed length encoding processing thereafter to calculate optimum quantization coefficients in dependency upon the result of the fixed length encoding processing to carry out quantization processing and fixed length encoding processing to allow picture data of respective resolutions to respectively have fixed data lengths, when such two-pass system is carried out for every picture data of respective resolutions, six-passes in total are required. As a result, it takes much time in the compression processing. Thus, recording time is prolonged. For this reason, it is preferable that respective circuits as shown in FIG. 52 are added to the compression/expansion circuit 4h so that the compression time can be shortened.

It is to be noted that the same reference numerals are respectively attached to the portions which perform the same operations as those of the compression/expansion processing block 4, and their detailed explanation will be omitted.

Namely, in this case, the thinning and compression/expansion processing block comprises a coefficient memory 62 for storing quantization coefficients in quantizing the picture data of high resolution at the compression/expansion circuit 4h, an intermediate resolution coefficient predicting circuit 63 for predicting and forming quantization coefficients of the picture data of intermediate resolution on the basis of quantization coefficients of the picture data of high resolution stored in the coefficient memory 62, and a low resolution coefficient predicting circuit 64 for predicting and forming quantization coefficients of the picture data of low resolution on the basis of quantization coefficients of the picture data of high resolution. Moreover, the thinning and compression/expansion processing block comprises a second changeover switch 65 for carrying out switching between the quantization coefficient for intermediate resolution from the intermediate resolution coefficient predicting circuit 63 and quantization coefficients for low resolution from the low resolution coefficient predicting circuit 64 to output quantization coefficients obtained by such switching, and a first changeover switch 61 for delivering the quantization coefficient of the picture data of high resolution to the coefficient memory 62, and for delivering the quantization coefficients for intermediate resolution and low resolution from the second changeover switch 65 to the quantizing circuit within the compression/expansion circuit 4h.

In such thinning and compression/expansion processing block, the picture data of respective resolutions are delivered to the selector 4f. The selector 4f selects the respective picture data in order of picture data of high resolution, picture data of intermediate resolution and picture data of low resolution to deliver these picture data to the compression/expansion circuit 4h through raster block conversion circuit 4g.

The compression/expansion circuit 4h allows the picture data of high resolution to undergo fixed length encoding processing by the two-pass system as described above. In this instance, quantization coefficients used when the picture of high resolution is caused to undergo quantization processing at the quantizing circuit provided within the compression/expansion circuit 4h are delivered to select terminal 61a of the first changeover switch 61.

The first changeover switch 61 is subject to switching control by the system controller 6. In this case, the system controller 6 allows the first changeover switch 61 to undergo switching control so that the select terminal 61a is connected to selected terminal 61c. Thus, the quantization coefficients used in quantizing the picture data of high resolution are delivered to the coefficient memory 62, and are temporarily stored thereinto.

The quantization coefficients stored in the coefficient memory 62 are delivered to respective resolution adjustable (changeable) circuits 63a, 64a within the intermediate resolution coefficient predicting circuit 63 and the low resolution coefficient predicting circuit 64.

The resolution variable (adjustable) circuit 63a of the intermediate resolution coefficient predicting circuit 63 varies the quantization coefficients used in quantization of the picture data of high resolution into quantization coefficients for intermediate resolution from a viewpoint of resolution to deliver them to compression rate variable circuit 63b.

The compression rate variable circuit 63b varies the quantization coefficients from the resolution variable circuit 63a into quantization coefficients for intermediate resolution from the viewpoint of compression rate to deliver them to selected terminal 65b of the second changeover switch 65.

Similarly, the resolution variable circuit 64a of the low resolution coefficient predicting circuit 64 varies quantization coefficients used in quantization of the picture data of high resolution into quantization coefficients for low resolution from the viewpoint of resolution to deliver them to the compression rate variable circuit 64b.

The compression rate variable circuit 64b varies quantization coefficients from the resolution variable circuit 64a into quantization coefficients for low resolution from the viewpoint of compression rate to deliver them to selected terminal 65c of the second changeover switch 65.

Thus, the quantization coefficients for intermediate resolution and the quantization coefficients for low resolution which permit those picture data to undergo fixed length encoding by single operation are delivered to respective selected terminals 65b, 65c of the second changeover switch.

The second changeover switch 65 is also subjected to switching control by the system controller 6. The system controller 6 allows the second changeover switch 65 to undergo switching control so that when the picture data of low resolution is delivered to the compression/equation circuit 4h, selected terminal 65b is selected by the select terminal 65a, and when the picture data of low resolution is delivered to the compression/expansion circuit 4h, selected terminal 65c is selected by the select terminal 65a. Moreover, the system controller 6 allows the first changeover switch 61 to undergo switching control so that when the picture data of intermediate resolution or the picture data of low resolution is delivered to the compression/expansion circuit 4h, selected terminal 61b is selected by the select terminal 61a.

Thus, when picture data of intermediate resolution is delivered to the compression/expansion circuit 4h, quantization coefficients for intermediate resolution from the intermediate resolution coefficient predicting circuit 63 are delivered to the quantizing circuit of the compression/expansion circuit 4h through the second and first changeover switches 65, 61 in order. When picture data of low resolution is delivered to the compression/expansion circuit 47, quantization coefficients for low resolution from the low resolution coefficient predicting circuit 64 are delivered to the quantizing circuit of the compression/expansion circuit 4h through the second and first changeover switches 65, 61 in order. Then, the picture data of respective resolutions are quantized by the quantization coefficients for respective resolutions at the quantizing circuit. The quantized picture data are caused to have fixed data length at the fixed length encoding circuit. The picture data thus encoded are recorded onto the optical disc 20.

As described above, the quantization coefficients for picture data of intermediate resolution and the quantization coefficients for picture data of low resolution are caused to be quantization coefficients calculated so that they are permitted to undergo fixed length encoding by one operation on the basis of the quantization-coefficients used in quantizing the picture data of high resolution. For this reason, the number of pass operations carried out in allowing picture data of respective resolutions to undergo fixed length encoding. at the compression/expansion circuit 20 can be reduced to four (4) in total of two (2) with respect to the picture data of high resolution, one (1) with respect to picture data of intermediate resolution and 1 (one) with respect to picture data of low resolution. Thus, the time required for fixed length encoding can be shortened.

In the above-described embodiment (mode), it has been described that the still picture recording/reproducing system to which this invention is applied forms, on the basis of picture data taken in from the scanner unit 1 or the video input unit 8, low resolution picture data for index of 60 pixels×80 pixels, intermediate resolution picture data for monitor display of 480 pixels×640 pixels, and high resolution picture data for print of 1024 pixels×1536 pixels. In addition, this still picture recording/reproducing system may form, e.g., picture data for wide picture monitor having aspect ratio of 9:16 of 480 pixels×848 pixels, picture data for wide picture printer having aspect ratio of 9:16 of 10.0 pixels×1920 pixels, and/or picture data for super high resolution photograph having aspect ratio of 3:2 of 2048 pixels× 3072 pixels, etc. to record such picture data onto the optical disc 20 to reproduce them therefrom.

Moreover, while the intermediate resolution picture data of 480 pixels×640 pixels for monitor display is caused to undergo fixed length compression so as to have data length of 2 clusters, any one of fixed length compression of data length of 1 cluster and fixed length compression of data length of 2 clusters may be selected by the user's intention. Thus, in the case where the user obtains display picture of high resolution, he can select the fixed length compression of data length of 2 clusters. In the case where it is sufficient that resolution is somewhat lowered oppositely to the above, he can select the fixed length compression of data length of 1 cluster. For this reason, selection range of the user can be increased. Thus, this still picture recording/reproducing system is permitted to be more ideal equipment. In this case, when the compression rate of the intermediate resolution picture data is caused to be 2 clusters, only picture data corresponding to 200 pictures could not be recorded onto the optical disc 20 by combination with the high resolution picture data recorded by the 8 clusters. However, when the compression rate of the intermediate resolution picture data is caused to be 1 cluster, picture data corresponding to about 222 pictures can be recorded onto the optical disc 20 by combination with the high resolution picture data recorded by 8 clusters. Thus, the number of recordable pictures can be increased.

Further, while picture data of respective resolutions are respectively caused to undergo fixed length compression, compression rate corresponding to picture data may be employed. In this case, since the compression rate can be compression rate optimum for respective pictures, optimum reproduction picture can be obtained.

In addition, explanation has been given by taking numeric values such that, e.g., the frame memory has memory area of 2048× 2048, and the area of 1024×1536 thereof is the picture memory area and the area of 16×32 is the command area. However, such implementation is only one example. It is a matter of course that various modifications or changes can be made within the range which does not depart from the technical idea according to this invention.

As is clear from the foregoing description, the picture recording apparatus, the picture recording method, the picture reproducing method, the recording medium, and the management method according to this invention can easily carry out preservation (storage) and/or management of still pictures recorded on photographs or books, etc. For this reason, a new still picture system which substitutes for conventional still picture system adapted for carrying out preservation, etc. of still picture by photograph can be realized.

What is claimed is:

1. A picture recording apparatus for recording a source picture data onto a recording medium, comprising:
   picture forming means for forming a plurality of picture data having a different resolution, respectively from said source picture data;
   encoding means for fixed length encoding said plurality of picture data to generate a plurality of encoded picture data, wherein said each encoded picture data has a fixed data length corresponding to a respective assigned picture resolution including high and low resolution;
   recording means for recording said respective plurality of encoded picture data as a high resolution picture file and a low resolution picture file; and
   control means for controlling the encoding means and the recording means so that data sizes of said high and low resolution picture files are an integer multiple of the data size of a minimum access unit;
   wherein said recording medium has a management area for recording a management information table indicating a recording address of said high and low resolution picture file, and a file area for recording said high and low resolution picture file; and further
   wherein said data size of a minimum access unit of said file area is larger than a data size of a minimum access unit of said management area.

2. A picture recording apparatus as set forth in claim 1, wherein the control means controls the encoding means so that data lengths of the respective encoded picture data recorded by the recording means are predetermined data lengths set for every respective resolution.

3. A picture recording apparatus as set forth in claim 1, wherein the recording medium comprises:
   a first area for recording the picture file including the picture data and management file including management data corresponding to the picture data, and
   a second area for recording the management information table which carries out, in the minimum access units, recording state by the picture file and the management file of the first area,
   wherein the control means controls the recording means on the basis of the management file and the management information table.

4. A picture recording apparatus as set forth in claim 3, wherein the control means includes first memory means for storing management data of the management file and the information management table.

5. A picture recording apparatus as set forth in claim 4 wherein the control means controls the first memory means to store, from the recording medium, the management data of the management file and the management information table to control the recording means on the basis of the management data of the management file and the management information table stored in the first memory means.

6. A picture recording apparatus as set forth in claim 3 wherein the control means controls the recording means so as to record, onto the recording medium, as picture files corresponding to each different resolution, the respective picture data of the different resolutions encoded by the encoding means on the basis of data included in the management file and the management information table.

7. A picture recording apparatus as set forth in claim 5, wherein the control means controls the recording means so as to record, onto the recording medium, as picture data of different picture files corresponding to each different resolution, the encoded picture data of the different resolutions encoded by the encoding means on the basis of the management data of the management file and the management information table stored in the first memory means, and controls the first memory means so as to update respective data of the management file and the management information table stored in the first memory means.

8. A picture recording apparatus as set forth in claim 7, wherein the control means controls the recording means so that after recording onto the recording medium of the picture data is completed, it overwrites the respective updated data of the management file and the management information table which are updated into the management file and the management information table on the recording medium.

9. A picture recording apparatus as set forth in claim 3, wherein the control means controls the recording means so as to record, into the first area of the recording medium, the high resolution picture data, the intermediate resolution picture data and the low resolution picture data respectively as the high resolution picture file, an intermediate resolution picture file and an index file on the basis of respective data of the management file and the management information table.

10. A picture recording apparatus as set forth in claim 9, wherein the recording medium is such that the high resolution picture data which is fixed length encoded to have a first data length of an integer multiple of the minimum access unit is recorded as the high resolution picture file, the intermediate resolution picture data which is fixed length encoded to have a second data length of an integer multiple of the minimum access unit, which is shorter than the first data length, is recorded as the intermediate resolution picture file, and a plural low resolution picture data which are fixed length encoded to have a third data length reduced or divided by, an integer factor of the minimum access unit, which is shorter than the second data length, are recorded as index file.

11. A picture recording apparatus as set forth in claim 9,
wherein the first area of the recording medium has a hierarchical directory structure including a directory and subdirectories formed within the directory,
wherein the management file includes a first management file and a second management file,
wherein the index file includes a first index file and a second index file, and further
wherein the control means controls the recording means on the basis of data of the management information table so as to record the first management file and the first index file into the directory, and to record the second management file and the second index file into the subdirectory.

12. A picture recording apparatus as set forth in claim 11, wherein a directory information unit for carrying out management of all the subdirectories formed within the directory is recorded in the first management file, and a picture file information unit for carrying out management of all picture files recorded within the subdirectories is recorded in the second management file.

13. A picture recording apparatus as set forth in claim 11, wherein the low resolution picture data for indicating at least one picture file of picture files recorded within the respective subdirectories formed within the directory is recorded into the first index file, and the low resolution picture data for indicating all high or intermediate resolution picture files recorded within the subdirectories is recorded into the second index file.

14. A picture recording apparatus as set forth in claim 9,
wherein the management file includes first management file in which a directory information unit for carrying out management of all the subdirectories formed within the directory is recorded, and a second management file in which a file information unit for carrying out management of picture files recorded within the subdirectories is recorded, and further
wherein the index file includes a first index file which records the low resolution picture data for indicating at least one picture file of the picture files recorded within the subdirectories formed within the directory, and a second index file which records the low resolution picture data for respectively indicating all picture files recorded within the subdirectories,
to conduct an operation on the basis of the data of the management information table to record the first management file and the first index file into the directory, and to record the second management file and the second index file into the subdirectories.

15. A picture recording apparatus as set forth in claim 9, wherein the control means controls the recording means on the basis of data of the management information table so that the index file is recorded in physically continuous areas on the recording medium.

16. A picture recording apparatus as set forth in claim 9, wherein the control means controls the recording means on the basis of data of the management information table so that one picture is constituted by plural low resolution picture data recorded in the index files, and the plural low resolution picture data are recorded in the order of display on the picture.

17. A picture recording apparatus as set forth in claim 11, wherein, in the first management file, in correspondence with the order of the low resolution picture data recorded in the first index file, a directory information unit for indicating subdirectories including the high resolution picture files or the intermediate resolution picture files corresponding to the low resolution picture data is recorded; and, in the second management file, in correspondence with the order of the low resolution picture data recorded in the second index file, a picture information unit for indicating the number of high resolution picture file or intermediate resolution picture file corresponding to the low resolution picture data is recorded.

18. A picture recording apparatus as set forth in claim 4,
wherein the management information table provided in the second area of the recording medium includes a first management block for carrying out management of the second area in management block units different from the minimum access unit of the recording medium, a second management block for carrying out management of recording state of the first area in the minimum access units, and a third management block for carrying out management of data relating to the respective files and directory recorded in the first area, and further
wherein the control means records data of the first management block, the second management block and the third management block into the first memory means to control the recording means on the basis of the data of the first management block, the second management block and the third management block stored in the first memory means.

19. A picture recording apparatus as set forth in claim 18, wherein the control means is operative so that, in forming a new subdirectory within the directory, it forms the third management block indicating a position within the first area of the new subdirectory, and forms a directory record unit for the directory indicating a position within the second area of the third management block indicating the new subdirectory.

20. A picture recording apparatus as set forth in claim 18, wherein the control means is operative so that, in forming a new file within the subdirectory, it forms, within the third management block indicating the subdirectory, a directory record unit for the file indicating a position within the first area of the new file.

21. A picture recording apparatus as set forth in claim 18,
wherein the plural picture data of different resolutions includes a high resolution picture data, a intermediate resolution picture data, and a low resolution picture data,
wherein the plural picture files include a high resolution picture file in which the high resolution picture data encoded to have a first data length of an integer multiple of the minimum access unit is recorded, an intermediate resolution picture file in which the intermediate resolution picture data encoded to have a second data length of an integer multiple of the minimum access unit is recorded, and an index file in which the low resolution picture data encoded to have a third data length reduced or divided by an integer factor of the minimum access unit is recorded, and further
wherein the control means is operative so that, in recording the high resolution picture file, the intermediate resolution picture file and the index file onto the recording medium, it retrieves, on the basis of data of the second management block stored in the first memory means, the respective areas where the respective files can be physically continuously recorded on the recording medium.

22. A picture recording apparatus as set forth in claim 21, which further includes second memory means different from the recording medium, wherein, in recording the encoded plural low resolution picture data onto the recording medium as the index file, the index file stored on the recording medium is temporarily stored into the second memory means to record the encoded low resolution picture data into the index file stored in the second memory means to record, after recording operations of all the encoded low resolution picture data into the index file recorded in the second memory means are completed, the index file of the second memory means in the continuous areas so that the index file has a predetermined minimum access unit of the recording medium.

23. A picture recording apparatus as set forth in claim 18,
wherein the management file recorded on the recording medium includes a first management file in which directory information for carrying out management of all the subdirectories formed within the directory is recorded, and a second management file in which second file information for carrying out management of picture files recorded within the subdirectories is recorded,
wherein the index file includes a first index file which records low resolution picture data for indicating at least one picture file of the picture files recorded within the subdirectories formed within the directory, and a second index file for recording low resolution picture data for respectively indicating all picture files recorded within the subdirectories, and further
wherein the first management file and the first index file are recorded in the directory, and the second management file and the second index file are recorded in the subdirectory.

24. A picture recording apparatus as set forth in claim 23,
wherein when the plural low resolution picture data are recorded onto the recording medium as the second index file of the subdirectory, an operation is carried out to designate the second index file on the basis of data of the second management file stored in the first memory means to temporarily store the designated second index file on the recording medium into second memory means different from the recording medium on the basis of data of the third management block stored in the first memory means to record low resolution picture data encoded by the encoding means into the second index file stored in the second memory means to record, after recording operations of the encoded all low resolution picture data into the second index file stored in the second memory means have been completed, on the basis of the second management block stored in the first memory means, the second index file including the plural encoded low resolution picture data from the second memory means into the continuous areas of the recording medium so that the second index file has the minimum access unit of the recording medium.

25. A recording picture apparatus as set forth in claim 23, wherein when the encoded plural low resolution picture data are recorded onto the recording medium as the second index file of the subdirectory, an operation is carried out to temporarily store the first and second index files on the recording medium into second memory means different from the recording medium on the basis of data of the third management block stored in the first memory means to record the plural low resolution picture data encoded by the encoding means into the second index file stored in the second memory means, and to record at least one low resolution picture data of the encoded plural low resolution picture data into the first index file stored in the second memory means to read out, after recording operations of all encoded low resolution picture data into the second index files stored in the second memory means is completed, the first and second index files including the plural encoded low resolution picture data from the second memory means on the basis of the second management block stored in the first memory means to record these files into continuous areas of the recording medium so that they have a predetermined minimum access unit of the recording medium.

26. A picture recording apparatus as set forth in claim 23, wherein when the encoded high and intermediate resolution picture data are respectively recorded onto the recording medium as high and intermediate resolution picture files, an operation is carried out to respectively designate the high and intermediate resolution picture files corresponding to the high and intermediate resolution picture data on the basis of the data of the first and second management files stored in the first memory means to detect a space area of the first area on the basis of the second management block stored in the first memory means to respectively record the high and intermediate resolution picture data encoded by the encoding means onto the recording medium as the designated high and intermediate resolution picture files.

27. A picture recording method for recording picture data onto a recording medium,
wherein the recording medium comprises:
a first area for recording, in minimum access units, plural picture files in which plural picture data of different resolutions formed on the basis of a single picture data are recorded for every resolution, and a management file for carrying out correspondence information between the respective files in the plural picture files, and
a second area which records a management information table for carrying out, in minimum access units, management of the recording state within the first area of the respective files recorded in the first area,
the method comprising the steps of:
(a) reading out, from the recording medium, the respective data of the management file and the management information table to store them into first memory means different from the recording medium, and
(b) recording the picture files onto the recording medium on the basis of the respective data of the management file and the management information table stored in the first memory means;
wherein a data size of the minimum access unit of said first area is larger than a data size of the minimum access unit of said second area.

28. A picture recording method as set forth in claim 27, which further includes the step of encoding the picture data so as to have fixed data lengths set for every resolution to record the respective picture data onto the recording medium as picture files set for every respective resolution.

29. A picture recording method as set forth in claim 27,
wherein the recording medium includes:
a first area for recording, in minimum access units, the picture file in which the picture data is recorded and management file including management data corresponding to the picture data, and
a second area for recording management information table which carries out, in minimum access units, recording state by the picture file and the management file in the first area;

wherein a procedure is taken to record the picture file into the first recording area on the basis of respective data of the management file and the management information table at step (b).

30. A picture recording method as set forth in claim 27, which further includes the step of calculating recordable capacity of the recording medium on the basis of the data stored in the first memory means at step (a).

31. A picture recording method as set forth in claim 27, wherein, on the basis of the data recorded in the management file and the management information table, at the step (b), the picture data of respective resolutions are respectively recorded onto the recording medium as picture files set for every respective resolution.

32. A picture recording method as set forth in claim 27,
wherein the picture data of the respective resolutions encoded so as to have fixed data lengths for every respective resolution are respectively recorded onto the recording medium as picture files set for every respective resolution at the step (b),
the method further comprises
(c) a step of updating, followed by recording of the picture data, data of the management file and the management information table stored in the first memory means.

33. A picture recording method as set forth in claim 27, wherein, after step (c), the respective data of the management file and the management information table updated along with recording control of the picture file are overwritten into the management file and the management information table on the recording medium.

34. A picture recording method as set forth in claim 29, which further including the step of forming a high resolution picture data, an intermediate resolution picture data and a low resolution picture data on the basis of the inputted picture data to record, on the basis of the data of the management file and the management information table, the high resolution picture data as a high resolution picture file, the intermediate resolution picture data as an intermediate resolution picture file, and the low resolution picture data as an index file into the first area on the recording medium.

35. A picture recording method as set forth in claim 34, wherein, at step (b), the high resolution picture data which is fixed length encoded to have a first data length is recorded onto the recording medium as the high resolution picture file, the intermediate resolution picture data which is fixed length encoded to have a second data length shorter than the first data length is recorded onto the recording medium as the intermediate resolution picture file, and a plural low resolution picture data which are fixed length encoded to have a third data length shorter than the second data length are recorded onto the recording medium as the index file.

36. A picture recording method as set forth in claim 34,
wherein the first area of the recording medium has a hierarchical directory structure including a directory and subdirectories formed within the directory,
wherein the management file includes a first management file and a second management file, and
wherein the index file includes a first index file and a second index file
to conduct an operation on the basis of the data of the management information table, at step (b), to record the first management file and the first index file into the directory, and to record the second management file and the second index file into the subdirectory.

37. A picture recording method as set forth in claim 36, wherein a directory information for carrying out management of all the subdirectories formed within the directory is recorded into the first management file, and a picture file information for carrying out management of all picture files recorded in the subdirectories is recorded into the second management file.

38. A picture recording method as set forth in claim 36,
wherein the low resolution picture data for indicating at least one picture file of the picture files recorded in the respective subdirectories formed within the directory is recorded into the index file, and
wherein the low resolution picture data for indicating all the high or intermediate resolution picture files recorded in the subdirectories is recorded into the second index file.

39. A picture recording method as set forth in claim 34,
wherein the management file includes a first management file in which a directory information for carrying out management of all the subdirectories formed within the directory is recorded, and a second management file in which a second file information for carrying out management of picture files recorded in the subdirectories is recorded, and
wherein the index file includes a first index file which records an index picture for indicating at least one picture files of the picture files recorded in the subdirectories formed within the directory, and a second index file which records the index pictures for respectively indicating all the picture files recorded in the subdirectories
to conduct an operation on the basis of the management information table to record the first management file and the first index file into the directory, and to record the second management file and the second index file into the subdirectory.

40. A picture recording method as set forth in claim 34, wherein the index file is recorded into physically continuous areas on the recording medium on the basis of the data of the management information table.

41. A picture recording method as set forth in claim 34, wherein one picture is constituted by plural low resolution picture data recorded in the index file on the basis of the data of the management information table, and the plural low resolution picture data are recorded in the order of display on the picture.

42. A picture recording method as set forth in claim 36, wherein a directory information unit for indicating the subdirectory including the high resolution picture files or the intermediate resolution picture files corresponding to the low resolution picture data is recorded into the first management file so as to correspond to the order of the low resolution picture data recorded in the first index file, and a picture information unit for indicating respective numbers of high or intermediate resolution picture files corresponding to the low resolution picture data is recorded into the second management file so as to correspond to the order of the low resolution picture data recorded in the second index file.

43. A picture recording method as set forth in claim 29,
wherein the management information table provided in the second area of the recording medium comprises a first management block for carrying out management of the second area in management block units different from the minimum access unit of the recording medium, a second management block for carrying out recording state of the first area in the minimum access units, and a third management block for carrying out data relating to respective files and directory recorded in the first area, and wherein the method further comprises the step of storing respective data of the first, second and third management blocks from the recording medium into the first memory means to record, at step (b), the picture files on the basis of the respective data of the first, second and third management blocks stored in the first memory means.

44. A picture recording method as set forth in claim 43, wherein, in forming a new subdirectory within the directory, the third management block for indicating a position of the new subdirectory within the first area is formed, and a directory record unit for the directory indicating a position of the third management block within the second area is formed within the third management block.

45. A picture recording method as set forth in claim 43, wherein, in forming a new file within the subdirectory, a directory record unit for file indicating a position of the new file within the first area is formed within the third management block indicating the subdirectory.

46. A picture recording method as set forth in claim 43, wherein the plural picture data of different resolutions includes a high resolution picture data, an intermediate resolution picture data and a low resolution picture data,
wherein the plural picture files includes a high resolution picture file in which high resolution picture data encoded to have a first data length is recorded, an intermediate resolution picture file in which intermediate resolution picture data encoded to have a second data length is recorded, and an index file in which low resolution picture data encoded to have a third data length is recorded, and
wherein, in recording the high resolution picture file, the intermediate resolution file and the index file onto the recording medium, the areas where the respective files are physically continuously recorded on the recording medium are retrieved on the basis of data of the second management block stored in the first memory means.

47. A picture recording method as set forth in claim 46, wherein, in recording the encoded plural low resolution picture data onto the recording medium as the index file, a procedure is taken to temporarily store the index file recorded on the recording medium into second memory means different from the recording medium to record the encoded low resolution picture data into the index file stored in the second memory means to record, after recording into the index file recorded in the second memory means of all encoded low resolution picture data is completed, the index file of the second memory means into the continuous areas of the recording medium so that the index file has the minimum access unit of the recording medium.

48. A picture recording method as set forth in claim 43, wherein the management file recorded on the recording medium includes a first management file in which a directory information for carrying out management of all the subdirectories formed within the directory is recorded, and a second management file in which a second file information for carrying out management of the picture files recorded in the subdirectories is recorded,
wherein the index file includes a first index file which records an index picture for indicating at least one picture file of the picture files recorded in the subdirectories formed within the directory, and a second index file which records the index pictures for respectively indicating all picture files recorded in the subdirectories, and wherein the first management file and the first index file are recorded into the directory, and the second management file and the second index file are recorded into the subdirectory.

49. A picture recording method as set forth in claim 48, wherein, in recording the encoded plural low resolution picture data onto the recording medium as the second index file of the subdirectory,
a procedure is taken
to designate the second index file on the basis of the data of the second management file stored in the first recording means to read out, from on the recording medium, the designated second index file on the basis of the data of the third management block stored in the first memory means to temporarily store it into second memory means different from the recording medium,
to record the low resolution picture data encoded by the encoding means into the second index file stored in the second memory means,
to record, after recording of all the encoded low resolution picture data into the second index file recorded in the second memory means is completed, on the basis of the second management block stored in the first memory means, the second index file including the plural encoded low resolution picture data from the second memory means into continuous areas of the recording medium so that the second index file has the minimum access unit of the recording medium.

50. A picture recording method as set forth in claim 48, wherein, in recording the encoded plural low resolution picture data onto the recording medium as the second index file of the subdirectory,
a procedure is taken,
to designate the first and second index files on the basis of the data of the first and second management files stored in the first memory means
to temporarily store, on the basis of the data of the third management block stored in the first memory means, the first and second index files on the recording medium into second memory means different from the recording medium
to record the encoded plural low resolution picture data into the second index file stored in the second memory means, and
to record, into the first index file stored in the second memory means, at least one low resolution picture data of the encoded plural low resolution picture data
to read out, after recording of the encoded all low resolution picture data into the second index file recorded in the second memory means is completed, on the basis of the second management block stored in the first memory means, the first and second index files including plural encoded low resolution picture data from the second memory means to record these files into the continuous areas of the recording medium so that they have the minimum access unit of the recording medium.

51. A picture recording method as set forth in claim 48, wherein, in respectively recording the encoded high resolution picture data and the encoded intermediate resolution picture data onto the recording medium as a high resolution picture file and an intermediate resolution picture file,
a procedure is taken
to respectively designate the high resolution picture file and the intermediate resolution picture file with respect to the high resolution picture data and the intermediate resolution picture data on the basis of the respective data of the first and second management files stored in the first memory means to respectively record, on the basis of the second management block stored in the first memory means, the high resolution picture data and the intermediate resolution picture data encoded by the encoding means onto the recording medium as the designated high resolution picture file and the designated intermediate resolution picture file.

52. A picture reproducing method for reproducing picture data recorded on a recording medium, wherein the recording medium comprises a first area for recording plural picture files in which plural picture data of different resolutions formed from an original picture data are recorded for every resolution, and a management file for carrying out management of correspondence information between the respective files in the plural picture files, and a second area different from the first area, which records a management information table for carrying out, in minimum access units of the recording medium, relative position within a first area of the respective files recorded in the first area, the method comprising the steps of:

(a) designating the picture file on the basis of the data of the management file recorded in the first area, and (b) reproducing the picture file recorded on the recording medium on the basis of the data of management information table recorded in the second area;

wherein a data size of a minimum access unit of said first area is larger than a data size of a minimum access unit of said second area.

53. A picture reproducing method as set forth in claim 52, further including the step (c) of obtaining the picture data from the picture file reproduced from the recording medium on the basis of the respective data of the management file and the management information table.

54. A picture reproducing method as set forth in claim 52, further comprising the step of reproducing, from the recording medium, the respective data of the management file and the management information table to store those data into first memory means different from the recording medium to reproduce, at step (b), on the basis of the respective data of the management file and the management information table stored in the first memory means, the picture file recorded on the recording medium.

55. A picture reproducing method as set forth in claim 52, wherein, at step (c), on the basis of the data recorded in the management file and the management information table, the picture data of the respective resolutions are respectively reproduced from the picture files for every respective resolution recorded on the recording medium.

56. A picture reproducing method as set forth in claim 54, wherein, at step (b), on the basis of respective the data of the management file and the management information table stored in the first memory means, a high resolution picture data is reproduced from a high resolution picture file recorded on the recording medium and an intermediate resolution picture data is reproduced from an intermediate resolution picture file recorded on the recording medium; and, at step (c), a low resolution picture data is reproduced from an index file recorded on the recording medium.

57. A picture reproducing method as set forth in claim 52, wherein a high resolution picture file including a high resolution picture data which is fixed length encoded to have a first data length of an integer multiple of the minimum access unit, an intermediate resolution picture data which is fixed length encoded to have a second data length of an integer multiple of the minimum access unit, which is shorter than the first data length, and an index file including a plural low resolution picture data which are fixed length encoded to have a third data length reduced or divided by an integer factor of the minimum access unit, which is shorter than the second data length are recorded on the recording medium, wherein, at step (c), on the basis of the respective data of the management file and the management information table, the high resolution picture data is fixed length encoded is reproduced from the high resolution picture file, the intermediate resolution picture data which is fixed length encoded is reproduced from the intermediate resolution picture file, and the low resolution picture data which is fixed length encoded is reproduced from the index file, and wherein the method further comprises the step of decoding the reproduced picture data of the respective resolutions to output them.

58. A picture reproducing method as set forth in claim 56, wherein the first area of the recording medium has a hierarchical directory structure including a directory and subdirectories formed within the directory, wherein the management file includes a first management file recorded within the directory, and a second management file recorded within the subdirectory, wherein the index file includes a first index file recorded in the directory and a second index file recorded in the subdirectory to reproduce the low resolution picture data of the first index file, at steps (b) and (c), on the basis of the respective data of the first management file and the management information table to reproduce the low resolution picture data of the second index file on the basis of the respective data of the second management file and the management information table.

59. A picture reproducing method as set firth in claim 58, wherein a directory information unit for carrying out management of all the subdirectories formed within the directory is recorded in the first management file, wherein a picture file information unit for carrying out management of all picture files recorded within the subdirectories is recorded in the second management file, and wherein, at step (a), the directory is designated on the basis of directory information of the first management file, and, at step (b), the picture file is reproduced on the basis of file information of the second management file recorded in the designated directory.

60. A picture reproducing method as set forth in claim 58, wherein the low resolution picture data for indicating at least one picture file of the picture files recorded in the respective subdirectories formed within the directory is recorded in the first index file, wherein the low resolution picture data for indicating all high or intermediate picture files recorded within the subdirectories is recorded into the second index file, and wherein a procedure is taken to output, at the same time, at least one low resolution picture data in the respective subdirectories from all the subdirectories formed within the directory on the basis of reproduction of the first index file to output, at the same time, all the low resolution picture data recorded within the subdirectories on the basis of reproduction of the second index file.

61. A picture reproducing method as set forth in claim 56, wherein the management file includes a first management file in which directory information for carrying out management of all the subdirectories formed within the directory is recorded, and a second management file in which a second file information for carrying out management of the picture file recorded in the subdirectory is recorded, and wherein the index file includes a first index file which records an index picture for indicating at least one picture file of the picture files recorded in the subdirectories formed within the directory, and a second index file which records the index pictures for respectively indicating all picture files recorded within the subdirectories to reproduce the low resolution picture data of the first index file on the basis of respective data of the first management file and the management information table, and to reproduce the low resolution picture data of the second index file on the basis of respective data of the second management file and the management information table.

62. A picture reproducing method as set forth in claim 58, wherein, in the first management file, in a manner corresponding the order of the low resolution picture data recorded in the first index file, the directory in which picture data is included and the directory information unit for indicating the number of high resolution picture file or intermediate resolution picture file corresponding to the low resolution picture data are recorded, wherein, in the second management file, in a manner corresponding the order of the low resolution picture data recorded in the second index file, the picture information unit for indicating the number of high resolution picture file or intermediate resolution picture file corresponding to the low resolution picture data is recorded, and wherein a procedure is taken to designate, at step (a), a subdirectory on the basis of the data of the directory information unit recorded in the first management file to reproduce, at step (b) the high resolution picture file or the intermediate resolution picture file on the basis of the picture information unit recorded in the second management file within the subdirectory.

63. A picture reproducing method as set forth in claim 54, wherein the management information table provided in the second area of the recording medium includes a first management block for carrying out management of the second area in management block units different from the minimum access unit of the recording medium, a second management block for carrying out management of the recording state of the first area in the minimum access units, and a third management block for carrying out data relating to respective files and the directory recorded in the first area, and wherein, at step (b), the picture file is reproduced on the basis of the respective data of the first, second and third management blocks stored in the first memory means.

64. A picture reproducing method as set forth in claim 63, wherein the picture file includes the high resolution picture file in which the high resolution picture data encoded to have a first data length of an integer multiple of the minimum access unit is recorded, an intermediate resolution picture file in which the intermediate resolution picture data encoded to have second data length of an integer multiple of the minimum access unit is recorded, and an index file in which the low resolution picture data encoded to have a third data length reduced or divided by an integer factor of the minimum access unit is recorded, a procedure is taken to designate the high resolution picture file and the intermediate picture file on the basis of the management file recorded in the first memory means to designate third block corresponding to the subdirectory in which the high resolution picture file and the intermediate resolution picture file designated on the basis of the data of the first management block are recorded to designate the high resolution picture file and the intermediate resolution picture file on the basis of data of the designated third block to respectively reproduce the high resolution picture data and the intermediate resolution picture data from the high resolution picture file and the intermediate resolution picture file on the basis of the data recorded in the management file.

65. A picture reproducing method as set forth in claim 63, wherein the management file includes a first management file recorded in the directory and a second management file recorded in the subdirectory, wherein the index file includes a first index file recorded in the directory and a second index file recorded in the subdirectory, wherein, into the first management file, in a manner corresponding the order of the low resolution picture data recorded in the first index file, the directory in which the low resolution picture data is recorded and the plural directory information units for indicating the number of high resolution picture file or intermediate resolution picture file corresponding to the low resolution picture data are recorded, wherein, into the second management file, in a manner corresponding the order of the low resolution picture data recorded in the second index file, the picture information unit for indicating the number of high resolution picture file or intermediate resolution picture file corresponding to the low resolution picture data is recorded, wherein, on the basis of data of the directory information unit recorded in the first management file, the subdirectory is designated in correspondence with the reproduction order of the low resolution picture data of the first index file, wherein, on the basis of the picture information unit recorded in the second management file within the designated subdirectory, the high resolution picture file or the intermediate resolution picture file is designated in correspondence with the reproduction order of the low resolution picture data of the second index file is designated, wherein, on the basis of the data of the first management block, third block corresponding to subdirectory in which the designated high and intermediate picture files are recorded is designated, wherein, on the basis of data of the designated third block, the high and low resolution picture files are designated, and wherein, on the basis of data of the second management file recorded in the management file, the high resolution picture data and the intermediate resolution picture data are respectively reproduced from the high resolution picture file and the intermediate resolution picture file.

66. A recording medium for recording a picture data, wherein the picture data is recorded by a file structure comprising:

a first management information table for carrying out management of a rewrite disable area and a rewritable area of the recording medium;

a first area provided within the rewritable area managed by the first management information table and for recording plural picture files obtained by classifying, for every resolution, plural picture data of different resolutions generated from the respective original picture data and a management file for carrying out management of correspondence information between the respective files in the plural picture files; and a second area provided within the rewritable area except for the first area managed by the first management information table and for recording a second management information table which carries out, in minimum access units of the recording medium, management of the relative position within the first area of the picture file and the management file included within the first area;

wherein a data size of a minimum access unit of said first area is larger than a data size of a minimum access unit of said second area.

67. A recording medium as set forth in claim 66, wherein the first area has a hierarchical directory structure including a directory and at least one subdirectory formed within the directory.

68. A recording medium as set forth in claim 67, wherein the management file includes a first management file included within the directory, and a second management file included within the subdirectory.

69. A recording medium as set forth in claim 68, wherein a directory information unit for carrying out management of all subdirectories of the subdirectories formed at the lower level of the directory is included in the first management file, and wherein a file information unit for carrying out management of the picture file recorded in the subdirectories is included in the second management file.

70. A recording medium as set forth in claim 66, wherein the picture data included in the plural picture files are picture data which are fixed length encoded in the minimum access units.

71. A recording medium as set forth in claim 66, wherein the plural picture data of different resolutions includes a high resolution picture data, an intermediate resolution picture data and a low resolution picture data, and wherein the plural picture files includes a high resolution picture file including the high resolution picture data, an intermediate resolution picture data including the intermediate resolution picture data, and an index file including the low resolution picture data.

72. A recording medium as set forth in claim 71, wherein the high resolution picture data which are fixed length encoded to have a first data length of an integer multiple of the minimum access unit is included in the high resolution picture file, wherein the intermediate resolution picture data which is fixed length encoded to have a second data length of an integer multiple of the minimum access unit, which is shorter than the first data length, is included in the intermediate resolution picture file, and wherein the low resolution picture data which is fixed length encoded to have a third data length reduced or divided by an integer factor of the minimum unit, which is shorter than the second data length is included in the index file.

73. A recording medium as set forth in claim 66, wherein the plural picture data of different resolutions includes a high resolution picture data, a intermediate resolution picture data and a low resolution picture data, wherein the plural picture files includes a high resolution picture file including the high resolution picture data, an intermediate resolution picture file including the intermediate resolution picture data, and an index file including the low resolution picture data, and wherein one high resolution picture data formed from the original picture data is recorded in the high resolution picture file, one intermediate resolution picture data formed from the original data is recorded in the intermediate resolution picture file, and plural low resolution picture data formed from the plural original picture data are recorded in the index file.

74. A recording medium as set forth in claim 73, wherein the first area has a hierarchical directory structure including a directory and subdirectories formed within the directory, and wherein the index file includes a first index file recorded in the directory and a second index file recorded in the subdirectory.

75. A recording medium as set forth in claim 73, wherein the first area has a hierarchical directory structure including a directory and subdirectories formed within the directory, wherein the management file includes a first management file in which a directory information unit for carrying out management of all the subdirectories of the subdirectories formed at the lower level of the directory is recorded, and a second management file in which a second file information unit for carrying out management of picture file recorded in the subdirectory is recorded, wherein the index file includes a first index file which records low resolution picture data for indicating at least one picture file of picture files recorded in the subdirectories formed within the directory, and a second index file which records low resolution picture data for respectively indicating all picture files recorded in the subdirectory, and wherein the first management file and the first index file are included in the directory, and the second management file and the second index file are included in the subdirectory.

76. A recording medium as set forth in claim 73, wherein the index file is recorded into physically continuous areas on the recording medium.

77. A recording medium as set forth in claim 73, wherein one picture is constituted by plural low resolution picture data included in the index file, and the plural low resolution picture data are recorded in the display order on the picture.

78. A recording medium as set forth in claim 75, wherein, in the first management file, to correspond to the recording order of the low resolution picture data recorded in the first index file, a directory information unit for indicating the number of subdirectory including high resolution picture file or intermediate resolution picture file corresponding to the low resolution picture data is recorded, and wherein, in the second management file, to correspond to the recording order of the low resolution picture data recorded in the second index file, a picture information unit for indicating the number of high resolution picture file or intermediate resolution picture file corresponding to the low resolution picture data is recorded.

79. A recording medium as set forth in claim 66, wherein the second management information table includes a first management block for carrying out, in management block units different from the minimum access unit of the recording medium, management of the second area, and a second management block for carrying out management of recording state of the first area in the minimum access units.

80. A recording medium as set forth in claim 66, wherein the first area of the recording medium has a hierarchical directory structure including a directory and a subdirectory formed within the directory, and wherein the second management information table includes a first management block for carrying out, in management block units different from the minimum access unit of the recording medium, a second management block for carrying out recording state of the first area in the minimum access units, and a third management block for carrying out management of data relating to respective files recorded in the subdirectory and the first area.

81. A recording medium as set forth in claim 80, wherein the hierarchical directory structure including the directory and subdirectory is represented by the first management block and the third management block recorded in the second management information table.

82. A recording medium as set forth in claim 80, wherein the third management block includes a directory record unit for the directory indicating the positions within the first area of the directory and the subdirectory, and a directory record unit for the file indicating positions within the first area of the respective files recorded in the first area.

83. A recording medium as set forth in claim 80, wherein management of the position of the subdirectory is carried out in minimum access units by the directory record unit for the directory included in the third management block indicating the directory, and wherein management of positions of the plural picture files recorded in the subdirectories is carried out in minimum access units by the directory record unit for file included in the third management block indicating the subdirectory.

84. A recording medium as set forth in claim 80, wherein the plural picture data of different resolutions include a high resolution picture data, an intermediate resolution picture data and a low resolution picture data, wherein the plural picture files a high resolution picture file including the high resolution picture data, an intermediate resolution picture file including the intermediate resolution picture data, and an index file including the low resolution picture data, and wherein one high resolution picture data formed from the original picture data is included in the high resolution picture file, one intermediate resolution picture data formed from the original picture data is included in the intermediate resolution picture file, and plural low resolution picture data formed from the plural original picture data are included in the index file.

85. A recording medium as set forth in claim 84, wherein the management file includes a first management file in which a directory information for carrying out management of all subdirectories of the subdirectories formed at the lower level of the directory is included, and a second management file in which a file information for carrying out management of picture files recorded in the subdirectories is included, wherein the index file includes a first index file which records the low resolution picture data for indicating at least one picture file of picture files recorded in the subdirectories formed at the lower level of the directory, and a second index file which records the low resolution picture data for respectively indicating all picture files recorded in the subdirectories, and wherein the first management file and the first index file are recorded in the directory, and the second management file and the second index file are recorded in the subdirectory.

86. A recording medium as set forth in claim 85, wherein information indicating the high resolution picture file or the intermediate resolution picture file corresponding to the low resolution picture data recorded in the second index file is included in the data of the second management file, wherein the recording medium has a data management structure in which the position within the first area of the designated high or intermediate resolution picture file is designated on the basis of data of the first management block and the third management block recorded in the second management information table.

87. A recording medium as set forth in claim 66, which has a data management structure in which only the picture file managed by the management file is subjected to recording/reproduction management.

88. A recording medium as set forth in claim 66, wherein the picture file recorded in the first area of the recording medium has a data management structure in which recording/reproduction is carried out on the basis of the data recorded in the management file and the second management information table.

89. A recording medium as set forth in claim 66, wherein the picture file recorded in the first area of the recording medium has data management structure in which the picture file is designated on the basis of the data recorded in the management file, and the position on the recording medium is designated on the basis of data recorded in the second management information table.

90. A recording medium for recording picture data, the recording medium comprising:

a first area for recording a plurality of picture files corresponding to a picture resolution and a management file for managing said picture files;

a second area for recording a management table for controlling a recording address of said management file and said picture files;

wherein the recording medium has data management structure in which one picture file is designated from the plurality of picture files on the basis of said management file, and a recording address of said designated picture file is designated on the basis of data included in the management information table; and further wherein a data size of a minimum access unit of said first area is larger than a data size of a minimum access unit of said second area.

91. A recording medium as set forth in claim 90, wherein the recording medium includes a file area for recording the picture file and the management file, and a management area for recording the management information table.

92. A recording medium as set forth in claim 91, wherein the file area of the recording medium has a hierarchical directory structure including a directory and subdirectories formed within the directory.

93. A recording medium as set forth in claim 92, wherein the management file includes a first management file recorded in the directory and a second management file recorded in the subdirectory.

94. A recording medium as set forth in claim 93, wherein a directory information unit for carrying out management of all the subdirectories of the subdirectories formed at the lower level of the directory is included in the first management file, and wherein a second file information unit for carrying out management of picture files recorded into the subdirectories is included in the second management file.

95. A recording medium as set forth in claim 90, wherein the picture data recorded into the plural picture files are picture data which are fixed length encoded in minimum access units.

96. A recording medium as set forth in claim 90, wherein the plural picture data of different resolutions include a high resolution picture data, an intermediate resolution picture data and a low resolution picture data, and wherein the plural picture files include a high resolution picture file including the high resolution picture data, an intermediate resolution picture file including the intermediate resolution picture data, and an index file including the low resolution picture data.

97. A recording medium as set forth in claim 96, wherein the high resolution picture data which is fixed length encoded to have a first data length of an integer multiple of the minimum access unit is included in the high resolution picture file, wherein the intermediate resolution picture data which is fixed length encoded to have a second data length of an integer multiple of the minimum access unit, which is shorter than the second data length, is included in the intermediate resolution picture file, and wherein the low resolution picture data which is fixed length encoded to have a third data length reduced or divided by an integer factor of the minimum access unit, which is shorter than the second data length, is included in the index file.

98. A picture recording as set forth in claim 90, wherein the plural picture data of different resolutions include a high resolution picture data, an intermediate resolution picture data and a low resolution picture data, wherein the plural picture file includes a high resolution picture file including the high resolution picture data, an intermediate resolution picture file including the intermediate resolution picture data, and an index file including the low resolution picture data, and wherein one high resolution picture data formed from the original picture data is recorded in the high resolution picture file, one intermediate resolution picture data formed from the original picture data is recorded in the intermediate resolution picture file, and plural low resolution picture data formed from the plural original picture data are recorded in the index file.

99. A recording medium as set forth in claim 98, wherein the first area of the recording medium has a hierarchical directory structure including a directory and subdirectories formed within the directory, and wherein the index file includes a first index file recorded in the directory, and a second index file recorded in the subdirectory.

100. A recording medium as set forth in claim 98, wherein the file area of the recording medium has a hierarchical directory structure including a directory and subdirectories formed within the directory, wherein the management file includes a first management file in which a directory information unit for carrying out management of all the subdirectories of the subdirectories formed at the lower level of the directory is included, and a second management file in which a second file information unit for carrying out management of picture files recorded in the subdirectories is included, wherein the index file includes a first index file including the low resolution picture data for indicating at least one picture file of picture files recorded in the subdirectories formed within the directory, and a second index file including the low resolution picture data for respectively indicating all picture files recorded in the subdirectories, and wherein the first management file and the first index file are recorded into the directory, and the second management file and the second index file are recorded into the subdirectory.

101. A recording medium as set forth in claim 98, wherein the index file is recorded into physically continuous area on the recording medium.

102. A recording medium as set forth in claim 98, wherein one picture is constituted by plural low resolution picture data included in the index file, and the plural low resolution picture data are recorded in the display order on the picture.

103. A recording medium as set forth in claim 102, wherein, in the first management file, to correspond to the recording order of the low resolution picture data recorded in the first index file, a directory information unit for indicating the number of subdirectory including the high resolution picture file or the intermediate resolution picture file corresponding to the low resolution picture data is recorded, and wherein, in the second management file, to correspond to the recording order of the low resolution picture data recorded in the second index file, a picture information unit for indicating the number of high resolution picture file or intermediate resolution picture file corresponding to the low resolution picture data is recorded.

104. A recording medium as set forth in claim 90, wherein the second management information table includes a first management block for carrying out, in management block units different from the minimum access unit of the recording medium, management of the management area, and a second management block for carrying out, in the minimum access unit, management of recording state of the first area.

105. A recording medium as set forth in claim 90, wherein the file area of the recording medium has a hierarchical directory structure including a directory and subdirectories formed within the directory, and wherein the second management information table includes a first management block for carrying out, in management block units different from the minimum access unit, management of the management area, a second management block for carrying out, in the minimum access units, management of recording state of the first area, and a third management block for carrying out management of data relating to respective files recorded in the directory, the subdirectories and the first area.

106. A picture recording as set forth in claim 105, wherein the hierarchical directory structure including the directory and the subdirectories is represented by the first and third management blocks included in the second management information table.

107. A recording medium as set forth in claim 105, wherein the third management block includes:

a directory record unit for directory indicating the position within the file area of the directory and the subdirectories, and a directory record unit for the file indicating the positions within the file area of the respective files recorded in the file area.

108. A recording medium as set forth in claim 105, wherein management of position of the subdirectory is carried out in the minimum access units by the directory record unit for the directory included in the third management block indicating the directory, and wherein management of positions of plural picture files recorded in the subdirectories is carried out in the minimum access units of the recording medium by the directory record unit for file included in the third management block indicating the subdirectory.

109. A recording medium as set forth in claim 105, wherein the plural picture data of different resolutions includes a high resolution picture data, an intermediate resolution picture data and a low resolution picture data, wherein the plural picture files a high resolution picture file including the high resolution picture data, an intermediate resolution picture file including the intermediate resolution picture data, and an index file including the low resolution picture data, and wherein one high resolution picture data formed from the original picture data is included in the high resolution picture file, one intermediate resolution picture data formed from the original picture data is included in the intermediate resolution picture file, and plural low resolution picture data formed from the plural picture data are included in the index file.

110. A recording medium as set forth in claim 109, wherein the management file includes a first management file in which the directory information for carrying out management of all the subdirectories of the subdirectories formed at the lower level of the directory is recorded, and a second management file in which second file information for carrying out management of picture files recorded in the subdirectories, wherein the index file includes a first index file which records low resolution picture data for indicating at least one picture file of picture files recorded in the subdirectories formed at the lower level of the directory, and a second index file which records low resolution picture data for respectively indicating all the picture files recorded in the subdirectories, and wherein the first management file and the first index file are recorded into the directory, and the second management file and the second index file are recorded into the subdirectory.

111. A recording medium as set forth in claim 110, wherein the recording medium has a data management structure in which high resolution picture file or intermediate resolution picture file corresponding to the low resolution picture data included in the second index file is designated on the basis of data of the second management file, and position within the first area of the designated high or intermediate resolution picture file is designated on the basis of the first and third management blocks included in the second management information table.

112. A recording medium as set forth in claim 90, wherein the recording medium has a data management structure in which only picture files managed by the management file are subjected to recording/reproduction management.

113. A recording medium as set forth in claim 90, wherein the picture file recorded into the first area of the recording medium has a data management structure in which recording/reproduction is carried out on the basis of data included in the management file and the second management information table.

114. A recording medium as set forth in claim 90, wherein the picture file recorded in the first area of the recording medium has a data management structure in which picture file is designated on the basis of data included in the management file, and the position on the recording medium is designated on the basis of data recorded in the second management information table.

115. A management method of carrying out management of picture data on a recording medium, wherein a rewritable area and a rewrite disable area on the recording medium are subjected to management by a first management information table recorded on the recording medium, wherein, within a first area provided in the recordable area, plural picture files obtained by classifying, for every resolution, plural picture data of different resolutions generated from an original picture data are subjected to management by a management file having correspondence relationship between the respective files in the plural picture files, wherein, within a second area serving as the rewritable area except for the first area, management of a recording state within the second area is carried out in manage block units by a second management information table recorded in the second area, and management of recording state of the first area by the picture file and the management file recorded within the first area is carried out in minimum access units of the recording medium; and further wherein a data size of the minimum access unit of said first area is larger than a data size of the minimum access unit of said second area.

116. A management method as set forth in claim 115, wherein the first area of the recording medium has a hierarchical directory structure including a directory and subdirectories formed within the directory.

117. A management method as set forth in claim 116, wherein the management file includes a first management file included in the directory, and a second management file included in the subdirectory.

118. A management method as set forth in claim 117,
wherein a directory information unit for carrying out management of all the subdirectories of the subdirectories formed at the lower level of the directory is included in the first management file, and
wherein a file information unit for carrying out management of picture files recorded in the subdirectories is included in the second management file.

119. A management method as set forth in claim 115, wherein the picture data recorded in the plural picture files are picture data which are fixed length encoded in the minimum access units.

120. A management method as set forth in claim 115, wherein the plural picture data of different resolutions include a high resolution picture data, an intermediate resolution picture data and a low resolution picture data, and wherein the plural picture files a high resolution picture file including the high resolution picture data, an intermediate resolution picture file including the intermediate resolution picture data, and an index file including the low resolution picture data.

121. A management method as set forth in claim 115, wherein the high resolution picture data which is fixed length encoded to have a first data length of an integer multiple of the minimum access unit is included in the high resolution picture file,
wherein the intermediate resolution picture data which is fixed length encoded to have a second data length of multiple of the minimum access unit, which is shorter than the first data length is included in the intermediate resolution picture file, and
wherein the low resolution picture data which is fixed length encoded to have a third data length reduced or divided by an integer factor of the minimum unit, which is shorter than the second data length, is included in the index file.

122. A management method as set forth in claim 115,
wherein the plural picture data of different resolutions include a high resolution picture data, an intermediate resolution picture data, and a low resolution picture data,
wherein the plural picture files includes a high resolution picture file including the high resolution picture data, an intermediate resolution picture file including the intermediate resolution picture data, and an index file including the low resolution picture data, and
wherein one high resolution picture data formed from the original picture data is recorded into the high resolution picture file, one intermediate resolution picture data formed from the original picture data is recorded into the intermediate resolution picture file, and plural low resolution picture data formed from the plural original picture data are recorded into the index file.

123. A management method as set forth in claim 122,
wherein the first area has a hierarchical structure including a directory and subdirectories formed within the directory, and
wherein the index file includes a first index file recorded in the directory and a second index file recorded in the subdirectory.

124. A management method as set forth in claim 122,
wherein the first area has a hierarchical directory structure including a directory and subdirectories formed within the directory,
wherein the management file includes a first management file in which a directory information unit for carrying out management of all the subdirectories of the subdirectories formed at the lower level of the directory is recorded, and a second management file in which a second file information unit for carrying out management of the picture files recorded in the subdirectories is recorded,
wherein the index file includes a first index file which records low resolution picture data for indicating at least one picture file of picture files recorded into the subdirectories formed within the directory, and a second index file which records low resolution picture data for respectively indicating all picture files recorded in the subdirectories, and
wherein the first management file and the first index file are included in the directory, and the second management file and the second index file are included in the subdirectory.

125. A management method as set forth in claim 122,
wherein the index file is recorded in physically continuous areas on the recording medium.

126. A management method as set forth in claim 122, wherein one picture is constituted by plural low resolution picture data included in the index file, and the plural low resolution picture data are recorded in the order of display on the picture.

127. A management method as set forth in claim 124,
wherein, in the first management file, to correspond to the recording order of the low resolution picture data recorded in the first index file, the directory information unit for indicating the number of subdirectory including high resolution picture file or intermediate resolution picture file corresponding to the low resolution picture data is recorded, and
wherein, in the second management file, to correspond to the recording order of the low resolution picture data recorded in the second index file, the picture information unit for indicating number of high resolution picture file or intermediate resolution picture file corresponding to the low resolution picture data is recorded.

128. A management method as set forth in claim 115, wherein the second management information table includes a first management block for carrying out, in management block units different from the minimum access unit of the recording medium, management of the second area, and a second management block for carrying out, in the minimum access units, management of recording state of the first area.

129. A management method as set forth in claim 115,
wherein the first area of the recording medium has a hierarchical directory structure including a directory and subdirectories formed within the directory, and
wherein the second management information table includes a first management block for carrying out, in management block units different from the minimum access unit of the recording medium, management of the second area, a second management block for carrying out, in minimum access units, management of the recording state of the first area, and a third management block for carrying out management of data relating to respective files recorded in the directory, the subdirectories and the first area.

130. A management method as set forth in claim 129, wherein a hierarchical directory structure including the directory and the subdirectories is represented by the first and third management blocks recorded in the second management information table.

131. A management method as set forth in claim 129,
wherein the third management block includes
a directory record unit for a directory indicating position within the first area of the directory and the subdirectories, and
a directory record unit for file indicating positions within the first area of the respective files recorded in the first area.

132. A management method as set forth in claim 129,
wherein management of the position of the subdirectory is carried out in the minimum access units by the directory record unit for the directory included in the third management block indicating the directory, and
wherein management of positions of plural picture files recorded into the subdirectories is carried out in the minimum access units by the directory record unit for the file included in the third management block indicating the subdirectory.

133. A management method as set forth in claim 129,
wherein the plural picture data of different resolutions include a high resolution picture data, an intermediate resolution picture data and a low resolution picture data,
wherein the plural picture files include a high resolution picture file including the high resolution picture data, an intermediate resolution picture file including the intermediate resolution picture data, and an index file including the low resolution picture data, and
wherein one high resolution picture data formed from the original picture data is included in the high resolution picture file, one intermediate resolution picture data formed from the original picture data is included in the intermediate resolution picture file, and plural low resolution picture data formed from the plural original pictures are included in the index file.

134. A management method as set forth in claim 133,
wherein the management file includes a first management file in which directory information for carrying out management of all the subdirectories of the subdirectories formed at the lower level of the directory is recorded, and a second management file in which file information unit for carrying out management of picture files recorded in the subdirectories is recorded,
wherein the index file includes a first index file which records the low resolution picture data for indicating at least one picture file of picture files recorded in the subdirectories formed at the lower level of the directory, and a second index file which records the low resolution picture data for respectively indicating all picture files recorded in the subdirectories, and
wherein the first management file and the first index file are recorded in the directory, and the second management file and the second index file are recorded in the subdirectory.

135. A management method as set forth in claim 134,
wherein data of the second management file has a data management structure in which information indicating high resolution picture file or intermediate resolution picture file corresponding to the low resolution picture data recorded in the index file is included therein, and position within the first area of the designated high or intermediate resolution picture file is designated on the basis of data of the first and third management blocks recorded in the second management information table.

136. A management method as set forth in claim 115,
wherein there is provided a data management structure in which only picture file managed by the management file is subjected to recording/reproduction management.

137. A management method as set forth in claim 115,
wherein the picture file recorded in the first area of the recording medium has a data management structure in which recording/reproduction is carried out on the basis of data recorded in the management file and the second management information table.

138. A management method as set forth in claim 115,
wherein the picture file recorded in the first area of the recording medium has a data management structure in which picture file is designated on the basis of data recorded in the management file, and the position on the recording medium is designated on the basis of data recorded in the second management information table.

139. A management method for carrying out management of picture data on a recording medium,
wherein the recording medium includes
a first area for recording a plurality of picture files corresponding to a picture resolution and a management file for managing said picture files;
a second area for recording a management table for controlling a recording address of said management file and said picture files;
wherein a procedure is taken
to designate a desired picture file from the plural picture files having different resolutions on the basis of the management data of the management file and to designate a recording address of said designated picture on the basis of the management information table; and further
wherein a data size of a minimum access unit of said first area is larger than a data size of a minimum access unit of said second area.

140. A management method as set forth in claim 139,
wherein the recording medium has a hierarchical directory structure [consisting of] including a directory and subdirectories formed within the directory.

141. A management method as set forth in claim 140,
wherein the management file includes a first management file recorded in the directory, and a second management file recorded in the subdirectory.

142. A management method as set forth in claim 140,
wherein a directory information unit for carrying out management of all the subdirectories of the subdirectories formed within the directory is included in the first management file, and
wherein a second file information unit for carrying out management of picture files recorded in the subdirectories is included in the second management file.

143. A management method as set forth in claim 140,
wherein the picture data recorded into the plural picture files are picture data which are fixed length encoded.

144. A management method as set forth in claim 140,
wherein the plural picture data of different resolutions include a high resolution picture data, an intermediate resolution picture data and a low resolution picture data, and
wherein the plural picture files include a high resolution picture file including the high resolution picture data, an intermediate resolution picture file including the intermediate resolution picture data, and an index file including the low resolution picture data.

145. A management medium as set forth in claim 144,
wherein the high resolution picture data which is fixed
length encoded to have first data length of an integer
multiple of the minimum access unit is included in the
high resolution picture file, wherein the intermediate resolution picture data which is
fixed length encoded to have a second data length of a
multiple of the minimum access unit, which is shorter
than the first data length is included in the intermediate
resolution picture file, and wherein the low resolution picture data which is fixed
length encoded to have a third data length reduced or
divided by an integer factor of the minimum unit,
which is shorter than the second data length is included
in the index file.

146. A management method as set forth in claim 140,
wherein the plural picture data of different resolutions
includes a high resolution picture data, an intermediate
resolution picture data and a low resolution picture
data, wherein the plural picture files includes a high resolution
picture file including the high resolution picture data,
an intermediate resolution picture file including the
intermediate resolution picture data, and an index file
including the low resolution picture data, and wherein one high resolution picture data formed from the
original picture data is recorded into the high resolution
picture file, one intermediate resolution picture data
formed from the original picture data is recorded into
the intermediate resolution picture file, and plural low
resolution picture data formed from the plural original
picture data are recorded into the index file.

147. A management method as set forth in claim 146,
wherein the first area has a hierarchical structure including a directory and subdirectories formed within the
directory, and wherein the index file includes a first index file recorded
into the directory and a second index file recorded into
the subdirectory.

148. A management method as set forth in claim 146,
wherein the first area has a hierarchical directory structure
including a directory and subdirectories formed within
the directory, wherein the management file includes a first management
file in which a directory information unit for carrying
out management of all the subdirectories of the subdirectories formed at the lower level of the directory is
recorded, and a second management file in which a
second file information unit for carrying out management of picture files recorded in the subdirectories is
recorded, wherein the index file includes a first index file which
records low resolution picture data for indicating at
least one picture file of picture files recorded into the
subdirectories formed within the directory, and a second index file which records low resolution picture data
for respectively indicating all picture files recorded in
the subdirectories, and wherein the first management file and the first index file
are included in the directory, and the second management file and the second index file are included in the
subdirectory.

149. A management method as set forth in claim 146,
wherein the index file is recorded into physically continuous areas on the recording medium.

150. A management method as set forth in claim 146,
wherein one picture is constituted by plural low resolution
picture data included in the index file, and the plural low
resolution picture data are recorded in the order of display on
the picture.

151. A management method as set forth in claim 148,
wherein, in the first management file, to correspond to the
recording order of the low resolution picture data
recorded in the first index file, the directory information
unit for indicating number of subdirectory including
high resolution picture file or intermediate resolution
picture file corresponding to the low resolution picture
data is recorded, and wherein, in the second management file, to correspond to
the recording order of low resolution picture data
recorded in the second index file, the picture information unit for indicating number of high resolution
picture file or intermediate resolution picture file corresponding to the low resolution picture data is
recorded.

152. A management method as set forth in claim 139,
wherein the second management information table includes
a first management block (MT) for carrying out, in management block units different from the minimum access unit
of the recording medium, management of the second area,
and a second management block (VSB) for carrying out, in
the minimum access units, management of recording state of
the first area.

153. A management method as set forth in claim 139,
wherein the first area of the recording medium has a
hierarchical directory structure including a directory
and subdirectories formed within the directory, and wherein the second management information table
includes a first management block (MT) for carrying
out, in management block units different from the
minimum access unit of the recording medium, management of the second area, second management block
(VSB) for carrying out, in the minimum access units,
management of recording state of the first area, and
third management block (DRB) for carrying out management of data relating to respective files recorded in
the directory, the subdirectories and the first area.

154. A management method as set forth in claim 153,
wherein the hierarchical directory structure including the
directory and the subdirectories is represented by the first
and third management blocks recorded in the second management information table.

155. A management method as set forth in claim 153,
wherein the third management block includes
a directory record unit for the directory indicating the
position within the first area of the directory and the
subdirectory, and
a directory record unit for file indicating the positions
within the first area of respective files recorded in the
first area.

156. A management method as set forth in claim 153,
wherein management of the position of the subdirectory is
carried out in the minimum access units of the recording medium by the directory record unit for the directory included in the third management block indicating
the directory, and wherein management of positions of plural picture files
recorded in the subdirectory is carried out in the
minimum access units of the recording medium by the
directory record unit for file included in the third
management block indicating the subdirectory.

157. A management method as set forth in claim 153, wherein the plural picture data of different resolutions include a high resolution picture data, an intermediate resolution picture data and a low resolution picture data, wherein the plural picture files include a high resolution picture file including the high resolution picture data, an intermediate resolution picture file including the intermediate resolution picture data, and an index file including the low resolution picture data, and wherein one high resolution picture data formed from the original picture data is recorded in the high resolution picture file, one intermediate resolution picture data formed from the original picture data is recorded in the intermediate resolution picture file, and plural low resolution picture data formed from the plural original pictures are recorded in the index file.

158. A management method as set forth in claim 157, wherein the management file includes a first management file in which a directory information for carrying out management of all the subdirectories of the subdirectories formed at the lower level of the directory is recorded, and a second management file in which a second file information for carrying out management of picture files recorded in the subdirectories is recorded, wherein the index file includes a first index file which records index picture for indicating at least one picture file of picture files recorded in the subdirectories formed within the directory, and a second index file which records index picture for respectively indicating all picture files recorded in the subdirectories, and wherein the first management file and the first index file are recorded in the directory, and the second management file and the second index file are recorded in the subdirectory.

159. A management method as set forth in claim 153, wherein there is provided a data management structure in which high resolution picture file or intermediate resolution picture file corresponding to the low resolution picture data recorded in the second index file is designated on the basis of data of the second management file, and the position within the first area of the designated high or intermediate resolution picture file is designated on the basis of data of the first management block and the third management block recorded in the second management information table.

160. A management method as set forth in claim 139, wherein the picture file recorded on the recording medium has a data management structure in which only picture file managed by the management file is subjected to recording/ reproduction management.

161. A management method as set forth in claim 139, wherein the picture file recorded in the first area of the recording medium has a data management structure in which recording/reproduction is carried out on the basis of data recorded in the management file and the second management information table.

162. A management method as set forth in claim 139, wherein the picture file recorded in the first area of the recording medium has a data management structure in which picture file is designated on the basis of data recorded in the management file, and the position on the recording medium is designated on the basis of data recorded in the second management information table.

* * * * *